(12) United States Patent
Gilbert

(10) Patent No.: US 8,893,319 B2
(45) Date of Patent: Nov. 25, 2014

(54) HEAT EXCHANGE DEVICES

(76) Inventor: Patrick Gilbert, Brighton (GB)

( * ) Notice: Subject to any disclaimer, the term of this patent is extended or adjusted under 35 U.S.C. 154(b) by 1106 days.

(21) Appl. No.: 12/867,333

(22) PCT Filed: Feb. 13, 2009

(86) PCT No.: PCT/EP2009/051673
§ 371 (c)(1),
(2), (4) Date: Nov. 29, 2010

(87) PCT Pub. No.: WO2009/101161
PCT Pub. Date: Aug. 20, 2009

(65) Prior Publication Data
US 2011/0107512 A1 May 12, 2011

(30) Foreign Application Priority Data

Feb. 12, 2008 (GB) .................................. 0802486.1
Aug. 26, 2008 (GB) .................................. 0815375.1

(51) Int. Cl.
*A47K 3/022* (2006.01)
(52) U.S. Cl.
USPC .............................................................. 4/598
(58) Field of Classification Search
USPC .............................................................. 4/598
See application file for complete search history.

(56) References Cited

U.S. PATENT DOCUMENTS

| | | | |
|---|---|---|---|
| 3,263,242 A * | 8/1966 | Will ................................... | 4/598 |
| 3,361,194 A | 1/1968 | Cowlin | |
| 4,291,423 A | 9/1981 | Wilson | |
| 4,300,247 A | 11/1981 | Berg | |
| 4,304,292 A | 12/1981 | Cardone et al. | |
| 4,372,372 A * | 2/1983 | Hunter ............................. | 165/47 |
| 4,542,546 A | 9/1985 | Desgagnes | |
| 4,821,793 A | 4/1989 | Sheffield | |
| 5,143,149 A | 9/1992 | Kronberg | |
| 8,375,479 B2 * | 2/2013 | Kim ................................. | 4/598 |
| 2008/0000616 A1 | 1/2008 | Nobile | |

FOREIGN PATENT DOCUMENTS

| | | |
|---|---|---|
| AU | 4578596 | 5/1996 |
| AU | 2004212549 | 4/2005 |
| CN | 2702261 | 5/2005 |
| DE | 2502351 | 7/1976 |
| DE | 2538168 | 3/1977 |
| DE | 3316704 | 12/1983 |
| DE | 3319638 | 12/1983 |
| DE | 3923511 | 2/1990 |
| DE | 3919543 | 12/1990 |
| DE | 4406971 | 10/1994 |
| DE | 19608404 | 5/1997 |
| DE | 19723148 | 12/1998 |

(Continued)

*Primary Examiner* — Huyen Le
(74) *Attorney, Agent, or Firm* — Price Heneveld LLP

(57) ABSTRACT

A heat exchanger device (1) such as for use in recovering heat from shower waste water includes a casing base (2) and lid (3) forming an enclosure containing a first fluid conduit and a second fluid conduit (5), the second conduit being for fresh water supply and located in the first conduit, the second conduit having conduit sections in a serpentine path through the first conduit, the first and second conduits being arranged generally for counter-flow heat exchange with the second conduit having elongate sections configured generally transverse to a flow direction through the first conduit, the first conduit having baffles at an inlet and an outlet thereof for keeping the second conduit submerged in the first conduit, the device being provided with a foot or bodyweight operated actuation valve for actuating fresh water supply through the first conduit.

20 Claims, 25 Drawing Sheets

(56) References Cited

FOREIGN PATENT DOCUMENTS

| | | |
|---|---|---|
| EP | 0275237 | 7/1988 |
| EP | 0846829 | 6/1998 |
| FR | 2868796 | 10/2005 |
| GB | 1300294 | 12/1972 |
| GB | 2232749 | 12/1990 |
| GB | 2295666 | 6/1996 |
| GB | 2376517 | 12/2002 |
| GB | 2420973 | 6/2006 |
| GB | 2416829 | 8/2006 |
| NL | 1009927 | 2/2000 |
| NL | 1015561 | 1/2002 |
| NL | 1031082 | 1/2007 |
| NZ | 250784 | 1/1997 |
| NZ | 314983 | 4/2000 |
| SE | 526061 | 6/2005 |
| WO | 0198714 | 12/2001 |
| WO | 2006041320 | 4/2006 |
| WO | 2006045153 | 5/2006 |

* cited by examiner

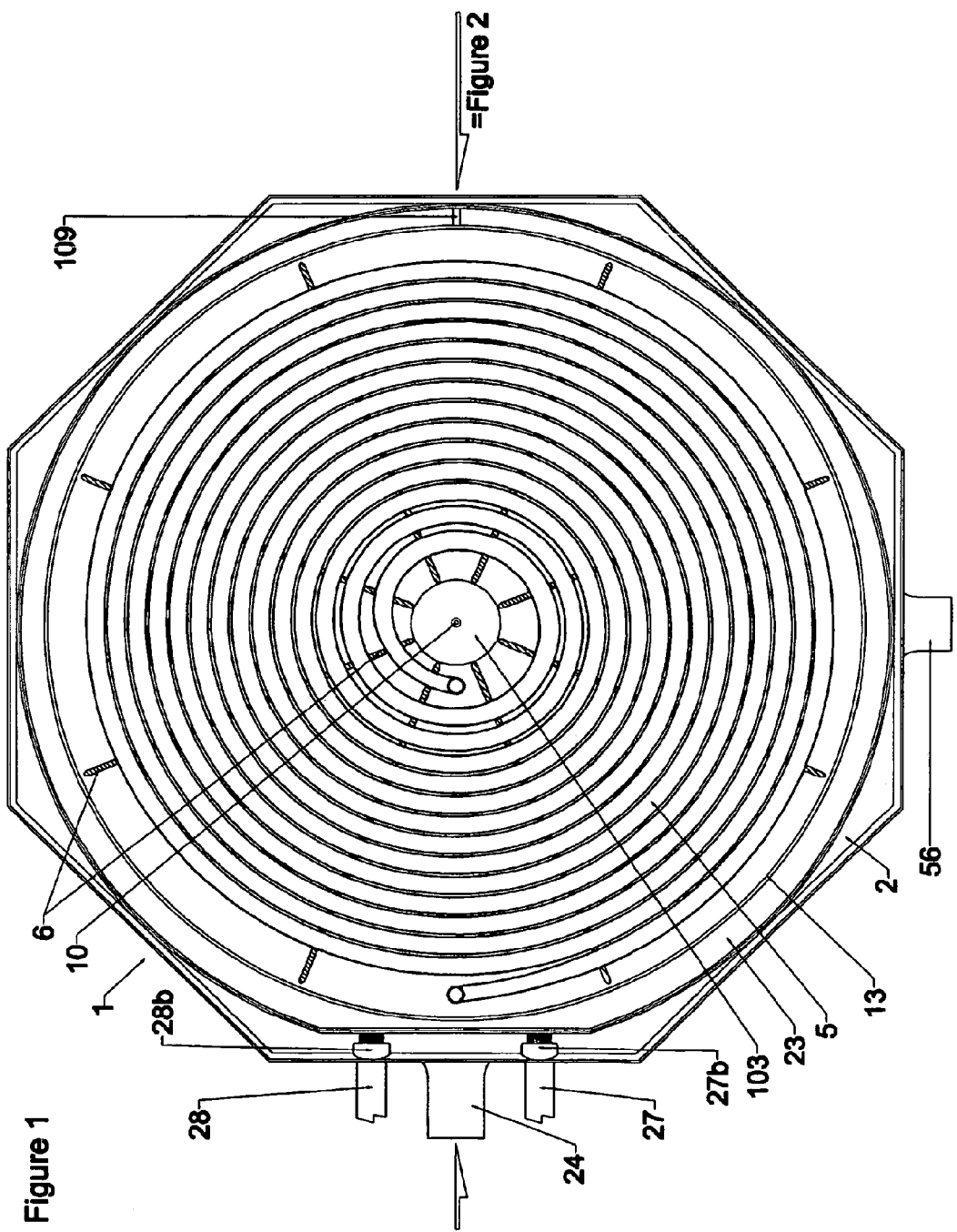

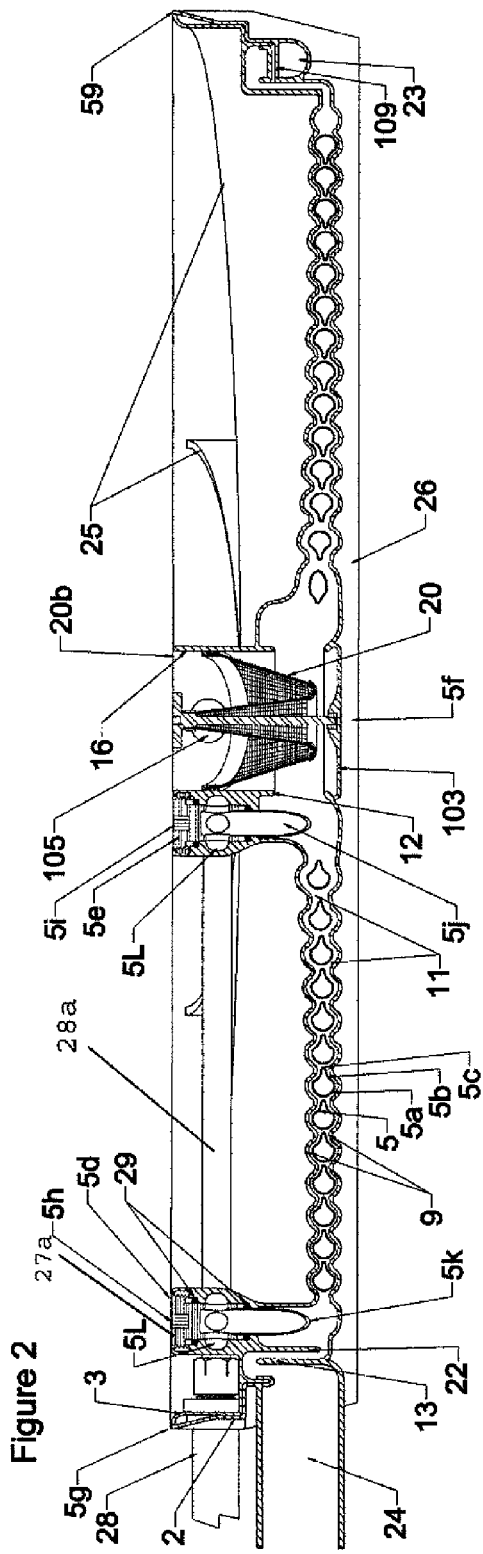
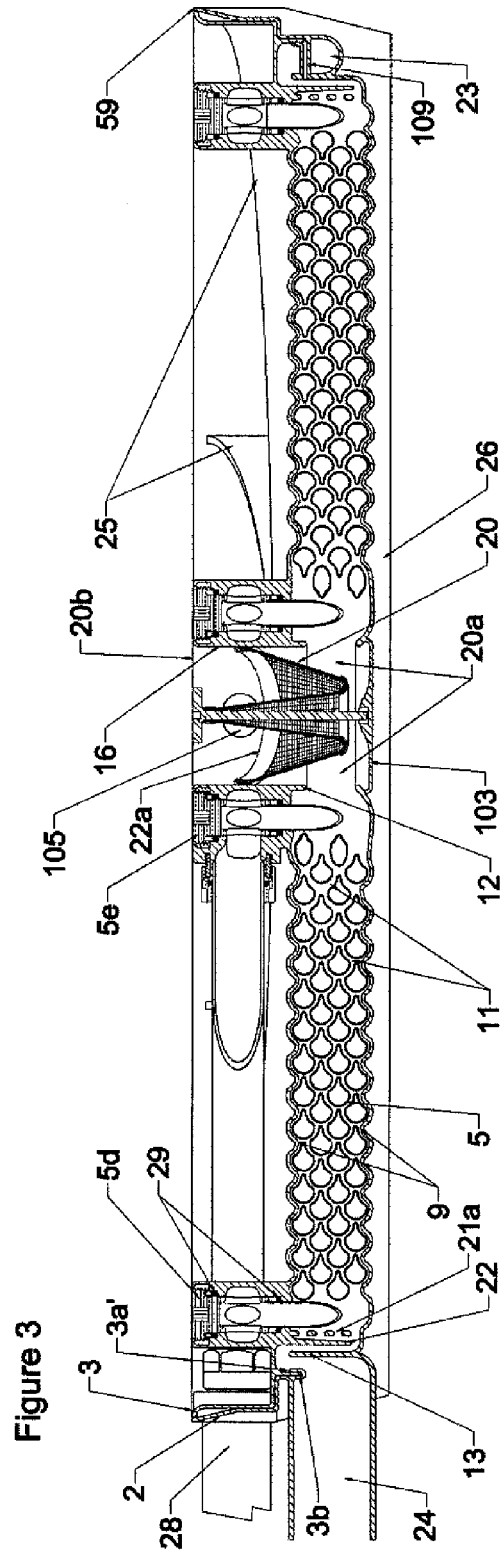

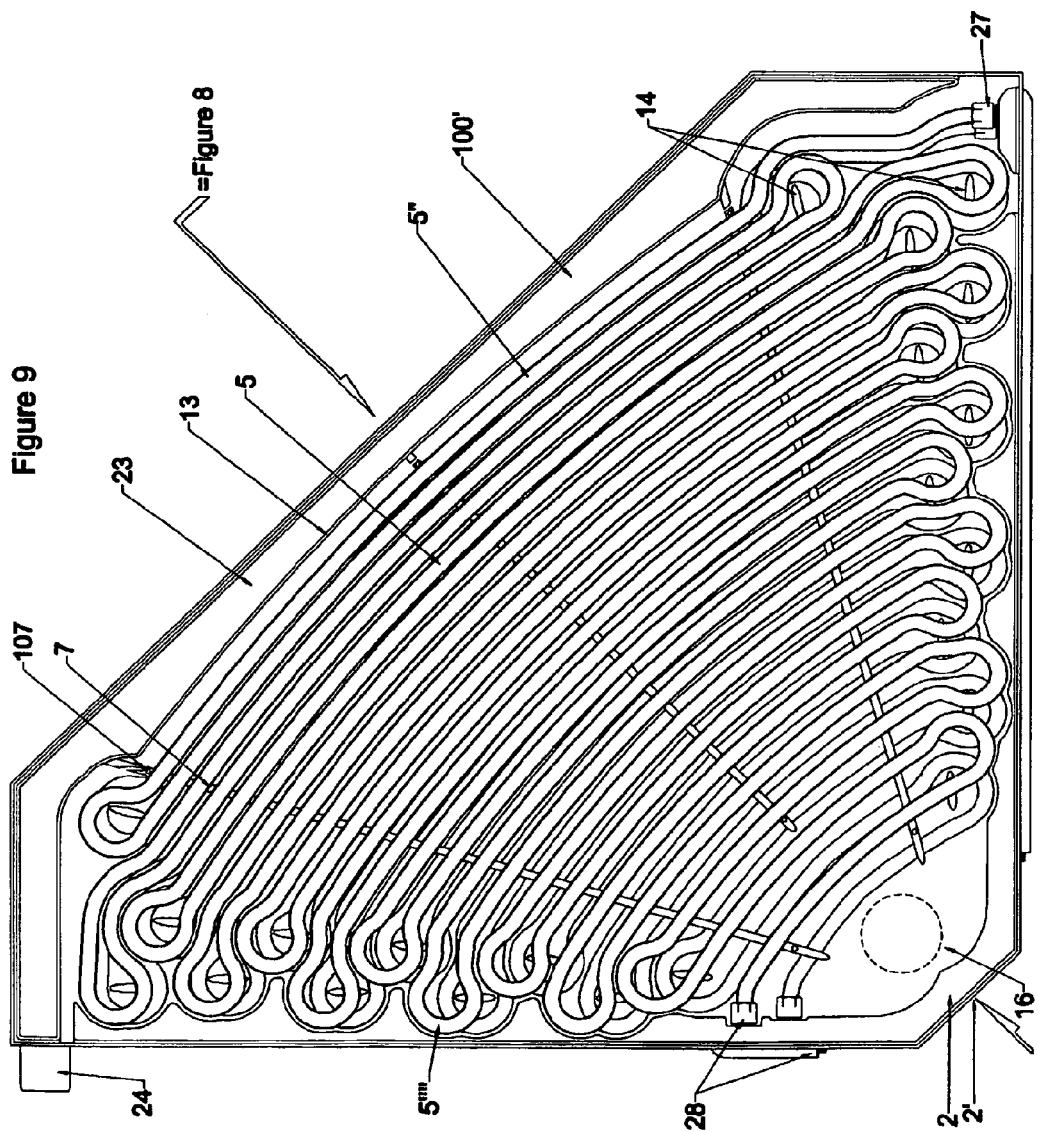

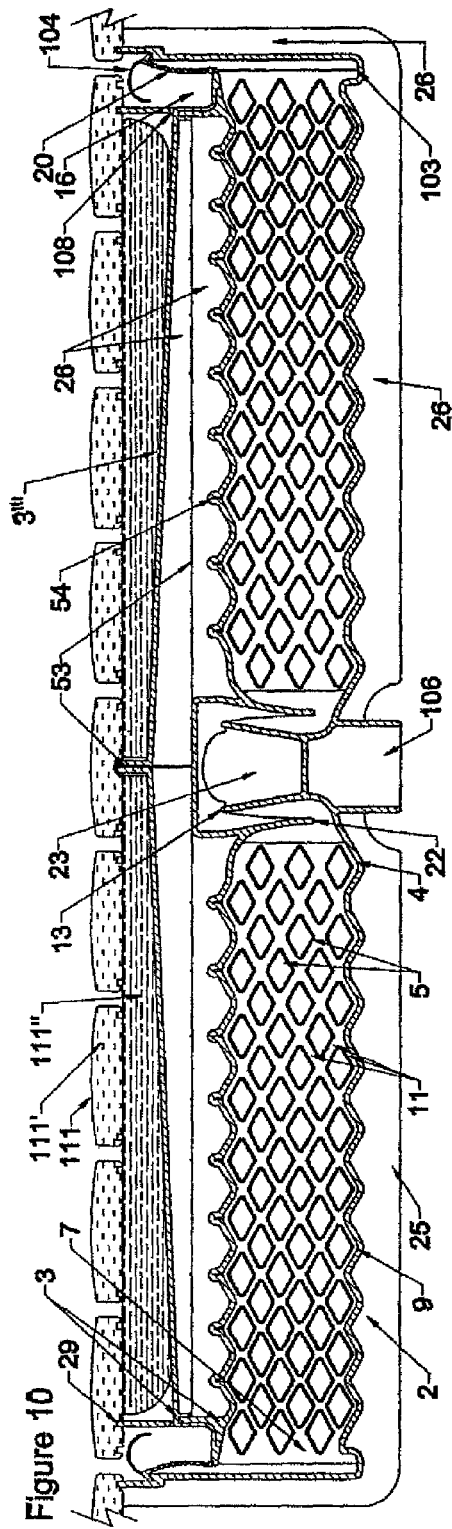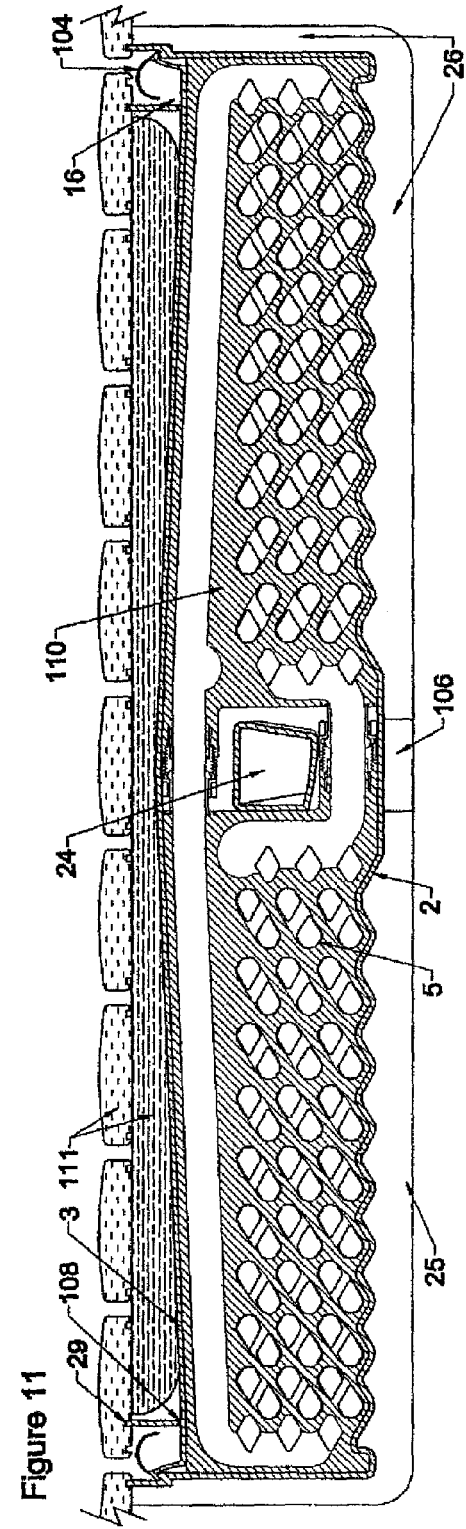

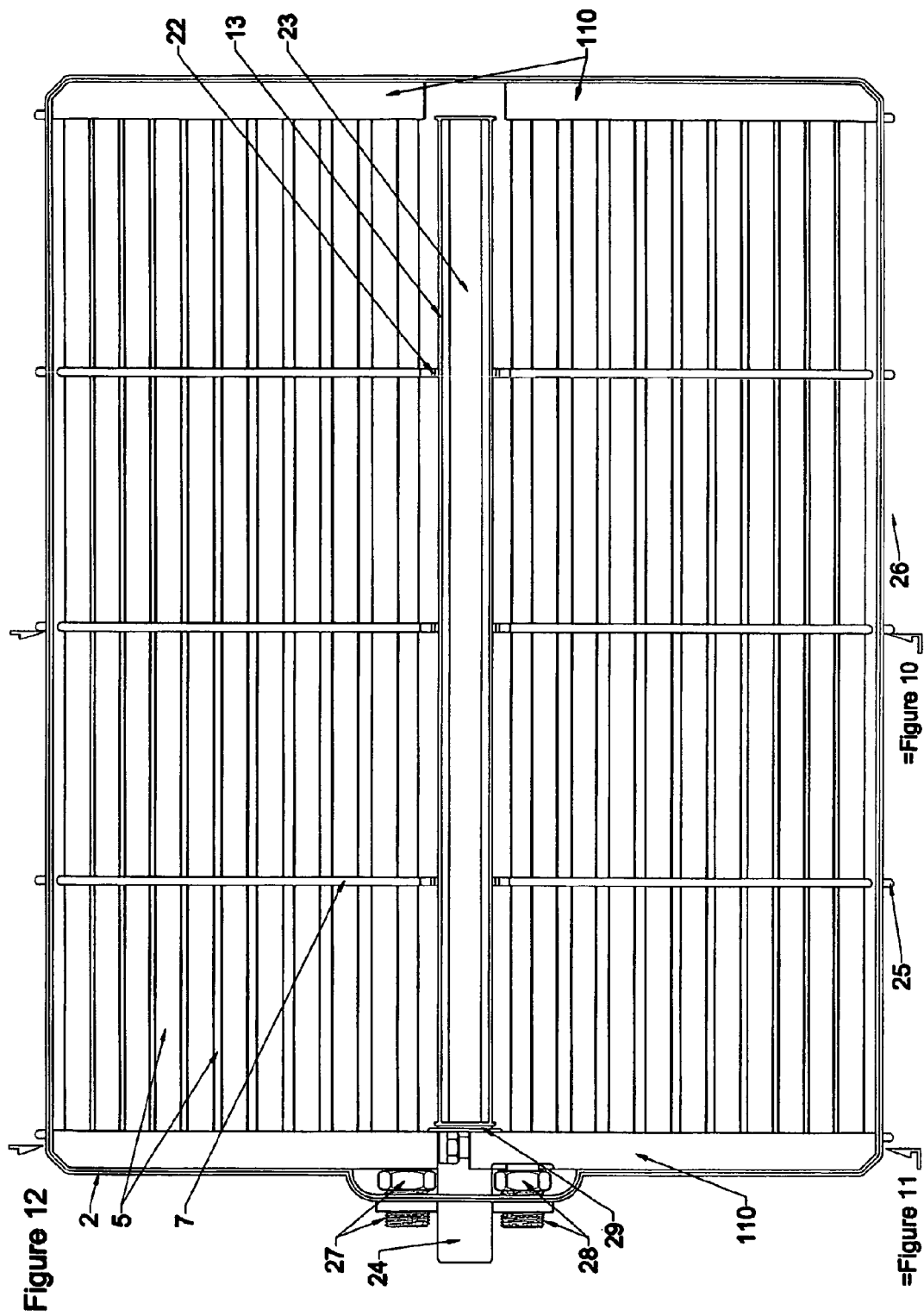

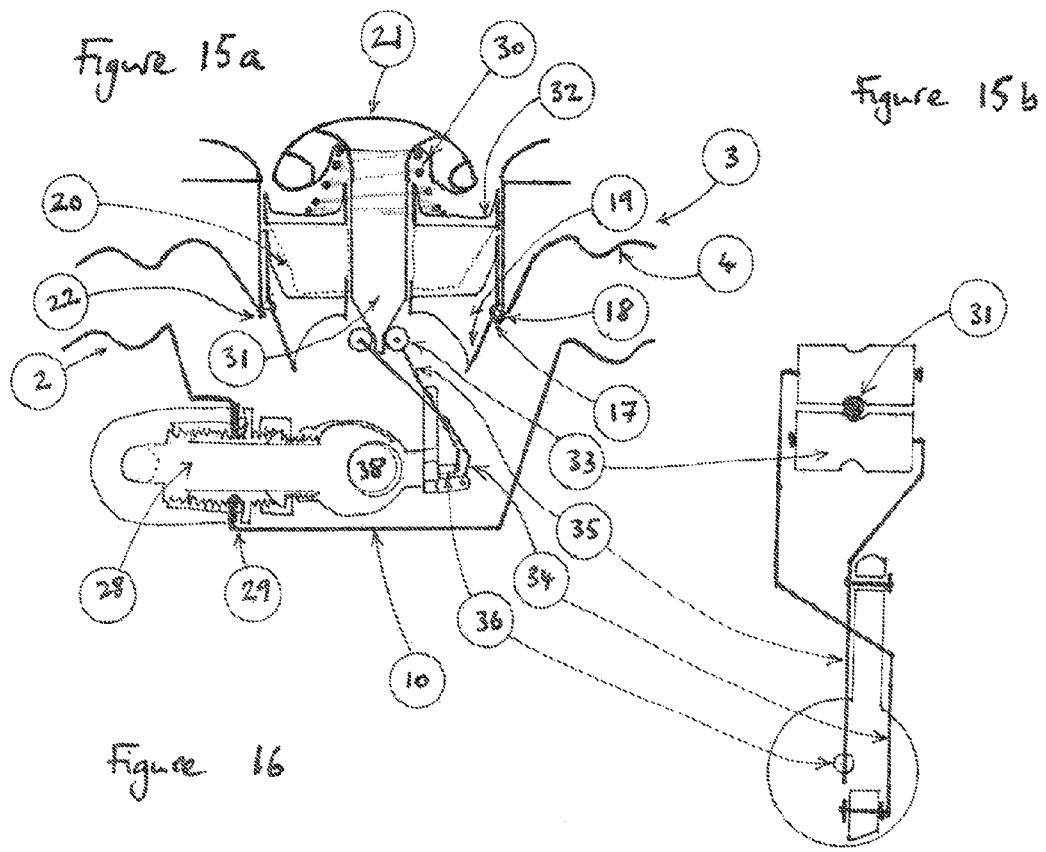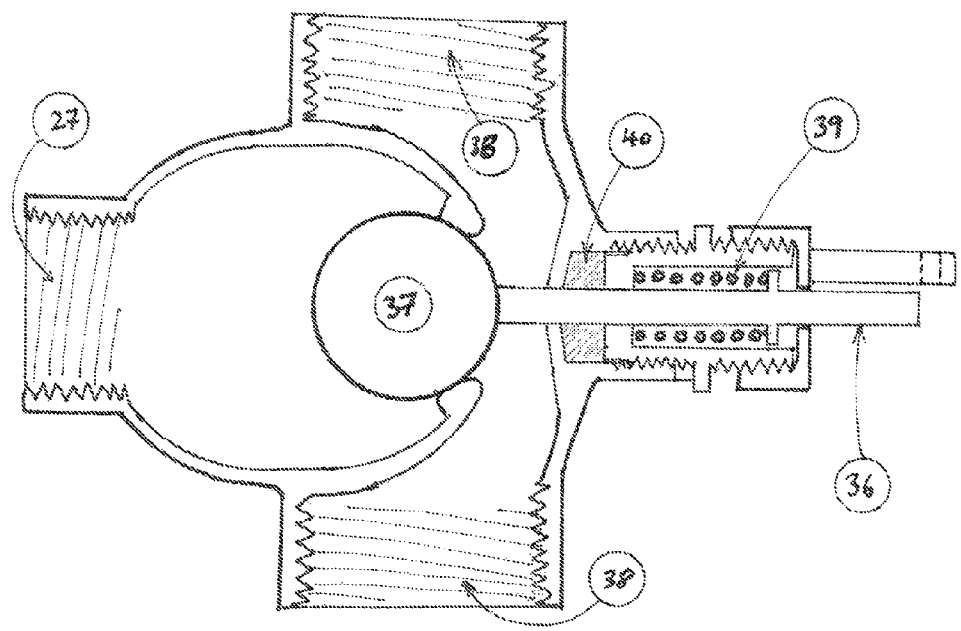

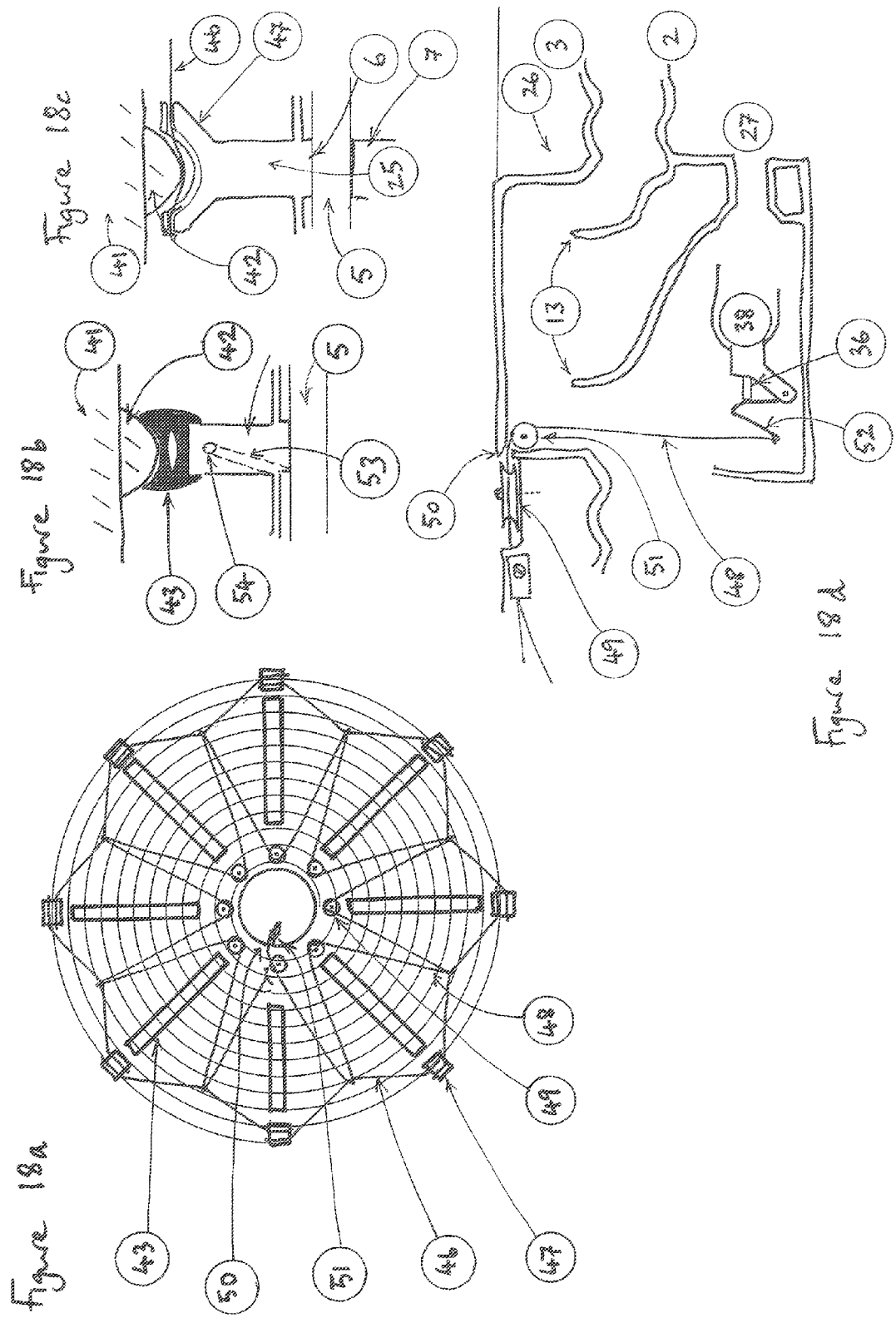

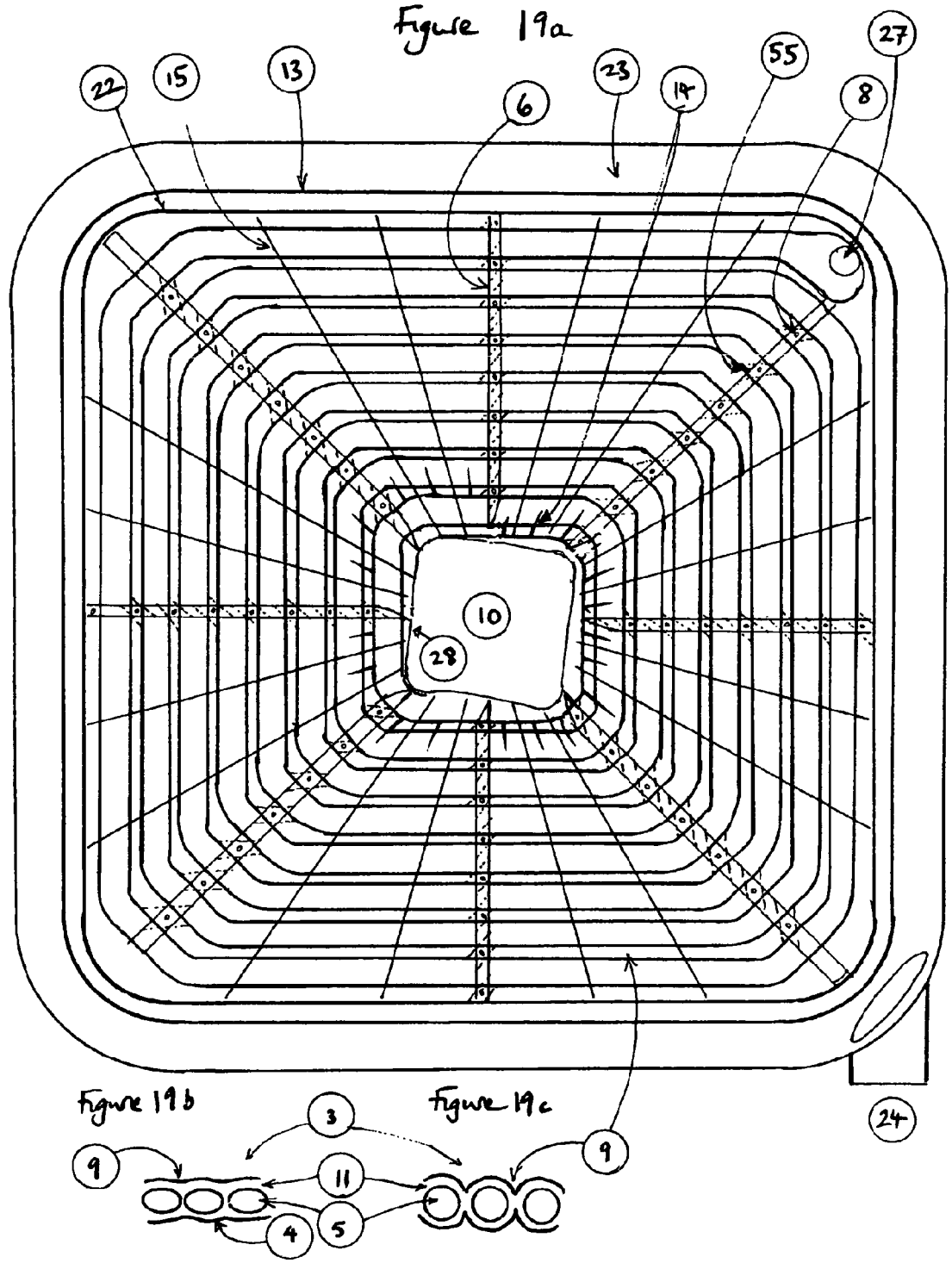

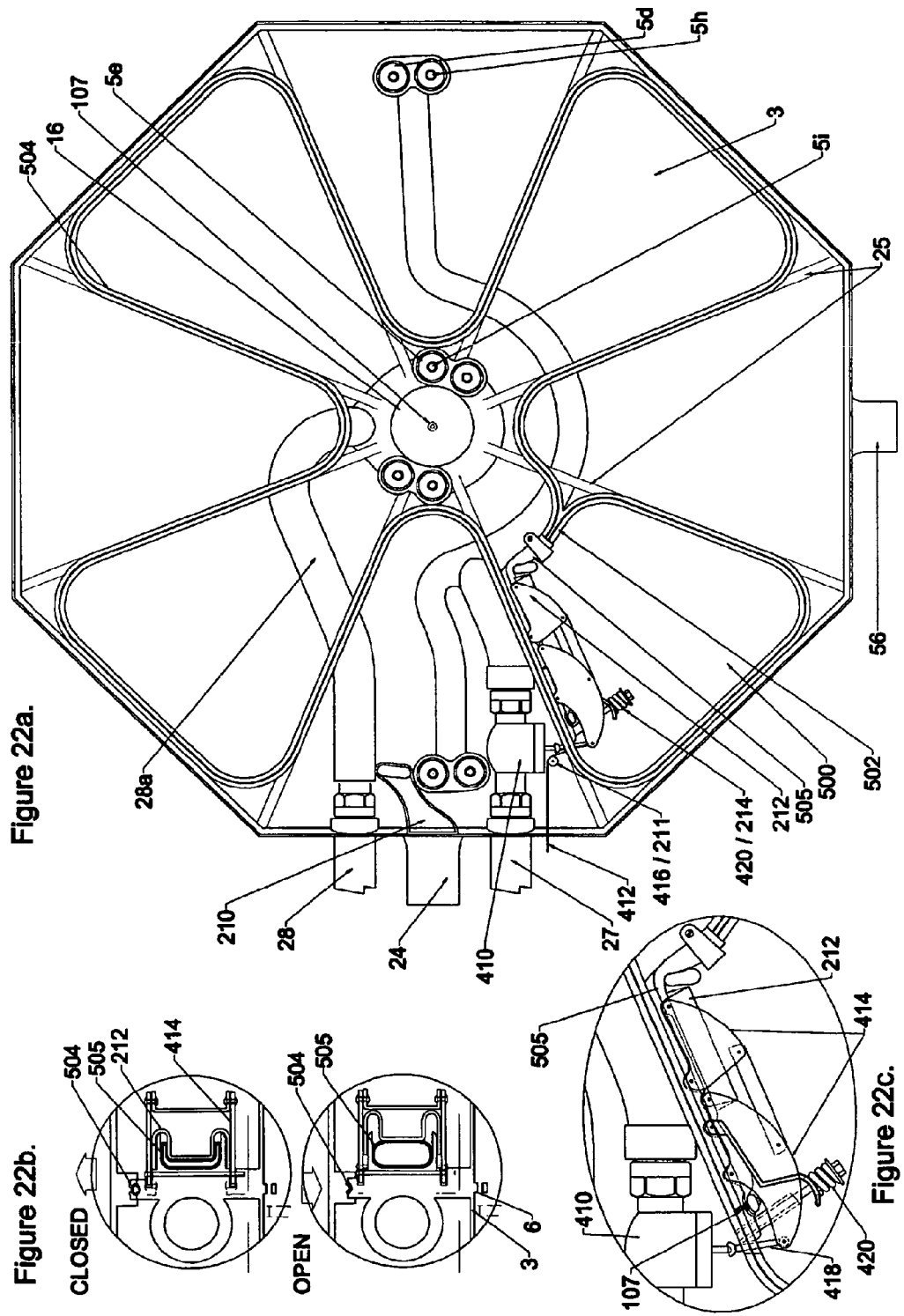

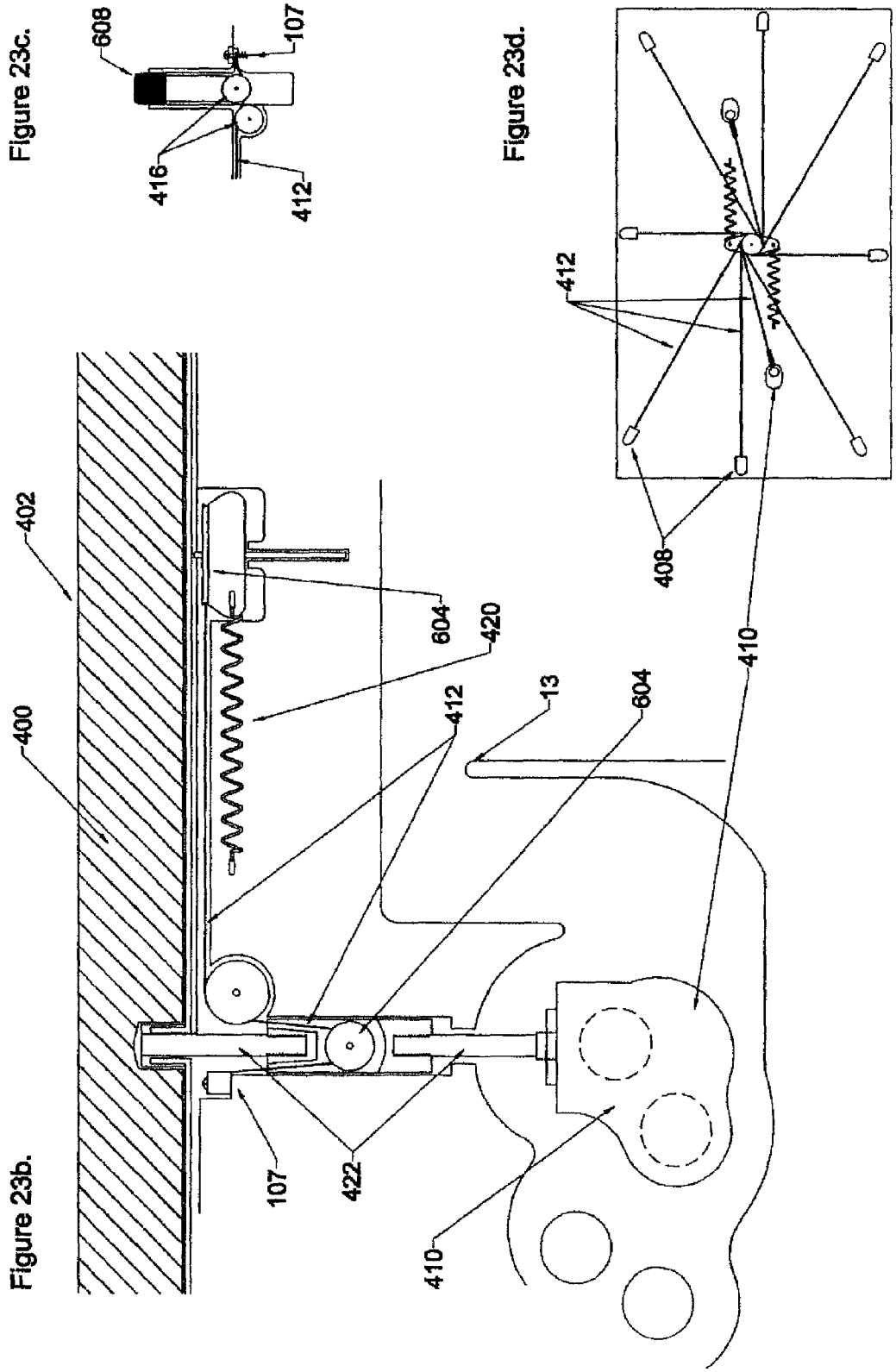

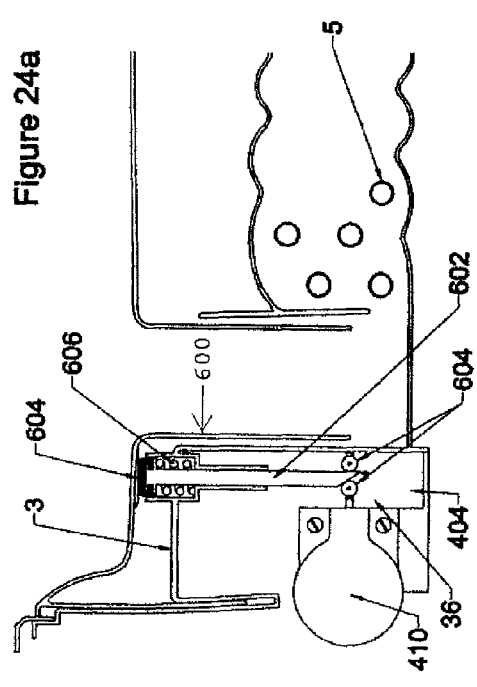
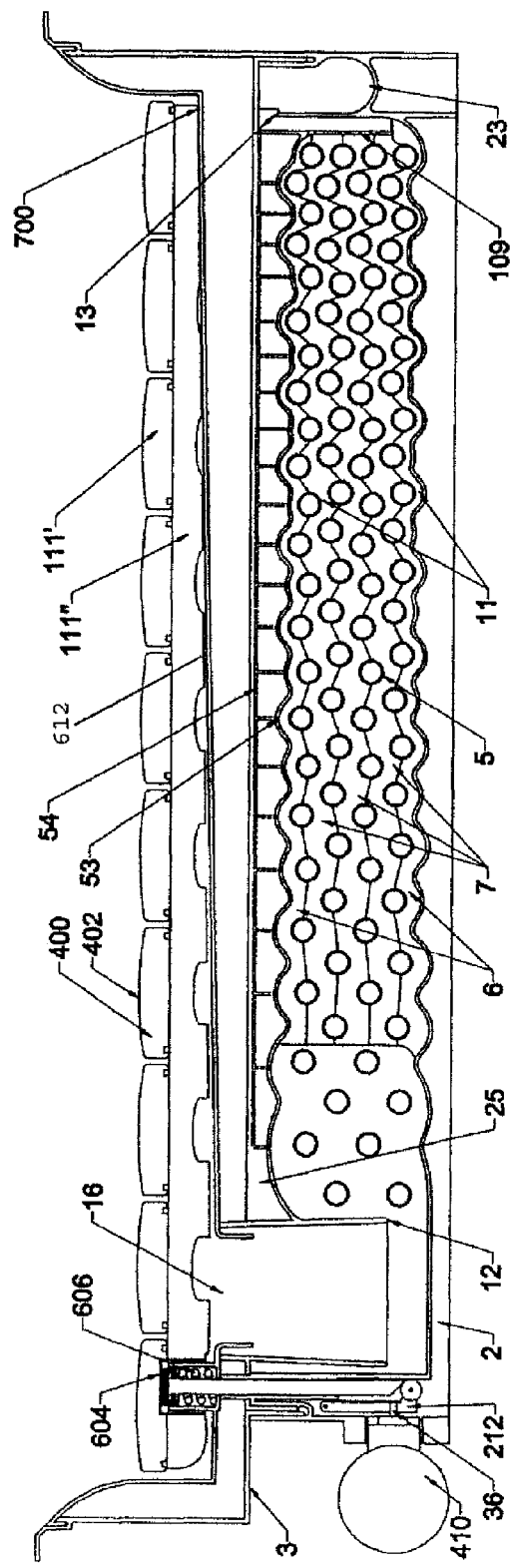
Figure 24a
Figure 24b

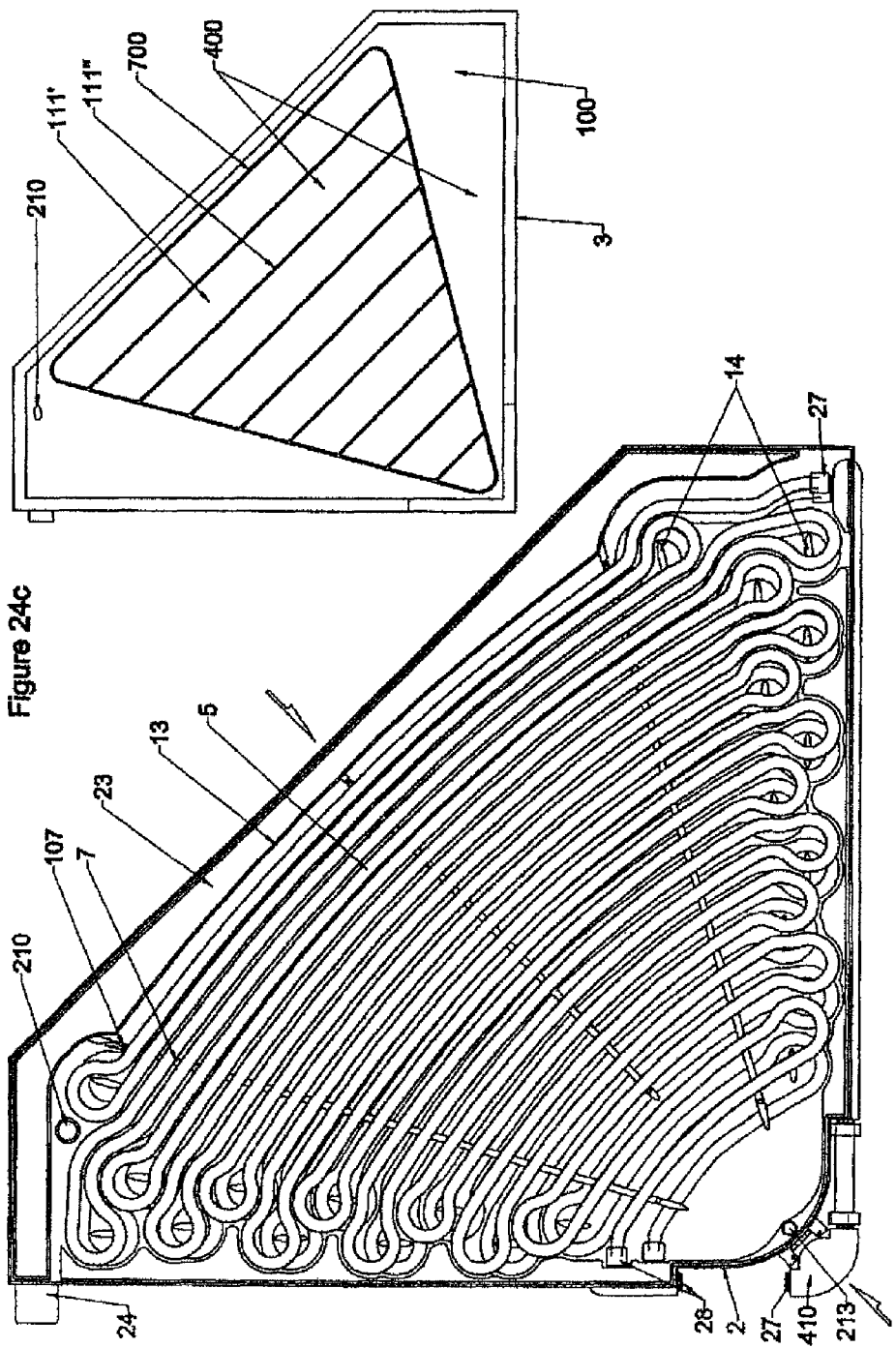

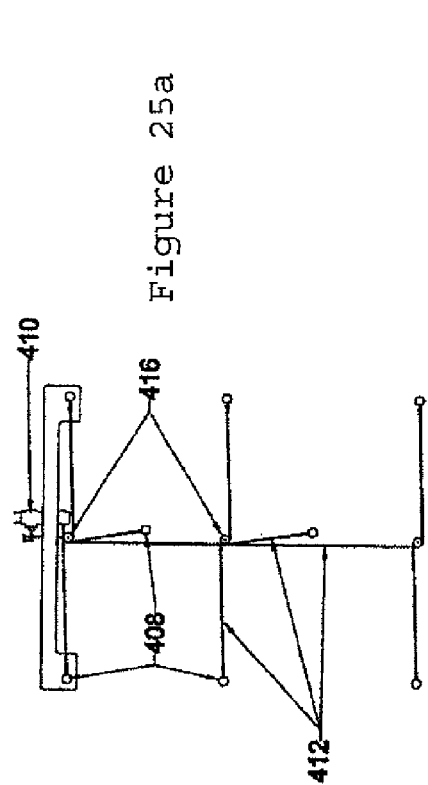
Figure 25a
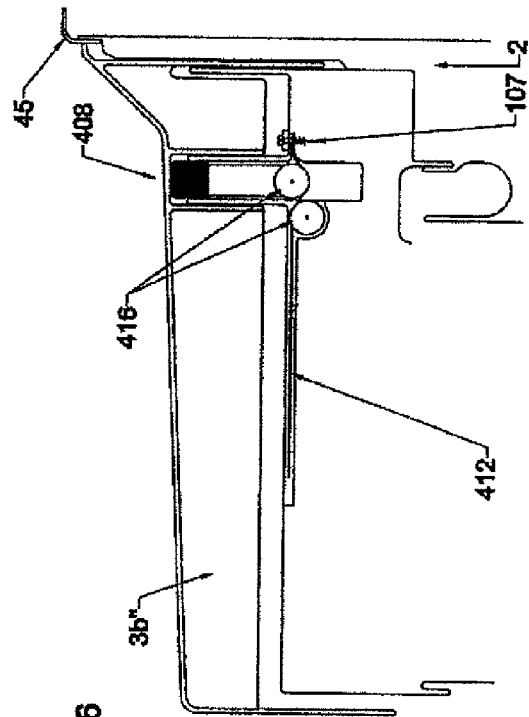
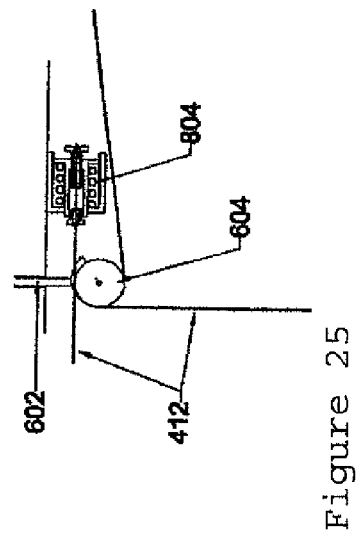
Figure 25
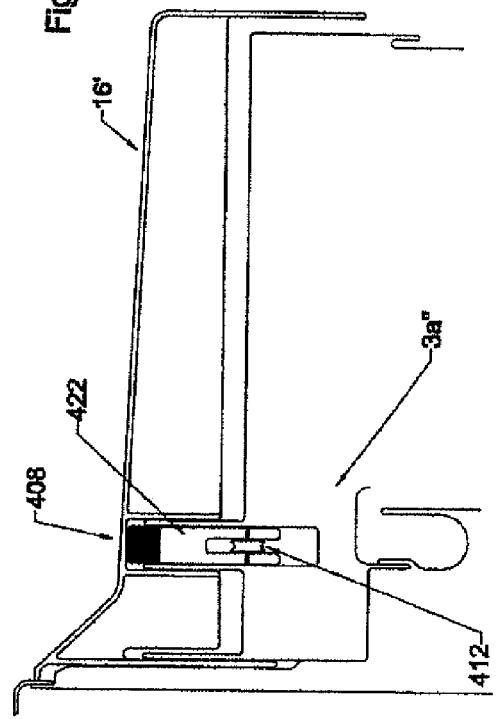
Figure 26

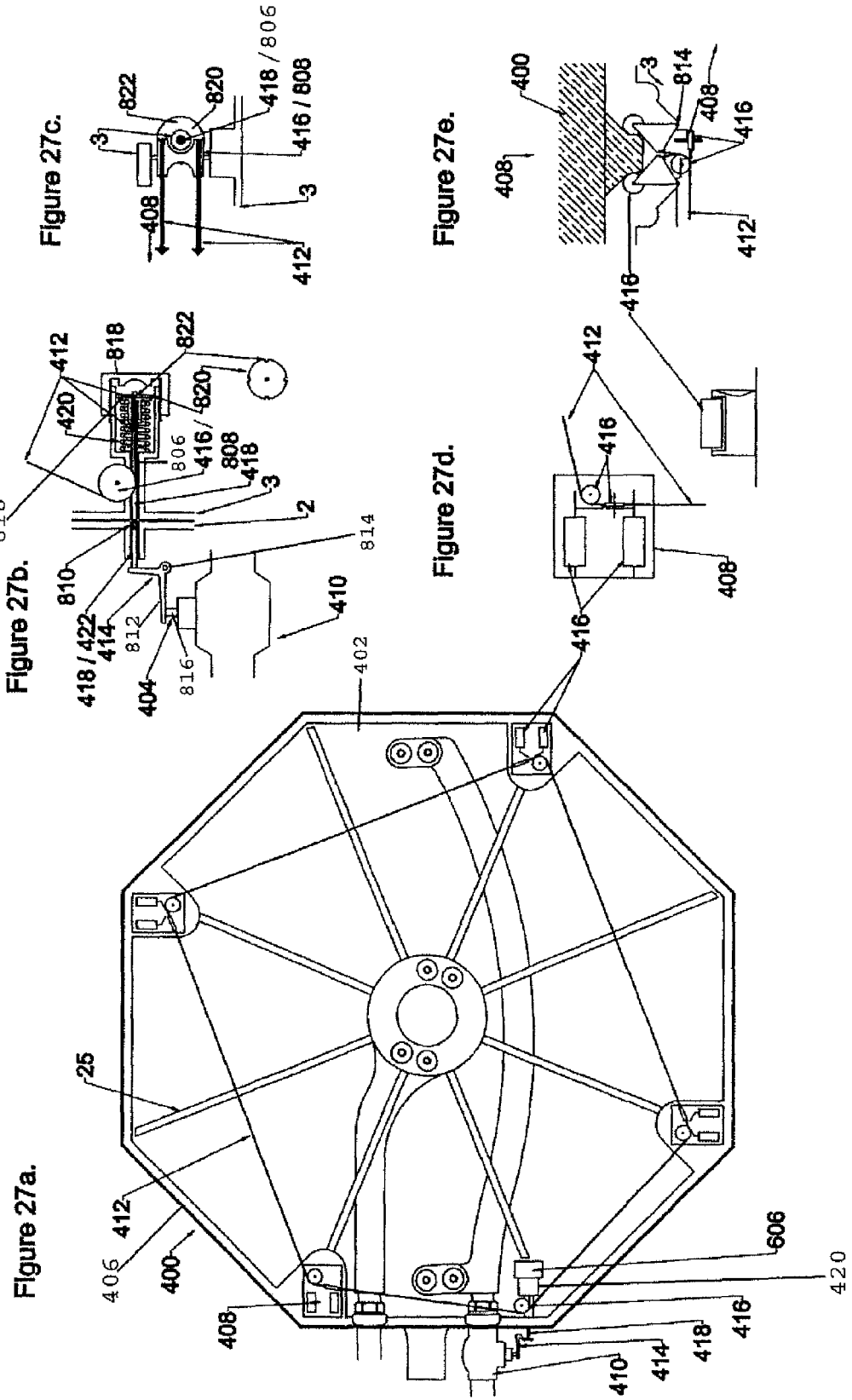

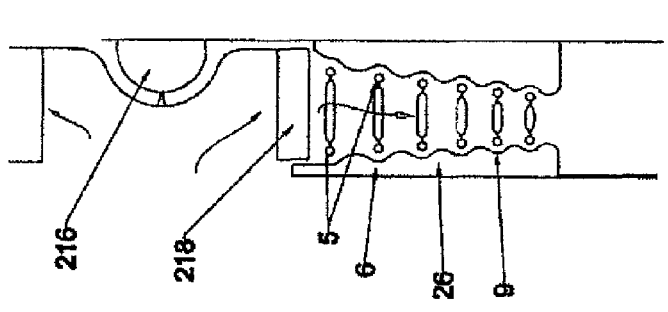
Figure 28c
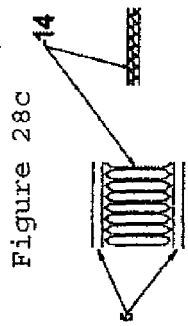
Figure 28d
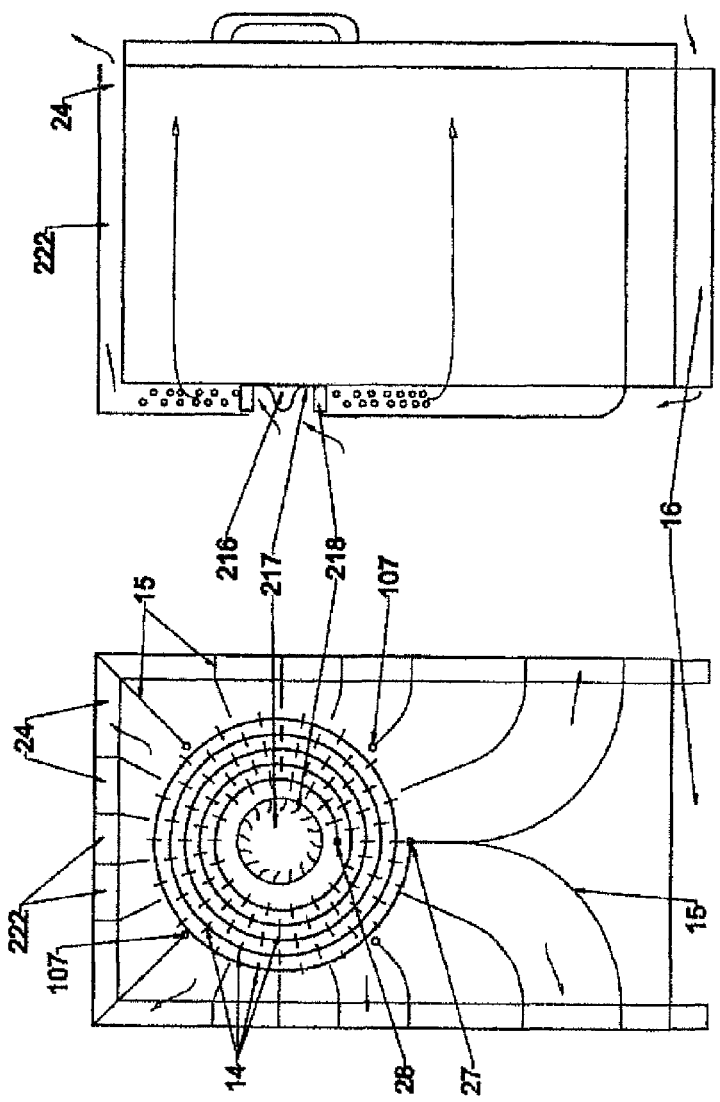
Figure 28b
Figure 28a

HEAT EXCHANGE DEVICES

The present invention relates to heat exchanger devices, including heat exchanger devices for use with plumbing systems including showers.

The invention also relates to heat exchanges applied for the purposes of air conditioning and refrigeration, as will also be illustrated below.

There is a need for highly efficient fluid-to-fluid heat-exchangers occupying a volume of space that may be significantly more limited in one dimension and imposing minimal resistance to the operational through-flow of one of the heat-mediating fluids without necessarily incurring such a high cost for their manufacture or employment as to outweigh the economical benefit of their use. There is also a need for the recovery of waste heat energy in the drainage of warm-water showers (whether in a domestic or institutional context), especially in relatively cold environments.

To facilitate reading, the abbreviation HXD will be used henceforth to signify "heat exchange device" in reference to heat exchange devices applicable in the context.

Ideas to recycle this heat have been around for some time, although the means for achieving this that are cost-effective and commercially viable have been elusive.

Whilst substantial amounts of wasted domestic energy go unharvested, there remains an outstanding need for a comprehensive set of principles and effective features with which a suitable efficient heat exchange device may be manufactured that is sufficiently economical as to be attractive for commercial distribution and widespread adoption, while financially justifying the labour of its individual installation. Depending on the cost viability of more elaborate fabrication design requirements, variation in the embodiment of this device may extend the flexibility and compatibility of its application to satisfy more diverse needs of the consumer and a wider commercial market.

Various devices have been conceived for this purpose according to the thermo-hydraulic principles involved, by their actual implementation remains obscure or cumbersome in practice. The benefits of thermal energy conservation in this context have remained generally un-harvested, being prohibited by the outweighing cost of construction and the labour of installation of these devices.

Some prior art designs feature a long or tortuous flow path of drainage water in contact with tubular conduits of a colder secondary fluid flowing in opposite general direction (e.g. Cowlin: U.S. Pat. No. 3,361,194A1, Jan. 2, 1968; Ohe: DE2502351A1, Jul. 29, 1976; Wilson: U.S. Pat. No. 4,291,423A1, Sep. 29, 1981; Cardone: U.S. Pat. No. 4,304,292A1, Dec. 8, 1981; Zink: DE3319638A1, Dec. 22, 1983; Bauakademie: DE3923511A1, Feb. 1, 1990; Kantner: DE3919543A1, Dec. 20, 1990; Jackson: GB2295666A, May 6, 1996; Miller: DE19608404A1, May 7, 1997; Daschner: DE19723148A1, Dec. 10, 1998; Pritchard: 314983(NZ), Sep. 3, 2000; Schiller: GB2376517A, Dec. 18, 2002; Newlands: AU2004212549A1, Apr. 7, 2005; Taiyang: CN2702261YY, May 25, 2005: Rutherford: GB2420973A, Jun. 14, 2006; Mason: WO2006045153A1, May 4, 2006). Lengthy conduit linings and sharp bends present a substantial drag on drainage flowing under the limited pressure head of its own weight under the shower pan. To permit an adequate drainage flow rate the area of contact with the secondary medium via heat transferring surfaces may be insufficient for a satisfactory level of heat exchange efficiency such as may be generally required given the moderately low temperature difference between the waste and fresh water. Designs with non-tubular heat exchange surfaces, however, with a greater proportion of surface area (e.g. Berg: U.S. Pat. No. 4,300,247A1, Nov. 17, 1981; Cederferm: SE526061C2, Jun. 28, 2005; McGregor: WO2006041320A1, Apr. 20, 2006 tend to disadvantageously require substantial height and are of elaborate construction.

Further prior art is disclosed by: Scholtz: DE2538168A1, Mar. 10, 1977; Meshulam: EP0275237A2, Jul. 20, 1988; Visser: NL1015561CC2, Mar. 1, 2002. In this arrangement a significant proportion of the transferred heat is conducted tangentially along the conduit surface in the direction of the warmer drainage fluid, impeding subsequent heat transfer from the primary fluid to the heat exchanging surface is later sections of conduit.

Further prior art is shown in: Cardone: U.S. Pat. No. 4,304, 292A1, Dec. 8, 1981, Hunter: U.S. Pat. No. 4,372,372A1, Feb. 8, 1983; Kronberg: U.S. Pat. No. 5,143,149A1, Sep. 1, 1992; Nobile: US2008000616A!, Jan. 3, 2008; Kongerskov: WO0198714A1, Dec. 27, 2001; Schiller: GB2376517A, Dec. 18, 2002; Newlands: AU2004212549A1, Apr. 7, 2005. These arrangements have limited drainage conduit size and the amount of heat exchanging surface area that can be accommodated within or around it generally allow for a limited heat exchange surface area and therefore relatively limited efficiency.

As described by Waagner-Biro (GB1300294, Dec. 20, 1972), radial-flow arrangements are highly susceptible to reductions in heat-exchange efficiency resulting from uneven distributions of radial flow through the levels, and proposes a means for equalising the flow vertically through the various levels or layers of flat spiralled conduit. Whilst this is not a significant issue when there few layers as is the case with an under-shower application (Mason: WO2006045153A1, May 4, 2006; Dupre: FR2868796A1, Oct. 14, 2005; McAllister: AU199645785A1, May 9, 1996) these devices do suffer from an uneven distribution of flow laterally near the perimeter, and this problem is not addressed by Waagner-Biro or Schmid Reto (EP0864829, Sep. 16, 1998).

Even though the employment of flow walls with uniform edges may have laterally balanced the general flow through the heat exchanger to a partial degree, they have not been employed to good effect.

The larger volume of primary heat medium (shower drainage water) in many cases, given the typically limited duration of showers, may amount to a significant heat loss as overhead in reaching the working thermal equilibrium (Fischer: DE3316704A1, Dec. 1, 1983). Furthermore, an expansive volume permits local flow variations and accommodates lines of flow within the conduit that may be relatively distant from the heat exchange surfaces (appropriately or not) resulting in poor overall heat transfer efficiency.

Some prior art designs feature drainage water flowing as a laminar or cascading down at an inclined angle across heat exchange surfaces bordering the transverse flow of the secondary heat medium (Desgagnes: U.S. Pat. No. 4,542,546A1, Sep. 24, 1985; Rutherford: GB2232749A, Dec. 19, 1990; Heidemans: NL 1031082CC2, Oct. 1, 2007). These are elaborate constructions where much of the heat exchanging surface area is not a contact with either of the flowing heat media and therefore not fully used well. Other prior art features secondary medium HX conduits bathed in a shallow body of drainage water on the collecting basin (Sheffield: U.S. Pat. No. 4,821,793A1, Apr. 18, 1989; Clucas: 250784 (NZ), Apr. 28, 1995; Empel: DE4406971A1, Oct. 6, 1994). These may more economical but without a specific flow arrangement their performance is rudimentary.

Some prior art heat exchange devices have advocated for the secondary heat medium the fresh water supplying the shower's cold water inlet or the shower's water heater, or both.

Some prior art arrangements integrate a gas seal upstream of a heat exchanger component (Miller: DE19608404A1, May 7, 1997; Heidemans: NL1009927CC2, Sep. 1, 2000), and others with the heat exchange component integrated within this feature (Cardone: U.S. Pat. No. 4,304,292A1, Dec. 8, 1981; Fischer: DE3316704A1, Dec. 1, 1983; Kronberg: L U.S. Pat. No. 5,143,149A1, Sep. 1, 1992; Nobile: US2008000616A1, Jan. 3, 2008; Kimberlin et al: GB2416829A, Feb. 8, 2006; McGregor: WO2006041320A1, Apr. 20, 2006.

The present invention aims in at least some embodiments to alleviate at least to a certain extent the problems of the prior art.

The invention is set out in the independent claims. Various optional features are set out in the dependent claims. The features specified in each of claims 1, 2 and 32 are highly advantageous in that they allow a smooth and moderated flow of fluid through the first conduit. This is beneficial in various situations, such when flow through the first conduit is by way of a gravity-driven pressure head. Width in the context of these claims can be considered to be the total distance of flow along or around a flow front which is at any chosen particular proportion of the distance across the first conduit from the inlet to outlet thereof. For example in a circular embodiment, the flow front may be considered cylindrical and the width may be envisaged by mentally unwrapping or projecting this cylindrical form onto a flat plane.

With regard to the inverse proportional and proportional relationships mentioned in claim 1, for the avoidance of doubt these do not need to be directly linear relationships and in many cases will not be. Indeed, the correlation in certain cases or positions may be so relatively slight or unapparent as to be insignificant and may be ignored as negligible.

The height of closed flow area inside the first conduit may increase substantially as a flow path through the first conduit encounters a section of the second conduit in many cases, such as in most cases when the section of second conduit is circular, oval, rhomboid or fish-scale shaped. However, there may be cases in which this is not the case, such as when the section of elongate horizontal sausage shaped or nearly rectangular, with sections of second conduit being spaced close enough together that any gap between them is non-existent or sufficiently small not to play a significant part in flow effects. Closed flow area inside the first conduit can include area which is closed to fluid in the first conduit due to the physical presence of second conduit therein.

The skilled person in the art is well versed in computational fluid dynamics and easily able to assess drag in this way using standard CFD software, or in some cases a model of the device with translucent surfaces may be constructed in order to observe the motion of a die stain sent through the first conduit to confirm a smooth flow of fluid through the device with equalised drag.

The external surface of the secondary conduit that is enclosed within the primary conduit may be considered to constitute an internal part of the primary fluid conduit since it is in contact with the primary fluid and flows its passage albeit intermittently. The principal/A most important achievement/advantage of the here disclosed invention is its minimal overall resistance to primary fluid flow without compromise of its high/optimal heat exchange efficiency which it achieves by equalizing the local flow drag throughout the primary fluids passage across the arrangement of secondary fluid's heat exchanging tube sections. We know that hydrodynamic drag is proportional to the both the flow velocity of the fluid and the area of bounding surface area that is passed. So in maintaining a constant/consistent resistance to flow throughout the primary fluids passage through the HXD we will find a relationship between the closed flow area (i.e. the area of a section of the fluid body as determined be a flow front), which correlates with the fluid's flow velocity (inversely), and the closed flow area's width (and height), which correlates approximately enough with the perimeter of this area and hence the amount of transited surface posing drag, given that the height/thickness of this closed flow area is uniform as advocated here (in the context of this invention), and small or generally insignificant in comparison/relation to the closed flow area's width.

Thus there is here a consistent relationship between the width of the primary conduit and its height. Whilst conformity to this relationship is generally lacking in the prior art of HXD's of a type here considered, and the degree of conformity (or deviation) varies from case to case, any degree of conformity is a circumstantial consequence to other factors or considerations and there is a conspicuous lack of evidence of demonstrated means to enhance/improve conformity to this relationship . . . in the conduit shaping of HXD's in the application context considered here.

This invention therefore claims the means of enhancing/improving adherence to the above described relationship by more appropriately shaping the conduit surfaces according to these dimensional considerations as forthwith described.

There are two general domains of embodiment of this invention, that may be implemented in various embodiments of HXD that regard:

1. The general context of the HXD, and changes in primary conduit height in correspondence with the conduit width over the passage of the arrangement of secondary conduits sections as a whole; and
2. The local context of individual secondary conduit sections, and the height (or thickness) of primary fluid conduit that surrounds each section of secondary conduit, whether adjacent to a neighbouring section of secondary conduit or the external boundary of the body primary fluid as defined by the primary fluid containing/conducting surface or the HXD casing.

Some preferred embodiments provide a cost-effective device for transferring heat efficiently from a free flowing fluid under a low head of pressure to a secondary fluid flowing under a higher head of pressure that may also prevent gas in the primary fluid's downstream environment from being released upstream. The principal application for this device is for recovering wasted heat from the drainage water under a domestic shower basin, for which its characteristics are ideally suited for implementations of limited height.

Some preferred embodiments provide a device that recycles heat by passive heat transfer from shower drainage water flowing under a low head of pressure to fresh water through flat horizontal arrangements of thermally conductive piping. It may be installed inconspicuously in place of an under floor waste water drainage U-type plumbing trap underneath the shower pan or floor surface, and may incorporate a foot-weight activated valve mechanism for both convenience of use and saving water. The application of this device should be of interest not only to the financial or natural conservationist, but also the more indulgent consumer, enabling a greater flow-rate, higher temperature or longer duration of hot-water output (or a combination of these) from any given domestic water-heating system. An extensive range of domestic shower fittings are nowadays widely commercially available such an oversize "rain effect" showerheads and lateral body jets which can typically require a flow rate of warm water supply 3-4 times greater than normal, for which a normal sized sanitary water heater may be rendered quite insufficient in capacity. The installation of this invention would not only avert the necessity of upgrading ones sanitary water heating facility with considerable expense but also provides a corresponding gain in the savings of operational costs.

The cost saving nature of some preferred embodiments of the invention is a good advance over many prior art arrangements. In some preferred embodiments a device (having suitable heat exchange efficiency) can be manufactured so economically as to be attractive for commercial distribution and widespread adoption, and financially justify the labour of its individual installation. Depending on the cost viability of more elaborate fabrication design requirements, variations in the embodiment of this device extend the flexibility and compatibility of its application to satisfy diverse needs of the consumer and commercial market.

One need addressed by some preferred embodiments is cost saving, so an important general characteristic is cost-effectiveness, being the combination of optimised heat-exchange efficiency with low cost of manufacture—both financial and environmental. Some preferred devices in accordance with the invention may be composed of few components of relatively inexpensive or commonly used material but, having in some cases an elaborate form, the cost of manufacture arises predominantly at the outset in the setup of the industrial process of shaping, and affordability is enhanced by the ability to make the device by mass production and universal employment. So being discrete in dimension, of flexible application and configuration, conveniently foot-operated, simple to install, use and maintain in practice, are also some important attributes also instrumental to redeeming the preparatory investment, and lowering its per item cost, as they favour popular adoption, widespread implementation, and extend beneficially the overall scope of its resource saving effectiveness.

Domestic shower basins are normally positioned directly above a drainage loop, which may be a linear U-bend, S-type or cup type plumbing trap, where remaining water prevents sewage gases from entering the domestic or otherwise inhabited environment.

During normal shower usage waste water runs out of the shower basin at a temperature significantly higher than the fresh water supply from which it is drawn, especially during the colder seasons or in colder climates, constituting an appreciable loss of energy, which over time amounts to a substantial expense, individually and collectively, of financial and natural resources—down the drain!

Preferred embodiments advantageously allow an efficient heat exchange with a highly efficient and effective counter current flow arrangement over a large surface area, while also accommodating the HXD discretely in a domestic context. The benefits of low cumulative resistance and compactness from a concentric arrangement are highly advantageous and allow for procuring the fluid dynamics most favourable for an optimally efficient heat exchanger that can operate under very low pressure.

In order to fully exploit the generally limited space available for implementing some preferred embodiments provide a relative flow pattern of the two fluids whereby the secondary conduits are a sequential series of thermally conductive horizontal tubular sections connected into a convoluted spiral, coil or serpentine formation packed as a sequential series of loops extending across the area which the shower pan expands, contained within a casing which conducts the primary fluid as a fluid layer obliquely across and around these tubular sections in a generally horizontal counter-current direction. This may be provided in some embodiment by a radial-flow arrangement whereby the drainage fluid enters the device at the centre of a number of horizontal flat convoluted spirals of thermally conductive tubing and flows radially outward to the periphery with the secondary heat medium flowing centripetally within the coiled tube, or with the flow directions reversed.

Some preferred embodiments include serpentine arrangements or horizontally orientated coils, so as to maintain optimal HX efficiency, with the flow of the surrounding heat medium beneficially being uniformly distributed sequentially across all parts of each loop leg or section.

Some preferred embodiments allow the transfer of recycled heat only to a heater's water supply if an output temperature approximates comfortably that which is desired at a shower head, or only to a cold inlet supply where heated water is supplied at a much higher temperature and the heat exchanger is highly efficient. However, preheating a flow rate at least equivalent to both hot and cold inlet supplies is ideal and generally preferable in most embodiments as this permits the heat exchange device to consistently perform efficiently.

Some preferred embodiments enable the integration of the gas seal functionality of a plumbing trap with a heat exchange device since not only is such a configuration compatible with the designed arrangements advocated here for highly efficient and effective heat exchange performance but by substituting and making redundant the conventionally used U-shape or S-shape plumbing trap, much needed space that the latter normally occupies and the pressure head that it uses can be appropriated and used most gainfully by the heat exchange device.

Some preferred embodiments also include a filter for catching extraneous matter such as insoluble particles of dirt, fabric, hair and/or debris before they enter a heat exchanging apparatus. This advantageously prevents accumulation and hindering the appropriate flow of drainage water and thereby affecting the efficiency and effectiveness of heat transfer. Some preferred embodiments enable the installation of the HXD under the shower basin and are generically adaptable to a range of installation contexts and a variety of different user requirements or priorities.

Some preferred embodiments feature:
(a) limited drag on waste water flow;
(b) optimal efficiency of heat exchange and usefulness of recovered heat;
(c) low cost of composite material construction, installation and operational maintenance; and/or
(d) compact dimensions such as can fit discretely under a shower basin.

Other advantageous features of some preferred embodiments are:
gas seal, variable/flexible/adaptable horizontal dimensions and position of drainage aperture, resistance to fouling or health hazards, accessibility for cleaning and maintenance, security and safety.

Other desirable features of some preferred embodiment are:
extensibility, recyclability or the incorporation of a foot valve.

Preferred embodiments provide a means of optimising heat exchange efficiency in liquid to liquid heat-exchangers of simple/elementary/economical construction that are extensible, dimensionally constrained and seal the free passage of gas/vapours and/or sewage gas.

A further aspect of the invention provides a heat exchange device whereby heat is transferred efficiently between a fluid flowing within thermally conductive tubular conduits and a fluid that envelops and flows as a layer obliquely around those tubular conduits within an enclosing casing. The inventor envisages the complementary shaping, arrangement and features of the fluid confining surfaces of these thermally conductive tubular conduits and the casing that encloses them, and which may be defined as the appropriate combination of a set of characteristic features, as the means of achieving a more balanced and uniform distribution of the appropriate fluid dynamic properties of the outer heat medium throughout its passage around the thermally conductive conduits of the inner heat medium.

The concepts used in some preferred embodiments of the invention may be applicable to a variety of contexts in various forms of heat exchange device which have however certain attributes in common, namely the provision of a system configured to enable fluid to flow as a layer in a consistent direction from one locus or edge to another locus or edge, in one pass, without folds or reversals of direction.

Some preferred embodiments include a structure which is arranged to provide the uniform distribution of an equalised or moderated local flow speed (and flow drag) of drainage water over a maximal expanse of heat-exchanging surface area (in simultaneous contact with a secondary heat mediating fluid) that can be arranged to fit in a body/volume of flowing drainage water of limited height within the confines of a typical shower pan shaped area.

A further aspect of the invention provides a method of adopting, positioning, sizing, shaping, arranging and integrating components/elements or features in the design and construction of a device for recovering heat from drainage water flowing naturally (by the pressure of its own weight) under a shower basin, subject to the necessity of economical, practical, safety and legal constraints: that functions by passive heat exchange without any operational costs; occupying a confined space limited by the horizontal dimensions of a corresponding shower basin/pan and a relatively low height (such as may be typical of an S-type plumbing trap); that distributes the flow of both the drainage water and a secondary heat medium in an optimally balanced, equalised or uniform manner over all the heat exchanging surfaces of the device; that generally minimises the speed of flow, and the hydrodynamic drag to flow, of drainage water as it passes tangentially over the heat exchanging surface area; that accommodates (hydro-dynamically) a maximal surface area of thermally conductive (heat exchanging) secondary medium containing conduit within the drainage fluid conduit upstream of an overflow section or weir; whereby the relative flows of the two media across the opposite surfaces of the heat exchanging element are in general counter-current arrangement.

Advantageously, in a preferred embodiment, a heat exchanger device is so constructed: that the body of primary drainage fluid transits across the HXD in one pass as a single fluid layer, without major/radical changes in general horizontal direction (so that the overall horizontal distance travelled by the primary fluid during its period of heat exchange does not exceed the overall dimensions of the HX component); that the primary conduit appropriates laterally surrounding space and is as wide as the confines of adjacent structures that may be allowed for the device's external dimensions; that the secondary fluid conduit should be a series of (one or more) similar conduits connected and aligned in parallel and in horizontal arrangement, either in tangential alignment with the direction of primary fluid flow, or obliquely aligned across the primary fluid flow as a series of adjacent convolutions or loops, or as hybrid combination of the two; that the secondary fluid should flow along a tubular conduit immersed in the primary fluid and generally in contact with both fluid heat media on all sides of its cross-sectional circumference, which may be circular or alternatively shaped; that the conduit surfaces should be smooth or specially treated to enhance the property of low frictional contact with aqueous fluid; that the underflow inlet and overflow outlet to the heat exchange section of the primary fluid conduit will have a horizontally level, consistently shaped or regularly patterned uniform surface that spans the horizontal breadth of the flowing body of primary fluid; that the primary fluid conduit will be so internally formed and the contained secondary fluid conduits so interspersed, by their shape and relative positioning, as to conduct a balanced distribution/division of primary fluid between the surfaces above and below the said conduits, with allowance being given also for any effect of variations in temperature, density or viscosity; that the thickness of the primary fluid laminar flowing around the heat exchanging surfaces is consistently as thin as the constraints of hydrodynamic drag allow.

Some preferred embodiments of the invention enable a number of advantages including that:
 (a) the ratio of thermal exchanging surface area to non-heat-exchanging surface area is high;
 (b) the ratio of thermal transfer to maximal natural drainage flow rate is high;
 (c) the average thermal gradient between the bodies of moving water and the heat-exchanging surface throughout the HXD is consistently high and steep;
 (d) the maximisation of the above three ratios in combination and with respect to each other being optimal;
 (e) the thermal inertia (thermal mass) of the working device is minimal;
 (f) the device is sturdy, stable and a precise shape;
 (g) installation is flexible; and/or
 (h) water economy is good, e.g. when used with an integrated under-floor valve.

According to a further aspect of the invention there is provided a heat exchange device arranged for the horizontal lateral expansion or extension of two heat mediating fluids such that drainage fluid (or liquid) encompasses a horizontally expansive surface area of heat exchanging secondary fluid conduit with a structure that:
 minimises or eliminates bends or acute changes in the general horizontal direction of drainage flow (minimising the overall ratio of hydrodynamic drag to drainage flow rate);
 limits the length of the drainage flow path (minimising overall drag to drainage flow ratio);
 minimises drainage flow velocity (minimising overall drag to drainage flow ratio);
 distributes evenly/optimally the drainage flow over all the heat-exchanging surfaces—during the drainage fluid's passage throughout the heat exchanging device (minimising overall drag to drainage flow and maximising net heat transfer rate);
 minimises the thickness of the layer of drainage liquid flowing around the heat exchanging surfaces (maximising the net heat transfer rate and reducing the devices thermal inertia).

Desirable characteristics of low drag and high heat transfer rate, being somewhat antagonistic, can be balanced so as to optimise the overall heat-transfer-rate to pressure-head-loss ratio, at the rate of drainage flow such as may correspond to the maximum that typically occurs in normal use for example of a shower system (as depends upon the mains water supply and the type/number of shower heads used). Preferred embodiments are also economical to produce.

According to a further aspect of the invention there is provided a device arranged to recycle heat passively through efficient crosscurrent heat exchange in a flat coil piping arrangement that performs effectively under a low head of flow pressure and at various flow rates, being optimally adapted for shower implementations, where it may be installed inconspicuously in place of an under floor waste water drainage U-type plumbing trap, and which preferably accommodates a foot operated or body weight activated valve mechanism for both convenience of use and saving water.

Some preferred embodiments enable a greater flow-rate, higher temperature or longer duration of hot-water output (or a combination of these) from any given domestic water-heating system. The concepts of the invention may be applied to an extensive range of domestic shower fittings, such as over-size "rain effect" showerheads and lateral body jets which can typically require a flow rate of warm water supply 3-4 times greater than normal, for which a normal sized sanitary water heater may be rendered quite insufficient in capacity. The installation of a device in accordance with some preferred embodiments not only averts the necessity of upgrading a sanitary water heating facility with considerable expense but also provides a corresponding gain (i.e. 3-4 times greater) in the saving of operational costs.

To accommodate a variety of flow-rate ranges according to ones intended usage, without compromising the devices optimised efficiency and cost-effectiveness, devices in accordance with certain preferred embodiments may permit incorporation of additional heat exchanging coiled pipe elements with radial battens inserted between the pipe elements acting as weight bearing spacers.

By virtue of their cost effective efficiency and effectiveness, it is envisaged that the concepts of the invention may be used in a wide of range of fields of employment as well as in some applications where alternative designs of heat exchange device have been commonly used. For example, anyone with the good fortune of having a natural spring or mountain stream running on their property, which may typically be too cold for sustained bodily comfort, could set up and maintain quite economically a warm water rock pool, swimming pool or hot spring-water spa, eliminating the expense, inconvenience and noxiousness of water sterilisation equipment, without pumping equipment or any running costs if linked to solar panels under natural siphon.

For clarity of illustration, the term "fresh water" is used here to refer generically to the fluid medium under a higher head of flow pressure, not necessarily being fresher or cooler, but generally an incoming supply of water at a temperature which may be undesired for the needs of application for which the HXD is employed. Similarly, the term "waste water" refers generically to the fluid medium under a lower head, generally after its use in the HXD having a temperature more desirable for the purposes of the application than the incoming medium. However, exceptions to the rule having a reversed plumbing arrangement can also be favourable.

According to a further aspect of the invention there is provided a heat exchanger device with one or more of the following features:

i. a pseudo-counterflow heat-exchanger mechanism: cross flow HXD that performs effectively more like a counterflow HXD with its corresponding efficiency, permitting a short and slow flow of waste water through the heat exchanger with a lower hydrodynamic drag and a high overall rate of passive drainage flow. The heat transferring medium is so conducted (by the arrangement of features described below) as to yield immediate heat transfer uniformly through almost the entire surface area of the receiving medium's conducting pipe, throughout its passage in the HXD;

ii. Low equalised thermal inertia: i.e. the volume of each medium in the HXD is minimal and relatively balanced, favouring quick time response and generally direct uniform instantaneous heat distribution; enhanced by the casings low thermal conductivity and surrounding insulation;

iii. Sturdy (weight sustaining) structure—with the weight bearing radial ribs and battens, and the in situ support of a surrounding concrete bed;

iv. Installation flexibility—Extensibility with multiple setup configurations, consequent to the casings rotational symmetry regarding plumbing connections, and additional coiled pipe securing radial batten inserts;

v. Water economy convenience: favouring or facilitating the implementation and usage of a foot operated self-closing water supply valve in simple plumbing configurations; and/or vi. Aesthetically inconspicuous—with hidden installation under the normal shower basin or floor tiling of ones personal choice.

vii. Low/simple maintenance (as described below) Optimal useful heat exchange occurs in passive fluid-fluid counter-current heat exchangers where the heat capacity of the volume of waste water displaced by its flow rate equals the heat capacity of the volume of fresh water displaced by its flow rate (in the temperature range between that of the cool fresh water and that of the warm waste water)—i.e. effectively when both have the same flow rates. This is most easily and usefully achieved by using the fresh water from the mains supply that displaces and replenishes the water drawn by the shower (i.e. supplying both the shower's hot water inlet via the domestic water heater and the cold water inlet).

In some embodiments, a domestic water-heater may supply a single (heat-recycling) shower, and may have water supplied exclusively via a shower's heat exchanger. If the shower is independently set up with its own dedicated water heater, then the unit/device can conveniently be actuated by a valve within the HXD, and operated by foot on the drain hole cover or by body weight on the basin itself through a mechanism incorporated within the HXD. As bathers commonly keep their eyes closed when washing hair and use both hands whilst applying or rinsing out shampoo, they typically either move away from the water spray whilst they do so letting it run somewhat wastefully, or risk inadvertently displacing something (shampoo bottle or previous temperature setting) when attempting blindly to relocate and reopen the tap. The operation of hand operated self-closing valves is also an inconvenience to use whilst rinsing soaping agents from ones hair and body, which the foot-or-weight operated valve presented here obviates, as well as saving water.

It is also suitable for small setups of multiple showers having centralised water heating, such as at sports facilities changing rooms, where the temperature may be preset as standard. The HXD tubing coil may in some cases be of larger diameter, but the collective efficiency of heat exchange would be similar in principle.

Other less trivial configurations may include coupled or/and hydraulically actuated valves for effective operation, as this provides a balancing of flow rates through the HXD, and benefit from an additional circuit of water piping that supplies fresh heat-reclaiming water to the water heater from all its hot-water outlets.

According to a further aspect of the invention there is provided a fluid-to-fluid heat exchanger whereby a fluid flows as a layer that envelopes an arrangement of thermally conductive conduits, (flowing) obliquely and sequentially across/around said conduits which consist of one or more series' of similarly oriented adjacent conduit sections in which another fluid flows separately and (reverse-) sequentially, whereby the surfaces of said conduits are so shaped and arranged as to provide a means of balancing and more uniformly distributing the resistance to flow of said fluid layer over/throughout the course of its passage across the heat exchanging surfaces of the said thermally conductive conduits.

The internal/enveloping surface of the fluid layer conduit may be so shaped as to contour nearby/adjacent thermally conductive conduit surfaces, preferably at a consistent offset distance or a distance that is related inversely to the length of said thermally conductive conduit being concurrently traversed.

The fluid layer conduit may consist of a plastic casing in two or more components comprising a base, and a lid which extends laterally over the arrangement of heat-exchanging conduits. The lid is preferably removable so as to allow the non-destructive disassembly and reassembly of said thermally conductive conduits in situ (from/to the base).

The device may have a flow balancing baffle at the inlet to the heat exchange zone. The baffle may comprise a perforated surface or crenulated ridge through which the said fluid layer may flow at a generally uniformly distributed rate. Accordingly, local variation in resistance to passing fluid flow through any part of the baffle, resulting from variations in size, shape and proximity of said perforations, may compensate to a substantial degree for local variations in flow pressure acting upon said passing fluid as it approaches said part.

The device may have a flow balancing baffle at the outlet of the heat exchange zone. The baffle may comprise a perforated surface or crenulated ridge through which the said fluid layer may flow at a more uniformly distributed rate. Accordingly, local variation in resistance to passing fluid flow through any part of the baffle, resulting from variations in size, shape and proximity of said perforations, compensates to a substantial degree for local variations in flow pressure acting upon said passing fluid as it leaves said part.

Conduits of secondary fluid may consist of multiple layers of similarly shaped conduits stacked in parallel and interlaced or staggered with respect to their neighbouring/adjacent arrangements.

The thermally conductive conduits may have a rhomboid cross-sectional shape. The thermally conductive conduits may have a cross-sectional shape reminiscent of fish scales. The thermally conductive conduits may have an oval cross-sectional shape. Said thermally conductive conduits may comprise of more than one physical tubular surface, coaxially layered, such as a double-walled conduit or a pipe with an external surface treatment/coating.

A said thermally conductive conduit's cross-sectional shape may vary according to its location within the surrounding fluid layer's conduit as a means of balancing and equalising the local fluid layer thickness and complete transit time taken by any part of the fluid layer over/during/throughout its entire passage across/around the heat-exchanging surfaces.

A variable spacing may be provided between adjacent rungs (or sections) of the secondary fluid conduit which is generally related inversely to the length, width and/or cross-sectional area of the thermally conductive conduit being traversed. The variable spacing may be achieved with concentrically aligned coils having interstitial spacing inversely proportional to the cross dimension or cross-sectional area of the device, or the radius in the case of a circular device.

Adjacent layers of conduit may converge (or diverge) as a means of further varying the interstitial space vertically surrounding the heat exchanging conduit sections.

The exit means may additionally or alternatively consist of a drainage collecting channel with a horizontally level overflow rim or series of apertures that flanks the length of the first section of thermally conductive conduit that it comes into contact with. This may engender a more balanced and uniformly distributed flow of fluid into said fluid layer.

The device may include with a horizontally level underflow rim (or series of apertures that flanks the lateral width of the fluid layer) upstream and below the level of the said overflow rim such that the device may act as a gas sealing plumbing trap or a means of preventing the free back-passage of vapours associated with the fluid layer conduit's drainage system.

The device may have a sediment trap.

The device may be outwardly or inwardly (e.g. radially) flowing with /U bend rims, with means for filtering particles suspended or carried within the said fluid layer.

The device may include a propulsor for the propulsion of the primary fluid through the arrangement of said secondary fluid conduits.

The propulsor may comprise a fan or fluid pump

The propulsor may comprise a primary fluid pump motivated by secondary fluid flow.

The device may comprise an air conditioning device.

The device may comprise a device for cooling a heat transfer medium for refrigeration purposes.

According to a further aspect of the invention there is provided a fluid-to-fluid heat exchanger incorporating a check valve arranged actuate the passage of fluid through a heat exchanging conduit. An actuator for the valve may be provided, the actuator being arranged to be operated by the weight of a person. The actuator may be arranged to act upon the weight of a person located on a surface arranged to drain fluid into a heat exchanger through which said heat exchanging conduit is led.

In some preferred embodiments in accordance with the invention, the maximal lateral extent of said fluid layer is greater than the net horizontal distance traversed by said fluid layer during is complete transit across the heat exchanging conduits, or greater than half said net horizontal distance, and the latter net distance is substantially greater than the (overall/maximal) thickness of said fluid layer.

In some cases, a primary fluid may transverse HX conduits at an indeterminate or variable angle of obliqueness, that is not perpendicular to the orientation of HX conduit sections where said HXD is structurally integral to a shower cubicle, enclosure or structure for showering or other facilities.

In some preferred embodiments, devices in accordance with one or more aspects of the invention may be installed and superimposed or overlaid above an existing shower drainage pan.

According to another aspect of the invention there is provided a device for heat exchange between two fluids where one flows in one or more horizontal flat coils of conduit, or spirals of conduit having the form of a horizontally based obtuse conical or pyramidal frustum's lateral surface, interlaced or layered, submerged in the other fluid which operationally flows radially between the coils centre and perimeter, across and around the said conduit in the opposite general direction to that of the spiraling conduit whereby the shaped fluid containing surface of the device casing induces, facilitates or enhances a uniformly distributed pattern of flow transversely over, under or interstitially between all exposed parts of the said conduit evenly throughout its length.

The device may perform as a plumbing trap in blocking the free flow of gases through the conduits of the interstitial heat mediating fluid.

Another aspect of the invention provides a foot-operated or bodyweight-activated valve mechanism which is arranged to regulate the supply of fresh water through a heat exchanging device to a shower. Another aspect provides a heat exchanger including such a mechanism, or a shower includes such a valve mechanism.

The device may have wholly or in part or in any combination any such features or characteristics as: being comprised of a base and a lid which can be non-destructively dismantled and reassembled; having radial ribs or battens that secure the coiled conduit in a precise position; having a shaped surface, ribs, gullies or ridges that follow or contour the coiled conduits shape or passage; having a circular horizontal overflow rim which may be smooth, crenellated or regularly patterned along its circumference; having a low-friction and/or adhesion resistant medium-containing surface or one treated to become so; having perforations in the lid or upper internal surface that facilitate the appropriate venting and purging of gases from the fluid containing chamber where heat exchange may occur; being enhanced by the close fitting cladding of thermally insulating material; having one or more removable, maintainable or cleanable protective filters for the interstitial heat mediating fluid; whose coiled conduit are not of circular cross-section but elliptically or otherwise hydrodynamically shaped in any part; having fins or fences on the fluid containing surfaces in alignment with the fluids radial or generally intended direction of flow through the heat exchanger; having holes or channels to facilitate the natural drainage of the heat exchange device in situ for cleaning or maintenance purposes; having a means for binding its parts and securing the robust structural and functional integrity of the assembled device; having features that facilitate the functional incorporation of a valve or valve actuating mechanism within its assembly; having a stoppered bypass conduit that enables the interstitial heat mediating fluid and/or residue from it to be drained directly without passage through the heat exchange chamber; having an attachment enabling an external overflow inlet to be drained directly bypassing the heat exchange chamber via a U-bend trap in the device; having features and fittings that allow plumbing conduits to pass through the devices fluid containing casing in a water-tight secure manner at any number of places; having a remotely actuated valve allowing the interstitial thermal medium to drain circumventing the heat exchange chamber; having a head stabilising extended space around the open inlet conduit that can accumulate the interstitial heat mediating fluid above the level of the overflow rim; having features or being shaped in a way that enhances its secure and appropriate setting in cement or concrete or on a flat level surface; having an accessory that channels or funnels the inflowing interstitial heat mediating fluid to the device's central inlet aperture from a different position.

The device may be reconfigured in a variety of ways to accommodate and functionally integrate additional coiled heat mediating fluid conduits of similar type in combination with appropriate plumbing connections, interposed radially aligned spacers for maintaining the said conduits precise positional arrangement and such additional parts as may be required to maintain or enhance the appropriately uniform distribution of heat mediating fluid through the device and the devices general structural stability.

Another aspect of the invention provides a shower basin with an annular drainage outlet consisting of two detached parts whereby a central part is positioned inside a similarly shaped but slightly larger hole in a perimetrical part, and whereby both parts are so shaped that they may be set to align with or rest securely upon an existing device such as referred to above in a way that particularly complements or enables the device's appropriate function.

According to a further aspect of the invention there is provided a heat exchanger device arranged for heat transfer between a fluid arranged to flow along thermally conductive heat exchanging (e.g. tubular) conduits, which are preferably arranged in a sequential series of parallel or similarly oriented sections, and a second fluid which is arranged to flow as a layer, preferably sequentially across and obliquely, all around the said thermally conductive conduit sections, whereby:

(a) The layer fluid is arranged to flow consistently (preferably ignoring the effects of surface drag on local flow) throughout its thickness (singly) in a coherent direction in one pass without folds or reversals of direction from one locus or edge to a different locus or edge uniformly transiting all parts of the layer;

(b) the thermally conductive conduits consists of one or more similarly shaped arrangements of parallel sections in series whose orientation and sequence are in general alignment with the layer of surrounding fluid, preferably wherein each arrangement is a convoluted spiral, coil or serpentine series of loops;

(c) multiple arrangements of thermally conductive conduits are stacked in parallel with each other and the surrounding layer of fluid and may be staggered in such a way that neighbouring sections of adjacent layers are interlaced; and/or (d) the flow speed and resistance to flow posed by the conduit surfaces of the device are substantially (and contrastingly) higher for the fluid travelling within the thermally conductive conduits than for the surrounding layer of fluid.

For conduit shapes and arrangements that are perfectly regular with inlets and outlets that are collinear, the layer of fluid may flow consistently within its lateral extents (throughout its cross section of flow) at a coherent relative speed such that the time taken for fluid to transit between the inlet and outlet zones along any line of flow across/throughout the fluid layer is equalised.

The primary fluid may be a liquid and may enter the device from above (or laterally with a pressure head higher than the upper level of the device), so that it flows under a horizontally level rim, and subsequently over a horizontally level rim positioned downstream and above the height of the arrangement of heat exchanging conduit sections. The device may accordingly act as a plumbing trap to seal/prevent passage of gases associated with the primary fluid downstream. Said rim may alternatively comprise a horizontally level series of apertures arranged to enhance the uniform distribution of fluid flow laterally across its layer.

Certain particularly good embodiments may:
(a) balance counter-current flow;
(b) have conduit submersion; and/or
(c) have appropriate materials, such as Copper and plastics.

The prior art relating to radial flow heating exchangers either lacks ideal distribution of flow for want of a means to maintain it or has such a distribution for want of a means that loses it (e.g. radial flow heat exchanger GB1300294: where the fluid supply and outlet conduits are supposedly coaxial/ central and normal to the direction of radial flow). In contrast, in certain effective embodiments of the present invention, means are advantageously provided to substantially compensate for disturbances to the perfectly balanced distribution of flow. The layer of fluid may flow consistently within its lateral extents (throughout its cross section of flow) at a coherent relative speed such that the time taken for fluid to transit between the inlet and outlet zones along any line of flow across/throughout the fluid layer is equalised, even if the thermally conductive conduit is not a correspondingly/perfectly regular shape.

Embodiments in accordance with the invention may advantageously reduce or counteract or compensate for local variations of flow speed within the lateral extents across the body/layer of (outer) fluid (surrounding the heat exchanging conduits) as it approaches or separates from the arrangement of heat exchanger conduits, such as would result from a one-sided fluid inlet or outlet. This may be achieved by the provision of a drainage liquid collection channel that flanks the entire lateral extent of fluid layer as it approaches initial thermally conductive conduit sections, having a horizontal overflow rim or distribution of fluid apertures that increases in size/frequency with height.

Embodiments in accordance with the invention may be provided with a local, lateral or preferentially positioned inlets or outlets so as to advantageously reduce or counteract or compensate for variations in local flow speed/rate and resistance to flow (posed by the shape and spacing of the adjacent conduit surfaces) as fluid traverses around and between sections of thermally conductive conduit. This may be achieved by employing tubular conduits with cross-sectional shape that when juxtaposed in an interlaced arrangement give a more consistent and uniform gap of separation from adjacent (interlaced) conduit sections (e.g. with rhomboid/diamond or "fish-scale shape"). An enclosing conduit around the thermally conductive conduit may have contoured surfacing arranged to reduce or counteract local variations in thickness of the body of fluid surrounding the outer surface of thermally conductive conduit sections. This may advantageously limit the internal pressure to which the thermally conductive tubular conduits may at any time be subject to. This may also facilitate water conservation and operational convenience, especially when a bodyweight-operated check valve is employed for controlling flow through the device.

The layer of fluid may flow consistently within its lateral extents (throughout its cross section of flow) at a coherent rate of flow relative to the surface area of thermally conductive conduit being generally traversed at any given time.

According to a further aspect of the invention there is provided an apparatus having first and second flow path enclosures for having a flow distribution pattern for two fluids, the fluids comprising: 1) a primary, external/outer surrounding or drainage fluid arranged to flow substantially as a layer at a relatively slow speed under a relatively low head of pressure within a conduit space of the first flow path enclosure that has a generally large (wide in particular) cross-sectional area normal to its direction of flow, and 2) a secondary, internal/inner enclosed fluid arranged to flow at a relatively high speed under a relatively high head of pressure within a conduit space of the second flow path enclosure that has a generally small cross-sectional area normal to its direction of flow, the inner/enclosed fluid being arranged to circulate in one or more similarly shaped arrangements of thermally conductive tubular conduit. Said arrangements may be in the form of a convoluted spiral, coil or a sequential series of loops. Each loop or turn of the spiral/coil may consist of two sections that are adjacent to each other (running alongside or parallel in similarly oriented but opposite directions) and neighbouring loop sections that are consistently in alignment with (and therefore at a consistent distance from) a two-dimensional region or surface.

The first flow path enclosure may be arranged such that the outer/drainage fluid flows as body of fluid incorporating/submerging the above described sections of thermally conductive conduit around and across which it flows obliquely and sequentially. This fluid body may have the overall form of a layer whose shape and location also corresponds to the two-dimensional region or surface described above.

Both the primary and secondary fluids may flow through their respective conduits between two loci or zones within this fluid layer, whereby each locus or zone may be the region adjacent to a section of the fluid layer's edge or the region adjacent to a midpoint or midsection on the fluid layer's surface.

An inlet zone of the primary fluid may correspond to an outlet zone of the secondary fluid and an outlet zone of the primary fluid may correspond to an inlet zone of the secondary fluid.

This surface or region may be regarded as lying within a space enclosed within two proximal parallel planes such that the distance between these two planes is substantially less than the lateral extents of the region (expanded by the fluid or their conduits where heat exchange/transfer may take place).

The surface of the general flow layer may incline progressively between the fluid inlet zones and the outlet zones such that it may take the shape of a flat or gently inclining surface (where both inlet and outlet zones lie on the edge of the fluid layer), or an obtuse cone/pyramid/frustum, flat surface or a combination of these (where either an inlet or outlet zone is located internally within the fluid layer).

Either the inlet fluid source or the outlet of the primary fluid may be coplanar with the general flow layer and not equidistance from all loci of entry to or exit from the heat exchange zone, thereby requiring a means to compensate for a disbalance of flow distribution at that juncture.

This fluid flow distribution pattern may comprise a transition from a localised source of fluid flow to a laterally distributed body of flow that obliquely traverses a series of tubular conduits down a uniform/moderated/consistent pressure gradient and back to a localised (tubular) body of flow, where either the source/initial, the outlet/final or both fluid channels are not directionally congruent with the laterally distributed body of flow.

The outer drainage fluid may be a liquid, in which case this surface or region may be arranged to be substantially planar and horizontally level, such that the fluid layer flows within a horizontally flat space of limited depth, which may allow for small variations in shape or inclination.

According to a further aspect of the invention there is provided a fluid flow apparatus including a combination of a set of features that affect the local relative speed of flow of a fluid in all parts of a certain type of heat exchange device where a temperature gradient may occur in the flowing heat media such that:

(a) the resistance to flow of the fluid medium flowing under a low head of pressure is equalised throughout the fluid body's section normal to its direction of flow between the lateral extents of the fluid layer;

(b) the resistance to flow of the fluid medium flowing under a low head of pressure is generally equalised throughout the fluid body's section normal to its direction of flow between both surfaces of the fluid layer;

(c) the resistance to flow of the fluid medium flowing under a low head of pressure is generally equalised over the duration of its passage across the device's heat-exchanging surfaces, and/or (d) the thickness of fluid medium locally surrounding the heat exchanging surface of the tubular conduit sections is generally distributed and reduced over all sides so as to be equalised over the duration of the fluids passage across and between each subsequent conduit section, such that local speed of fluid flow of outer heat medium as it approaches, passes around and separates from each subsequent section of thermally conductive conduit is equalised.

According to a further aspect of the invention there is provided a fluid-to-fluid heat exchanger including thermally conductive tubular conduits arranged for the flow of a first fluid in a convoluted, spiraled, coiled or serpentine arrangement of a series of loops exchanging heat with a second fluid flowing in an enclosing conduit around and obliquely across those thermally conductive tubular conduits, in a general/overall counter-current direction, the thermally conductive conduits being arranged in a series of interlaced layers through and in-between which said second fluid traverses obliquely; said enclosing conduit surrounding said thermally conductive conduits and having a conduit surface which is relatively non thermally conductive and which is shaped and positioned to generally complement closely the connected outer surfaces of said thermally conductive conduits.

Intra-layer spacing of adjacent sections of thermally conductive conduit may be variable. This may advantageously enable the resistance to flow acting upon the surrounding fluid to be equalised or more uniform.

A separation distance between adjacent conduits may be equalised or more uniform. The speed of fluid flow around all sides of the conduit may be equalised or more uniform.

The above factors may be increased or decrease to be generally consistent with other sections of the heat exchange device.

As the surrounding fluid approaches, passes around and separates from each thermally conductive conduit, its hydrodynamic properties may be increased or decreased consistently by variance of the offset distance of the enveloping conduit surface and the intra-layer spacing between adjacent sections of thermally conductive conduit and the inter-layer spacing (as may be appropriate). This may be achieved by providing the thermally conductive conduits with a tubular cross-section that may be rhomboid, elongated, fish-tail shaped, bottle-profile shaped, lips-outline shaped, or hybrids or variations of these. It is also envisaged that variance of the cross-sectional shape so as to change its overall height or length (e.g. square to a progressively flatter rhombus) may be provided.

An offset distance of the enveloping conduit surface and the intra-layer spacing between adjacent sections of thermally conductive conduit and the inter-layer conduit section spacing may vary in between different embodiments.

Convergence and coincidence of adjacent layers of conduit sections may vary between different embodiments.

Flow fences and/or local flow restricting passageways may be provided for the flow in the surrounding fluid.

According to a further aspect of the invention there is provided a heat exchange system comprising the check valve or bypass associated with or integral with or within an under-floor heat exchange device for controlling the flow of a secondary heat medium flowing therein under a higher head of pressure for supply water for a domestic shower or a heated water facility.

An articulated surface, lever, tap or thermally conductive device may be provided for controlling the check valve.

An actuating mechanism may be provided for effecting a change of operational state in the check valve resulting from a change in thermal state of the controlling thermally heat conductive device.

The check valve/bypass may be integrated in an under-floor liquid-to-liquid heat exchange device arranged to transfer heat from shower drainage water fresh water supplying the shower or a heated water facility.

This may advantageously provide an enhancement for an under-floor shower drainage heat exchanger that:
(a) facilitates water conservation/economy;
(b) facilitates operation (or provides more convenient usage) of showers;
(c) reduces the general internal pressure load within the fresh water conduits of an under-shower heat exchanger thereby reducing the risk of leakage, structural stress or distortion or failure of the devices structural integrity; and/or
(d) enables the usage of heat exchanging conduits of non circular cross-sectional shape without distortion or loss of structural and functional integrity.

The system may be provided with an articulated or independently moveable surface within, above or as part of a shower drainage pan, which on sustaining a person's body weight can actuate the opening of the check valve. This may be a grid made of wood, plastic or other material, or a plastic drainage pan that nests on and in the HXD top.

The surface may be of a circular, polygonal/rectangular or other shape taking up the greater part of the shower's drainage water collection area and allowing drainwater to run off in a relatively uniform manner into an internal aperture or a gap separating it from the peripheral surface of the drainage collecting shower pan.

One or more rods, levers or cables/chords under tension, roller wheels, pulley wheels, hinges, springs or/and compressible cushions (such as may be made of rubber) may be provided for articulating the valve.

The present invention may be carried out in various ways and a number of embodiments of heat exchanger devices in accordance with the invention will now by described, by way of example with reference to the accompanying drawings, in which:

FIG. 1 shows an open view from above of a preferred embodiment including a single-layer an octagonal (or generally circular) centrifugal HXD casing;

FIG. 2 shows a mid section lateral view of the HXD casing of FIG. 1;

FIG. 3 shows a mid section lateral view of a preferred embodiment including a quadruple pipe circular centrifugal HXD for standard ceramic basins;

FIG. 9 is an open view from above of the apparatus shown in FIG. 8;

FIG. 10 shows a lateral mid section of a preferred embodiment of a rectangular HXD having a pair of composite material flattened side-coils;

FIG. 11 is a section through the apparatus of FIG. 12 taken near one end thereof;

FIG. 12 is a plan view taken under a lid of the apparatus shown in FIGS. 10 and 11;

FIG. 15a shows a lateral mid section through an HXD drain hole valve insert and foot valve mechanism for use with the embodiments of FIGS. 1 to 14;

FIG. 15b shows a perspective from above of part of the apparatus shown in FIG. 15a;

FIG. 16 is a schematic section from above of the device of FIG. 15a;

FIG. 18a is a plan view from above of a preferred casing lid for HXD with centripetal flow;

FIG. 18b shows a lateral section through details of the lid of FIG. 18a's external spine with compressible cushioning strip;

FIG. 18c shows a lateral mid section through details of the lid FIG. 18's external spine with chord tensioning mechanism;

FIG. 18d is a mid sectional view through the valve and actuating mechanism;

FIG. 19a is an open view from above of a preferred embodiment having a square shaped HXD casing;

FIG. 19b is a lateral sectional view of preferred piping and casing allowing for relatively fast flow;

FIG. 19c is a lateral section showing another preferred arrangement of piping and casings allowing for slower flow;

Figure 4:
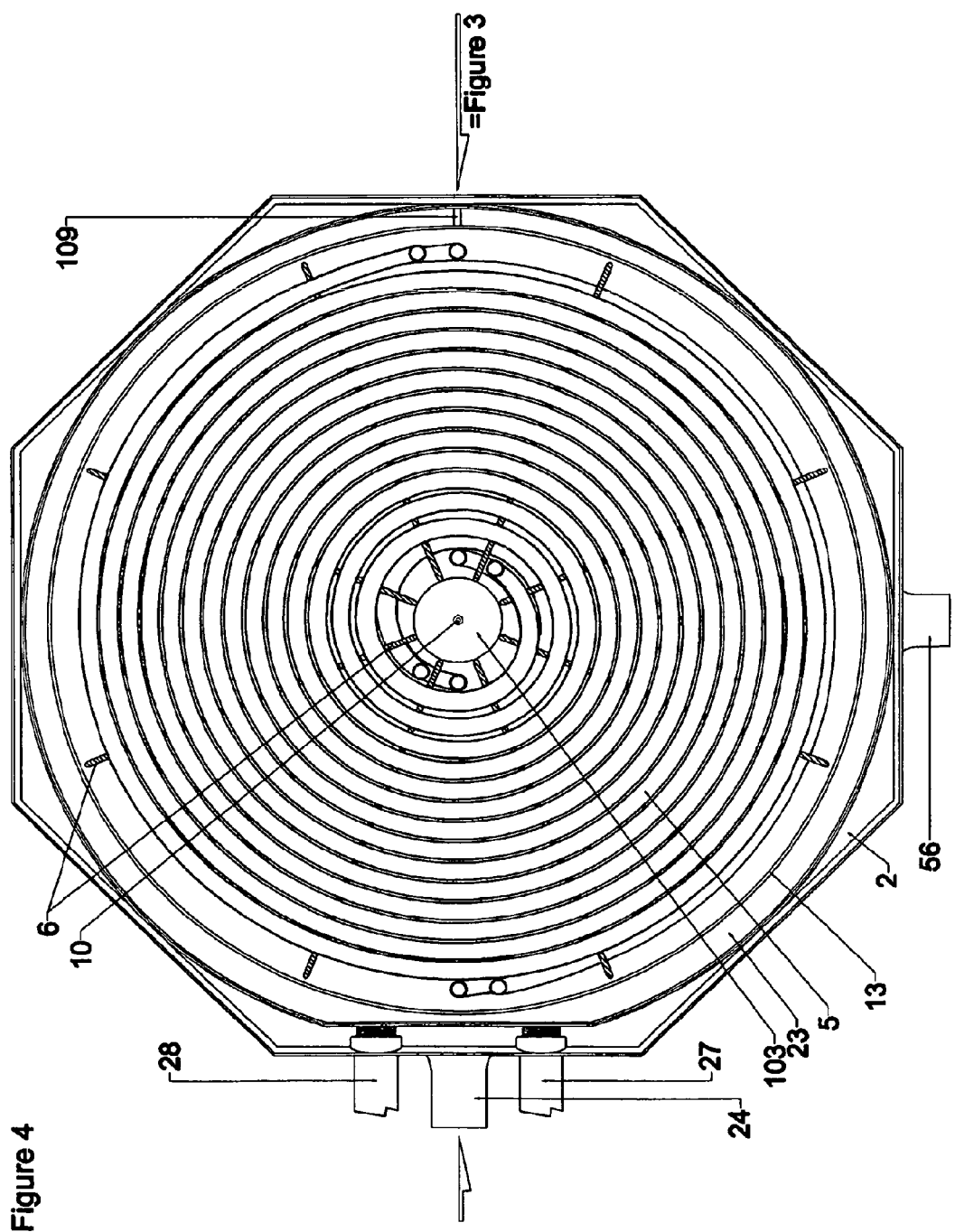
FIG. 4 shows an open view from above of the apparatus of FIG. 3.
Figure 5:
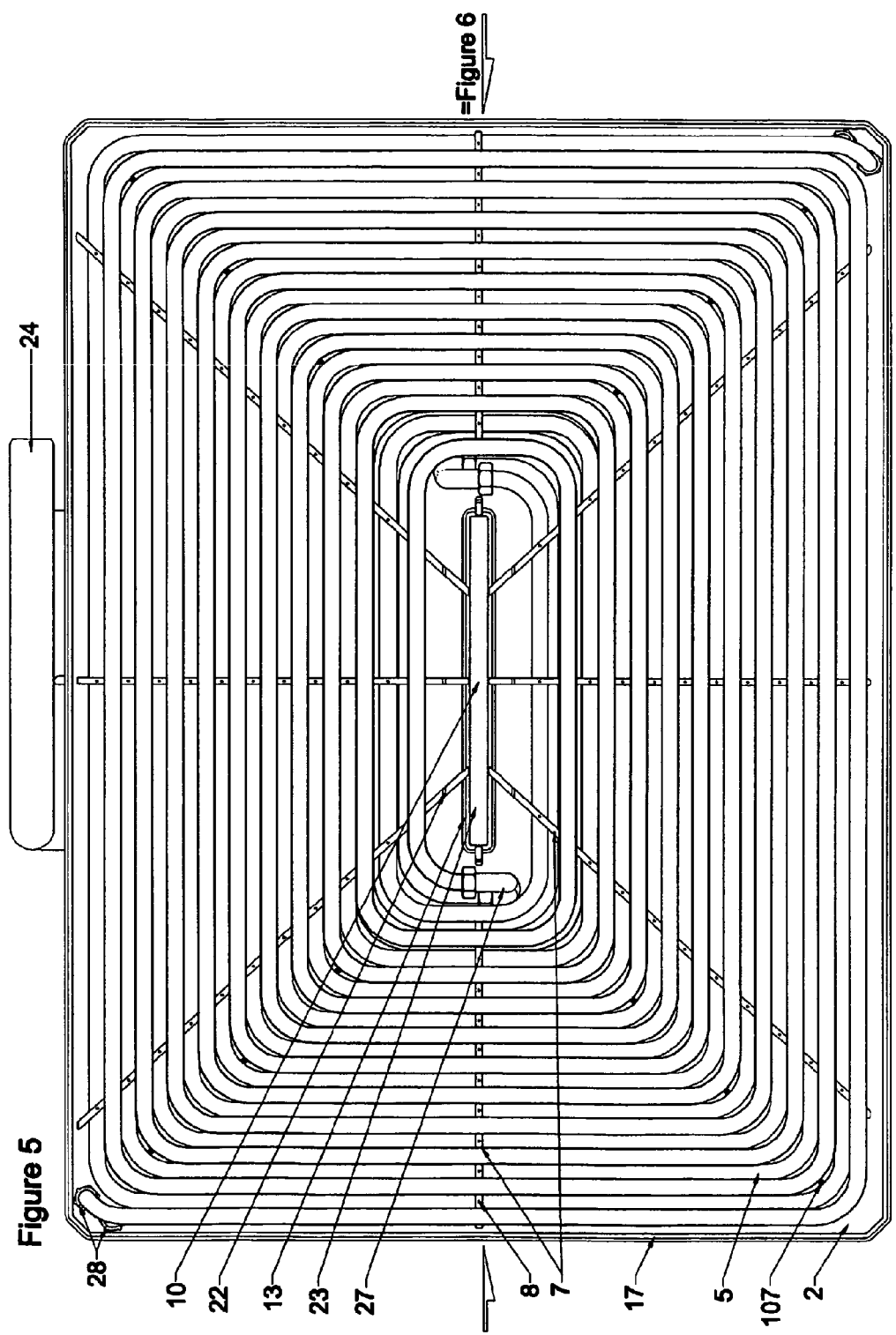
FIG. 5 shows a plan view from above of preferred embodiment having a rectangular convoluted centripetal HXD.
Figure 6:
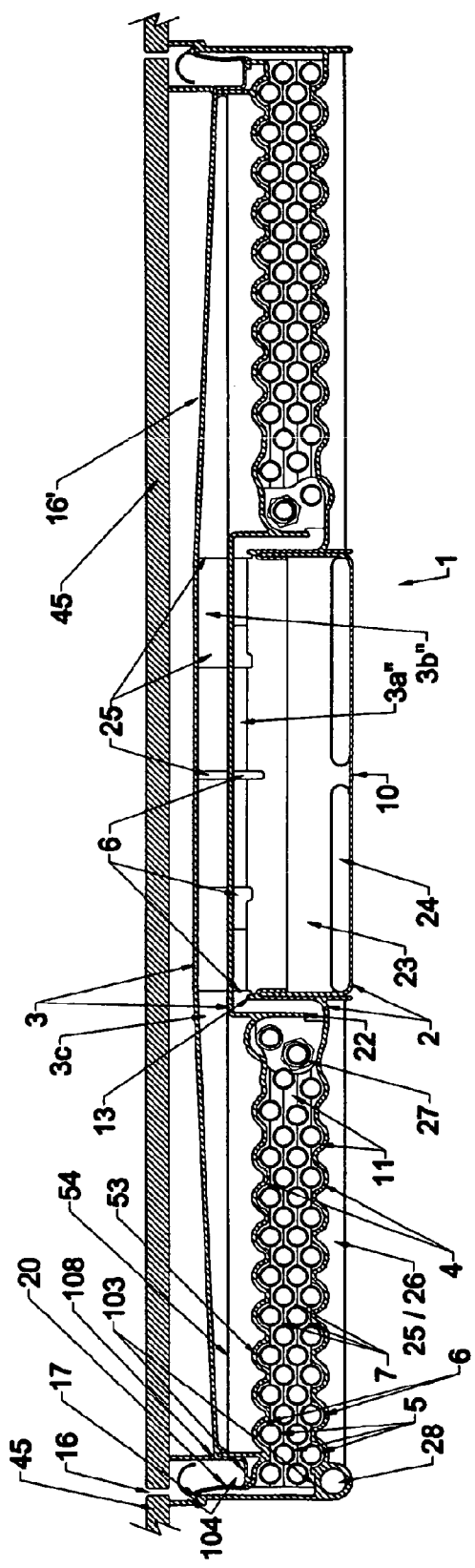
FIG. 6 shows a lateral mid section view of the apparatus of FIG. 5.
Figure 29A:
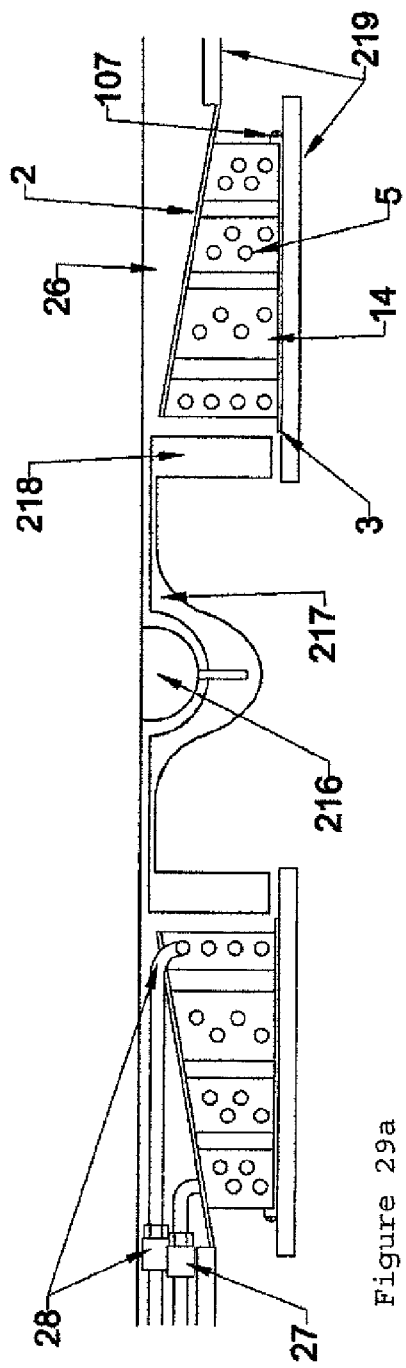
Figure 29B:
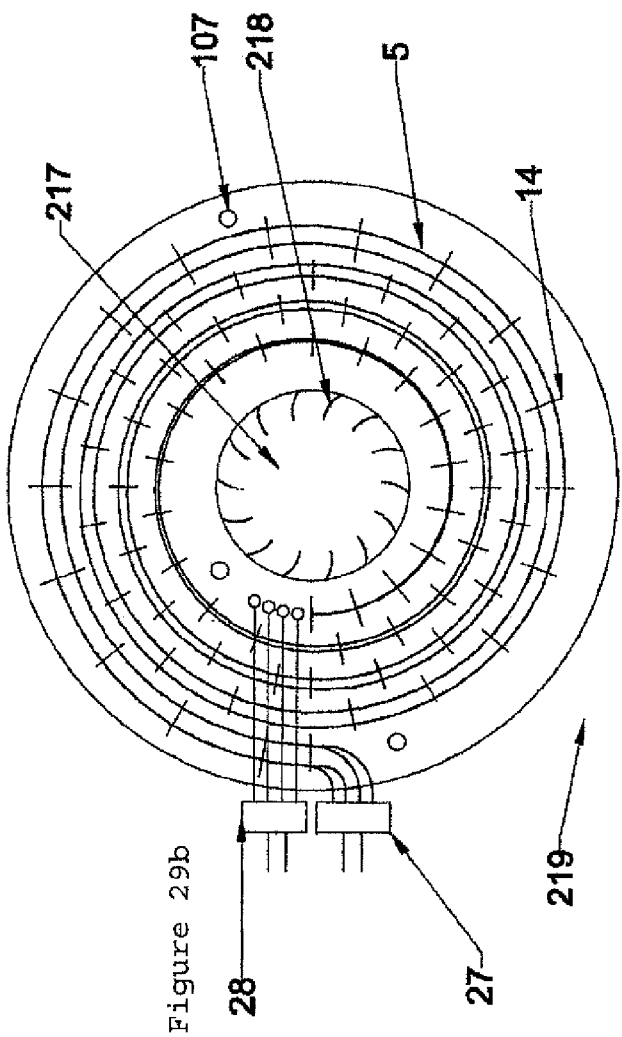

FIGS. 22 a and 22 b are views of a check valve actuator hydraulic mechanism with flexible tubes in star-shaped loop arrangements;

FIG. 23b shows a vertical valve actuating piston and central distributing spindle and may be applied in embodiments such as those of FIGS. 5 and 6;

FIG. 23c is a side view of roller push point;

FIG. 23d is a plan view of push points, central spindle and connecting cords;

FIG. 24a is a lateral section view of a vertical piston valve actuating mechanism with drainage pan;

FIG. 24b is a lateral section of vertical piston valve actuating mechanism with wooden grid platform;

FIG. 24c is a plan view of a pivoting wooden grid platform showing access to a check valve for use in a system as shown in FIG. 9;

FIG. 24d is cross-sectional plan view of the pivoting wooden grid platform of FIG. 24c removed;

FIG. 25 is an enlarged plan view of push points;

FIG. 25a is a plan view of push points;

FIG. 26 shows push points (vertical piston with collar) applicable to FIGS. 2 and 3;

FIG. 27a is a plan view showing tension spring and valve actuating push points and connecting cords;

FIGS. 27b and 27c show a spring mechanism (piston and clamped cylinder), and end view of cylinder, respectively, for use in systems such as shown in FIGS. 1, 4 and 12;

FIG. 27d is a plan view of a cabled roller push point;

FIG. 27e is a profile view of the apparatus of FIG. 27d;

FIGS. 28a to 28d are views of a domestic refrigeration unit incorporating an HXD in accordance with a preferred embodiment; and FIGS. 29a and 29b show an embodiment for use in air conditioning of buildings.

For diagrammatic simplicity and easy of visualisation, the lateral section views show the secondary conduit arrangements in cross-section but not in the background.

Whilst this description relates to a low height low pressure-head fluid-to-fluid passive heat exchange device that may have many other appropriate applications, it will be illustrated here primarily in the context of sanitary showers, for which it is ideally suited.

Whilst a HXD device can be used reversibly to exchange heat effectively in either direction depending on the relative temperatures of the fluids involved, the description given here will refer to its principle application and context wherein the heat donating medium referred to here as the primary fluid is warm "waste water" flowing from a shower basin through the HXD to a drainage system by the low head of pressure of its natural free flowing weight, and the heat receiving medium referred to here as the secondary fluid is "fresh water" supplied under a higher head of flow pressure, at a substantially and generally undesirable colder temperature than the primary fluid (for the purposes of this application).

Similar reference numerals denote similar components in different embodiments.

FIGS. 1 to 4 show two octagonal bordered circular embodiments of centrifugal radial flow HXDs, suitable though not exclusively for use with a shower pan, each having a casing 1, casing base 2, and casing lid 3 defining an inner heat exchanger chamber 3a.

Each embodiment features a convoluted circular spiral shaped secondary conduit 5 with a "fish-scale" section, having a generally circular convex portion 5a extending around a majority of a periphery thereof and two symmetrical concave portions 5b joining one another at a point 5c in one (FIG. 2) or four (FIG. 3) layers, through which fresh water may flow centripetally from inlet attachments 5d at a periphery 5g to outlet attachments 5e near the centre of the casing 1. In operation, shower waste water drains through a folded conical filter 20 into a space 20a at the centre of the casing 1 and therefrom generally radially and obliquely across and around each rung or turn of the convoluted spiral conduits 5 sequentially, through an optional perforated wall 21a at the periphery 5g, under an under-flow rim 22 and over an over-flow rim 13, all of which are concentric and circular, into a peripheral waste collecting channel or gutter 23 directly connected through an outlet 24 to an external means of elimination or sewage system (not shown).

The plumbing connections 5d, 5e to the secondary conduit 5 are situated above the primary conduit permitting a lower position for the heat exchange conduits 5 and overflow rim 13, and therefore a greater pressure head for the drainage fluid to flow within a limited casing height. Fresh water supply 27 and warmed water 28 outlets pass through a section of conduit integrated in the lid 27a, 28a with quick-fitting screwed attachment points 27b, 28b near the lid-base junction at the perimeter. Special screw fittings 5d, 5e, (with hexagonal Allen-key/slots 5h, Si) are used to connect vertically turned-up ends 5j, 5e of the convoluted HX conduit 5 to cavities 5L within the lid 3 which hold O-ring seals in place and through which the fluid flows. The concentric inlet filter 20 has the form of an involuted cone and filters out debris that might otherwise become lodged within the HXD and has an inclined rim 22a in contact with tubular inlet section 20b to allow fluid from an auxiliary inlet 105 to be filtered also. This auxiliary inlet 105 may be connected to another sanitary feature (e.g. basin, bidet) or to the drainage aperture/drain hole of the shower pan should this be non-central.

The "fish-scale" cross-section of the convoluted coils of heat exchange conduits 5 makes for a smoother thermal gradient, provides more uniform local flow speed of the surrounding media and allows a more densely packed arrangement for multiple layering.

Since this form of cross-sectional tube lacks the pressure resisting capacity of an equivalent tube of circular cross-section, a check valve as will be described below near the inlet attachment operated by the body weight of a person using the shower, may serve to relieve the normal supply pressure when not in use, as well as providing a convenience facility of operation, and ensuring the avoidance of water wastage.

Above a layer of insulation that lines an external ribbed surface of the lid in between structural spines [25], a layer of concrete may be laid with a steel grid for reinforcement and leverage points, up to the level of an edge adjacent to the casing base [59], which rests not only on the structural spines [25] in alignment with conduit positioning battens [7] but also the octagonal corners of the casing base perimeter. The casing lid [3] fits snugly within the casing base [2] with a peripheral under rim 3a' nested within a groove 3b around the circumferential drainage channel [23]. At some point along this groove one or more channels (or conduits or tubular bridges) [109] extending across the drainage channel [23] to the inner side of the underflow rim [22] allow water to seep into the air sealing groove, thereby making the air lock water tight.

The base casing 2, when fitted with the appropriately dimensioned plumbing attachments [27,28] may accommodate an upgrading of the drainage flow capacity with the installation of additional heat exchanging conduits [5] and associated positional battens [7] and a replacement lid [3:FIGS. 3&4]. In this instance (FIGS. 1&2), the casing base has instead of radial ribs [6] only grooves or alignment features [8] (as in FIG. 5) for the fitting of a radial batten [7] that can also be replaced with one of more appropriate spacing during the flow-rating upgrade.

FIGS. 5 and 6 show an arrangement of rectangular convolutions of heat-exchanging conduit 5 whereby the secondary fluid is supplied first to attachments 27 on the inside of the coil, then along the convoluted conduits 5 centrifugally to attachments 28 at a corner 28 and thereon to supply a heating appliance or the shower head directly. The waste water collected under the shower head drains through a rectangular groove 16 in the pavement 45 above the perimeter of the heat-exchange device 1, to flow across, around and in-between the heat-exchange coils 5 generally inwardly or radially from the outside towards the centre 1' where it is collected after passing a horizontal over-flow rim [13].

This arrangement also may be configured for different numbers of heat-exchanging conduits 5 or layers, permitting extensibility for upgrading the drainage flow rating. The HX conduits 5 here are of generally circular section, although the flow distribution may be enhanced with a variable elliptical section as described below. The plumbing attachments 27, 28 for the HX conduits 5 may be fitted on [27] or integrated into [28] the casing base 2, with the fresh water supply pipes running under the HX conduit arrangement at the base of the casing through the layer of insulation 26 or integrated within the casing itself [28]. This allows the lid 3 and HXD cover to be removed quickly without any disassembly of the piping connections. Since the shower wastewater enters the HXD 1 at the periphery, through a rectangular channel or aperture [16] at the outer edge of the casing, the central shower flooring drainage surface 16' remains independent of the surrounding flooring, allowing it to be also easily removed for cleaning or maintenance when the need arises. The inlet aperture [16] is positioned over a baffle or dispersion gutter 104 that channels the drainage fluid around the casing perimeter before it overflows into another peripheral channel with a sediment collecting surface [103] where the drain water is evenly distributed before it seeps through perforations in the side surface [20] and down to the outer edge of the convoluted heat exchange conduits [5]. The effect here is to disperse any irregular or unbalanced distribution for drainage water into the channel, as typically results from a body's moving position under the shower or the non-centralised direction of the shower head.

This arrangement allow the heat exchange conduits 5 to take full advantage of the horizontal space available for an optimal conduit length and heat exchanging surface area, and allows a minimal local flow velocity where the settling of solid particles and sediment is facilitated before it passes through the heat exchange conduit arrangement, where its deposition would accumulate in time interfering with the devices efficient operation.

The lid 3 here is made of two components: the lower 3a providing the surface for conducting the drainage fluid over and through the heat exchange conduits; and the upper 3b covering the insulation layer 3c which may contain a concrete under-layer for ceramic flooring or provide a drainage surface under an alternative flooring, such as with wooden planks (see below, FIG. 10/11), whereby the drainage water is channeled and distributed through auxiliary apertures [108] into the main collecting peripheral inlet channel [104]. The rectangular shape advantageously reduces bottle-neck effect at the centre 1' with a longer overflow rim 13 whilst fully utilising the space available for the secondary conduits 5 and a maximal heat exchange surface area. The upper lid component 3b also allows a limited air movement for the release of trapped air from under the lower lid surface 3c via the venting holes [53] and capillaries [54] in the lid and top centre.

The position and orientation of the tube guiding spines 8 and interposed spacer battens [11] is important here for maintaining a more balanced distribution of drainage fluid between the side and end quadrants.

The base 2 also has a separate component for the channeling of drainage [24] from the central collecting receptacle [23] in flat horizontal conduits to the external sewage system under the main casing base component. This allows for the choice of alternative orientations which may better accommodate the context of each individual installation. Multiple components here also facilitate the manufacturing process with great saving in engineering costs.

Figure 7:
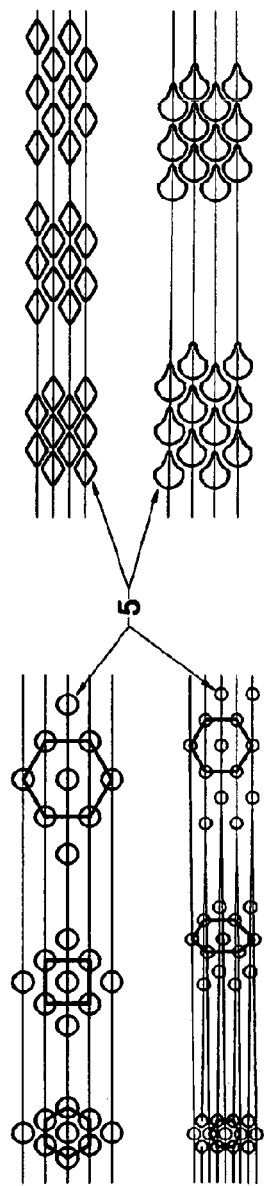
FIG. 7 shows various preferred packing arrangements of conduits in cross section, showing progressive spacing.

Conduit spacing arrangements may very widely in preferred embodiments and the four illustrations of FIG. 7 show how by progressive variation of the horizontal spacing between successive heat exchange conduit sections 5, the intra-layer spacing and thus the cross-sectional area of the flowing body of primary fluid can be varied, as a means of locally modifying the flow velocity and the hydrodynamic resistance to flow of the fluid, (with minimal vertical encumbrance).

Figure 8:
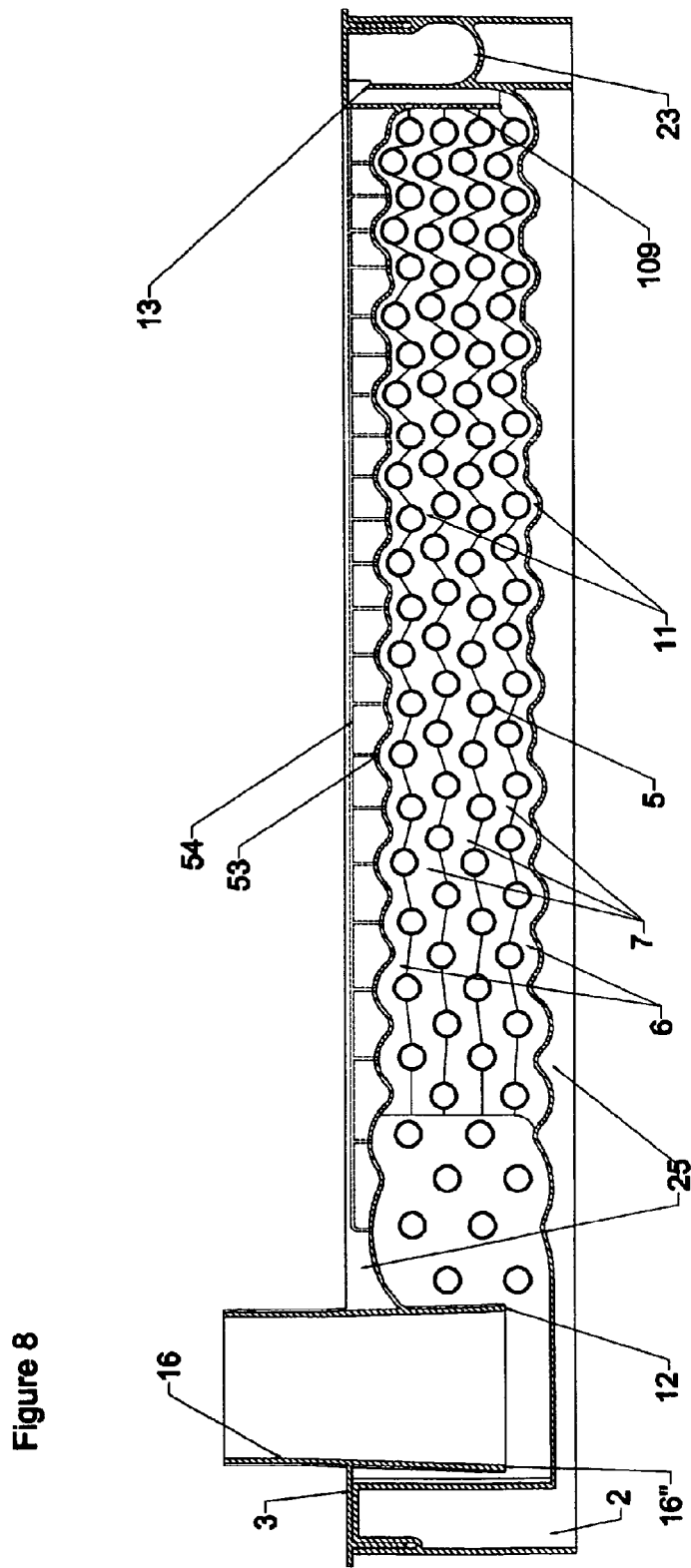
FIG. 8 shows a lateral mid sectional view of a preferred embodiment of a HXD for corner location with converging layers.

FIGS. 8 and 9 show a preferred embodiment of quarter octagon side coiled curved spiral HXD similar principles in what is the relatively triangular shape of an open corner shower pan 100'. The shower waste water is collected and passes through a conventional drain hole 16' near the apex 2', and flows across the arrangement of looped heat exchange conduit sections 5 as a layer until reaching the peripheral collecting channel [23] that flanks the last conduit section 5'', before passing through a flow-equalising perforated wall [109] and a horizontally level overflow rim [13].

The heat exchanging conduit 5 is shaped into a series of loops with rungs of disparate height that progressively merge towards the same horizontal plane (see FIG. 7, below left). Battens 7 are shaped to maintain this staggered loop arrangement of alternating levels which optimises the circulation of drainage fluid around the conduits 5. FIG. 8 shows a section to the near side of the mid-spines or ribs 6 and interposed battens 7. Whilst this view would not normally make visible the air vent holes [53] and ducts [54] which pass within the vertical structural wall above the spines [6] and battens [7], their position is illustrated here. FIG. 9 is a plan view of the base 2 and secondary conduits 5, as it may appear with the lid removed, illustrating how the conduit curves might be arranged given a minimum radius of curvature for the bending of the conduit 5 during manufacture. The lid 3 has a peripheral vertical rim that fits precisely in a groove made by a folded rim of the casing base 2 which is accessible to resident primary fluid, thereby providing an airtight seal when installed. The lid's inlet conduit [16] leading to underflow rim [12] is tapered becoming progressively elliptical towards its lower end 16'' allowing a more extensive horizontal gap for a more even flow of primary fluid to pass through as it approaches the heat-exchange conduit 5 arrangement. Flow fins [14] protruding from both the casing base 2 and lid 3 surfaces not only enhance appropriate primary fluid flow but assist the secure location of the secondary conduit 5 arrangements. The conduit securing spines [6] and battens [7] also separate and prevent the irregular flow pattern around the loop bends from disturbing the uniform flow pattern around the parallel heat exchanging conduit sections 5.

The shower pan may be articulated at the peripheral outflow edge or sloped and formed to nest a platform which may so articulate, such that with the weight of a person a lever is displaced to actuate a check valve in the piping through which the supply of the secondary heat mediating fluid passes.

FIGS. 10 to 12 show an embodiment of a rectangular multilayered side coil arrangement with plastic joined rhomboid section conduits 5. FIGS. 10, 11 and 12 illustrate a sideways (horizontally aligned) "squashed helix" twin arrangement in multiple layers (i.e. with two additional superimposed layers). The shower wastewater collects on the upper surface 3''' of the casing underneath a wooden-grid platform 111 for standing on through which it passes. It then drains to opposing sides through perforations [108] which equalise the distribution of flow into the inflow collecting channels [16] along their length. Further equalising of the lateral distribution of flow occurs as the waste water passes through the perforated surface of a filter barrier [20] and down to the outer ends of the heat exchanging coils, which appears as arrays of parallel conduits. As the loop curves 5''' (see similar in FIG. 9 embodiment) are highly acute and concentrated at the sides, the composite construction of the coils in copper and plastic provide an alternative construction to an all copper coiling which may be technically easier, simpler and cheaper to manufacture on a large scale. In this example the bends in each conduit loop on each layer are juxtaposed in their close-packed arrangement within singular (plastic) end blocks [110] at each side of the HXD, making of the entire secondary conduit arrangement a unitary component. Copper conduits 5 have their ends inserted into plastic end blocks 110. The conduit separating/spacing battens [7] therefore may be also integrated into a single lattice, fitted during the component's construction, which in this instance eliminates the need for spines on the internal surface of the casing lid and base. The secondary conduits 5 have a rhomboid section which permits a more constant interstitial (primary) fluid spacing around the secondary conduits. The progressive variation of horizontal spacing of these secondary conduits illustrates how the temperature gradient and consequent variation of viscosity may be compensated for to equalise and generally reduce the overall hydrodynamic drag on the primary fluid flow. This feature however may in practice be more appropriately much less accentuated, or even dispensed with since one benefit of the device 1 is that it accordingly allows generally unencumbered drainage of cold water also, and the advantage of a regular alignment of tubes for easier and more effective cleaning may generally outweigh the value of this optimisation.

The upper lid surface 3'' is similar to the implementation illustrated with a rectangular convoluted secondary conduit arrangement (FIG. 6), and shows here its suitability for alternative shower floorings that may be installed above. An advantage of the wooden slats 111', which are attached to and resting on cross-pieces 111'' in alignment with the weight-bearing structural walls [25] and conduit spacers [7] of the HXD, besides their low thermal conductivity and heat capacity, is that they may move as an independent platform to actuate a check value and thereby provide a convenient means to operate the shower water flow. The shower wastewater here passes through in-between the slats, draining over the HXD lid towards the outer edges, passing through a series of apertures [108] which equalises the flow distribution into the peripheral collecting channel [104], and evenly along the HXD's peripheral inlet aperture. This configuration is also particularly suitable for portable or prefabricated shower installations, whereby the shower pan and compartment may be integrated with the HXD casing in the process of manufacture.

The following advantageous features and components which may be employed in preferred embodiments in accordance with the invention will now be described:

1. Balanced Counter-Current Flow

Optimal useful heat exchange occurs in passive fluid-fluid counter-current heat exchangers where the heat capacity of the volume of waste water displaced by its flow rate equals the heat capacity of the volume of fresh water displaced by its flow rate (in the temperature range between that of the cool fresh water and that of the warm waste water)—i.e. effectively when both have the same flow rates. This is most easily and usefully achieved by using the fresh water from the mains supply that displaces and replenishes the water drawn by the shower (i.e. supplying both the shower's hot water inlet via the domestic water heater and the cold water inlet).

2. Arrangement of Thermally Conductive Conduits

The appropriate distribution of primary fluid flow through the HXD depends primarily on how the heat exchanging conduits are arranged within the moving body of fluid. This arrangement is a fundamental determinant of the overall efficiency of the HXD and various possibilities may be each more favourably indicated in different contexts or according to different requirements.

The employment of a tube convoluted in a horizontal plane with a uniform increase in curvature is a suitable and highly economical for this application but not necessarily essential nor always ideal. Ultimately it is the spacing around the heat exchange tubing and the manner in which the primary fluid is conducted before and after its passage through this spacing, as determined by the internal form of the entire casing, that determines the appropriate flow distribution through the HXD for optimal heat recovery performance.

3. Parallel Flow Arrangement

To maintain a high surface area for heat exchange in a tangentially flowing counter-current arrangement, the secondary conduit would need a much larger surface area for heat exchange whether by the appendage of fins, or more efficiently by dividing the flow into a series of conduits in parallel. Either modification may incur a significant increase in fabrication cost, although this provides an opportunity to use advantageous alternatives of cross-sectional shape without further complication, avoids the elaboration of curving or creating multiple acute bends in the thermally conductive conduit, and permits a higher ratio of heat-exchanging surface to non-heat-exchanging surface for a more compact or effective HXD, since this is the most hydrodynamic low drag flow arrangement for both primary and secondary fluid media. However a means would be needed to ensure that the flow distribution in the secondary fluid (as well as for the primary fluid) be also perfectly balanced in order to maintain optimal efficiency. Whilst the alignment of secondary conduits with the primary fluid flow facilitates flow by reduced drag in both media it also encourages laminar flow and forfeits the benefit of recurrent thermal mixing.

As mentioned earlier, the proportion of heat transfer along the heat exchange conduit in the direction of the primary fluid flow will have a much more significant affect upon the optimally effective progression of the dynamic thermal gradient between the two media, resulting in a substantially warmer temperature of drainage liquid leaving the HXD than the incoming secondary fluid and so a reduction in eventual heat transfer (or efficiency of heat exchange) between the two media.

These issues are substantially avoided with coil arrangements, or where the conduit forms a series of loops whereby the general thermal gradient along the flow-lines of the primary fluid flow progresses in discrete increments. For the dimensional requirements of the present application, any such coil must be flat, horizontal and arranged so that the primary fluid flows uniformly across each and every loop in succession.

These relatively transverse arrangements of flow are hybrid combinations of cross-current local flow and counter-current general flow.

There are three ways flat layers of convoluted or looped conduits may be shaped for such an arrangement appropriate for this application:

4. Convoluted Spiral

These are arrangements of secondary fluid heat-exchanging conduits that convolute concentrically around a vertical axis where each successive loop is horizontally adjacent and wraps around the previous one. A hybrid flow arrangement that is more like the parallel counter-current may be configured by convoluting two or more like conduits alongside in the same plane. This spiral conduit layer is bedded entirely within the primary fluid conduit, sandwiched between the top and bottom sides of the casing lid and base container respectively and held in place by radial spines, which may be symmetrically arranged for extensibility. The casing conducts the primary fluid across the convoluted conduits between its centre and beyond its periphery, either centrifugally or centripetally. Whilst many shapes of convolutions may be used, the more regular and more symmetrical ones are more appropriate. Circular shaping is the simplest and easiest to implement for optimal efficiency but polygonal or elongated forms may also be suitable given that deviations from uniformity can be largely compensated for by other features described here.

As the width of the body of drainage liquid varies in proportion to its distance from the centre, the vertical depth needs to vary inversely to compensate, so that the casing's upper and lower primary fluid surfaces would generally be further apart at the centre and closer together at the periphery. For a single pipe layer, the spacing between adjacent convolutions is not so critical, and may be a fixed minimum gap in order to fit in the maximum heat exchanging surface area. To accommodate the superimposition of additional parallel layers a conduit spacing inversely proportional to the flow-transverse circumference is needed. Subsequent layers may be then composed of the same type of conduit arrangement and shaping but merely rotated by 180 degrees for interlacing, and likewise for the lid, placed on additional inter-spine battens. For economy, the lid could be made to fit both orientations at the appropriate level with a pattern of crenellation around the periphery supporting alternate height configurations. Such an arrangement of layers gives a horizontally aligned hexagonal packing arrangement at the circumference, where the greater part of heat transfer at lower drainage flow velocities takes place.

For multiple layer arrangements of a higher order, the optimisation of converging conically inclined layer-pairs (described above) would also be highly appropriate.

In a rectangular or square (or dodecagon) shaped convoluted conduit arrangement, by alternately inverting the sense of direction of half the secondary fluid conduit layers, the hydrodynamic gyrating effect of the coils on the flow of drainage fluid would be balanced and by the alignment of conduit intersections with the radially perpendicular sections of the conduit arrangement (i.e. mid-side rather than oblique or corner sections), compensatory drainage flow towards the corners may be encouraged. This however does not allow interlacing of layers and the greater interlayer distance also results in a higher volume of drainage fluid in the HX chamber and consequently thermal inertia.

The waste water drainage may be configured to flow either centrifugally from a central inlet aperture or centripetally from a peripheral ring shaped or fragmented aperture, the relative merits of each flow direction having been already discussed above.

In a centrifugal arrangement (FIGS. 1-4) the drainage liquid would enter the device through an aperture in the lid down a central passage to the horizontal plane level of the secondary fluid conduit layers and disperse radially in all horizontal directions flowing over, under and in between the secondary fluid conduits [5] until the overflow rim [13] at the periphery is reached. This horizontally level overflow rim is fundamental for the maintenance of the uniformly distributed radial flow of drainage liquid across all sections of the heat exchanging coil, and once passed, the drainage liquid can be collected in an adjacent peripheral gutter [23] and channeled to where it may unite with the external drainage [24], sewerage or waste water collection system. An even flow distribution along the perimeter is no less important in the centripetally draining arrangement (FIGS. 5 and 6), although the levelness of the perimetrical rim has a much less critical effect since the water and its surface does not need to make such intimate contact with the rim or pass it as a laminar of minimal thickness. A peripheral drainage aperture arrangement may be better suited for integrating a foot-weight operated valve as it not only gives the user more postural freedom under the shower but the central valve position would then alleviate pressure from the heat exchanging conduit arrangements when not in use.

5. Squashed Helix

Other suitable formations derive from a horizontal helix that is vertically squashed. In one arrangement the upper and lower flattened sides are slightly oblique and the curves at the lateral edges are acute and rather vertically oriented.

The other arrangement is like tight helical coils around a horizontal axis whereby the horizontal sections of each coil are extensively extruded forming two counter-running parallel loop sections that extend horizontally along the side of the previous loop that is in the direction of the coil's axis. The helical or curved part of the conduit in fact is of relatively little importance and may be any shape of conduit that serves to connect the horizontal sections is an equivalent manor.

Whilst the first type provides a more uniform thermal progression of conduit surfaces in the general direction of primary fluid flow, the latter type (more advantageously) provides for a more uniform hydrodynamic flow distribution around the conduit surfaces and more compact layering.

Additional layers to a sideways coil arrangement are hydro-dynamically better configured as larger surrounding coils around the original coil, but this gives disparate conduit surface areas and may be practical only for conical (horizontally tapered) arrangements being technically awkward to fit or implement with appropriate load-bearing spines without excessive interstitial spacing between layers that consequently engenders less balanced distribution of flow and less effective heat exchange.

This difficulty would be avoided with a less tightly packed arrangement, as if the coil were further squashed or the split-helix edges where elongated. In such an arrangement (where the neighbouring parallel sections on the opposite side of each horizontal section would span a 120 degree angle rather than 60 degree one) the layers may be simply stacked above each other with interposed battens and without staggering, to yield a vertically aligned hexagonal packing arrangement which may also be closely spaced.

This configuration is well indicated for rectangular primary fluid conduits of fixed width, although for tapered conduits it could be adapted into hybrid configurations where the layers progressively flatten and divaricate into single plane looped arrangements, as described above for converging layers, and illustrated in FIGS. 8 and 9.

6. Serpentine Series of Parallel Loops

These essentially two dimensional arrangements are like completely squashed helix arrangements where all horizontal sections share a common horizontal plane and each loop appears so flattened as to extend entirely within the same horizontal plane. As these formations can generally be overlaid only without vertical overlap they allow only the horizontally aligned arrangement of tight-spaced hexagon packing, although this adapts well to tapered or variable widths of the primary fluid conduit that require a spacing out of the packing arrangement as the primary fluid flow narrows, as described for convoluted arrangements. A vertical alignment with nested layering can be achieved however with lateral kinks at the loop ends that allow adjacent layers to cross over neighbouring conduits, with paired layers that bridge each other at alternate ends from neighbouring paired layers.

7. Composite (Segmented Heat-Exchanging) Conduits

The main difficulty with the squashed-helix, semi-flattened coils or serpentine arrangements is that very sharp bends are needed in the thermally conductive piping which can weaken the tubing excessively or otherwise may engender a substantial fabrication cost in time, energy and technique. Furthermore a significantly higher drag may be induced upon the secondary fluid flow with significant loss of pressure head although this does improve thermal mixing from turbulence and heat transfer generally.

A more economical but also technically demanding alternative may be to manufacture the layers of conduit arrangements as a series of horizontal sections, which may be straight or curved or looped, joined together at the ends with plastic tube-chaining spines along the edges of the conduit arrangements linking the cavities of adjacent conduit sections internally, as illustrated in FIG. 11. A difficulty here is ensuring a reliable water-tight junction that is secure at the higher pressures typical for the secondary fluid medium within the limited space of a compact arrangement. Another challenge may be to integrate these hydro-dynamically smooth conduits into manufacturable components that can be combined together in compact arrangement. Multiple layer arrangements however might be advantageously combined into integrated components with the curves of each layer's conduit merged with its vertical neighbours, and where the benefits of uniform thermal progression and uniform interstitial flow may be combined.

This approach also provides the opportunity for an alternative solution for balancing flow in tapered primary fluid conduits, whereby neighbouring conduits in multiple layers are progressively merged into fewer conduits as the containing conduit gets horizontally narrower.

8. Conduit Submersion

For heat transfer to the secondary piping to be most effective it needs maximal exposure to the primary fluid, attained by its complete submersion in the primary fluid, regardless of the rate at which the fluids flow, which is conveniently achieved by its location in the body of water below the level but upstream of an overflow rim that acts as the upper vertical bend of a plumbing trap. Enlarging the space for this body of water not only accommodates an adequate surface area of piping for substantial heat exchange but slows down the velocity of waste water drainage fluid minimising the effect of hydrodynamic drag as it passes around the HXD piping, extending the duration of time in which heat transfer may take place. It also spreads the fluid more thinly over/around the HXD piping ensuring more direct/immediate heat transfer from the entire body of primary fluid through a minimal barrier of intermediating fluid.

9. Direction of Flow

Passive fluid-to-fluid heat exchangers are reversible in that they can generally function just as effectively when the general direction of flow of both media is reversed. In this application however, since the natural drainage flow of waste water relies on gravity which is unidirectional, the heat is exchanger is adapted to channel the primary fluid in only one direction (converging/centripetally or diverging/centrifugally)—one that we choose for various reasons, although the alternative option may be also no less viable.

This choice depends primarily on one's preference for the drainage inlet aperture location and shape, since the form of two ends may be very different in some flow arrangements. Whilst a conventional size and shape of drainage hole may favour the use of conventional drainage basins that are readily available in the commercial market in styles, shapes and sizes to suit most personal preferences, the alternative may be a larger or longer drainage gutter positioned centrally or near the basin perimeter on one or more sides.

The viscosity of the waste water is also an issue in the consideration of sense of flow since it increases as it cools down. A configuration with the drainage inlet at the narrow end may be advantageous as a higher initial flow velocity might be permissible at this end allowing the primary conduit there to be shallower with closer interstitial spacing and a generally less vertically tapered conduit (i.e. with more uniform thickness) overall.

One reason for choosing an elongated drainage gutter apart from avoiding a "bottle-neck" restriction to fast flowing drainage and puddling within the basin is that it may accommodate a larger and more effective filter to help protect or prevent the primary conduit from fouling and blockage in the narrow interstitial spaces which may detrimentally affect the devices performance. At times it may be necessary to gain access to the HXD under the shower pan and remove the lid for maintenance or cleaning purposes. To do this non-destructively the shower basin may have an easily removable component covering the HXD lid whose junction aligns with the drainage gutter making it easy to detach. This configuration allows for less possibility of sewage system gases to bypass the plumbing trap and entering the domestic environment via this junction, obviating the necessity of an additional gas sealing junction. Furthermore, since the volume of primary fluid in the HX passageway resides predominantly at the narrow end, this arrangement may give a lower initial thermal inertia to the device, provided that the upstream passageway is not too expansive.

10. Gas Seal/Plumbing Trap

Furthermore the combination of an underflow rim [12 or 22] and the downstream overflow rim [13] with a hermetic primary conduit in between will act as a plumbing trap to seal gas and prevent the communication of waste system odours up through the device.

The great importance of this feature in the shower application is that by substituting and making redundant the conventionally used plumbing trap, the much needed space that it normally occupies and pressure head that it uses can be appropriated and most gainfully used by the HXD.

11. Ridge-Spines

As the primary conduit surface becomes expansively enlarged laterally its shape becomes more susceptible to deformation or distortion, and the structure loses its resistance to compression or ability to rigidly sustain external forces or weight loads from above. A structural means is needed to transmit such weight loads without strain through the layers of secondary conduit and also hold them securely in their precise position relative to the containing surface of the primary fluid to maintain an appropriately sized gap for primary fluid passage around the secondary fluid conduit's entire heat exchanging surface.

This need may be fulfilled by the shaping of the casings internal surface with spines [6] that extend across and around the secondary conduits in line with the natural or desired flow path of primary fluid acting also as flow fences or fins, so as to endorse the appropriate drainage flow without obstruction. These spines extending from the internal surface of both the casing base upwards and the lid downwards align with butting surfaces in between the rungs of secondary fluid conduit, and may have complementary features (e.g. pin/pit or ridges/grooves) [8] for securing this alignment.

Alternatively the surface may be featured with a groove or alignment features if necessary so that battens may be fitted to function as spines. This allows alternative spacing arrangements such as would appropriately be changed when upgrading a single layer convoluted arrangement (FIG. 1/2) to a multilayer arrangement (FIG. 3/4).

12. Insulation

To enhance the maximum transfer of heat through the secondary conduit surfaces it is necessary to prevent heat dispersion through any other surface that the drainage liquid may contact during its passage through the device. Whilst plastic may have adequate insulation properties, they may favourably be supplemented by an additional layer of insulation material around the external surface of all sections of the primary fluid conduit. An alveolar or expanded polymer material may not only be economical, bonding well with a plastic casing, but given a high degree of rigidity may help to maintain the structural integrity and precise shape stability of the device, which can be critical for effective performance of highly elongated overflow rims. Insulation may also give the device a flat surface exterior finish better for installation and upon which an additional panel of removable insulation may be placed above the lid to make room for the possible option of upgrading the device at a later date to incorporate additional layers of secondary conduit for higher flow ratings with minimal destruction or modification to the original installation.

Externally connecting conduits to either the primary or secondary conduits of the device may need to pass through this insulation layer which may be easily remodelled to accommodate them and any fittings according to the context of the installation. For this facility parts of the casing may be featured to conveniently accommodate specialised or commercially available fittings in a water-tight secure manor.

13. Choice of Materials with Appropriate Properties

As a cost saving device, it must necessarily incur minimal cost in all aspects of its manufacture, installation and usage, which generally requires adapting as best as possible to the norms and conditions currently invested in. Thus for the device's construction suitable materials that are inexpensive, commonly/conventionally used and readily available are more indicated, such as copper pipe and polypropylene plastic.

The HXD is fundamentally a conduit for two fluids, comprised of two types of shaped surface: one being highly thermally conductive and the other thermally insulating, and both having thermal, structural, chemical stability with low hydrodynamic roughness and resistance to microbial colonisation or biodegradation.

With the versatility and cost effectiveness offered by the manufacturing technology of the modern plastics industry, the demands of this application make plastic an excellent choice of material.

The secondary conduit being generally a clean fluid flowing under substantially higher pressure needs a stronger conduit and although its length or curvature is not a major issue, this requirement is more manageable for smaller cross sections. Copper tubing which is a traditional standard for plumbing, being also highly ductile, would normally be the preferred choice of material for the secondary conduit.

14. Casing Composition and Properties

Both for ease of manufacture, assembly, maintenance and cleaning, the HXD casing would preferably be constructed in two main parts: a base container [2] and a lid [3], ideally but not necessarily made of plastic such as polypropylene, such as may be commonly used for waste water drainage pipes generally: i.e. that is cost-effective to mass produce into the form here described having a good combination of appropriate characteristics: reasonably good structural strength and rigidity with stability at domestic hot water temperatures, resistance to biodegradation, microbial colonisation and domestically used chemical agents in solution, also permitting of a low friction and adhesion-resistant smooth surface finish. To enhance these latter properties the inner surfaces may be treated with a higher performance lining, such as a Teflon coating [4].

The HXD casing [1], when assembled, holds in place within its inner waste water containing surfaces one or more coiled thermally conductive rigid fresh water pipes [5], made of a material having additional appropriate properties (as described above for this illustration), such as copper.

15. Other Structural Casing Features

The shape and structural stability of the device casing may also be enhanced by webbing or walling features [25] on the casing exterior that pass through the insulation layer in alignment with the primary fluid conduit's spines [6]. These would mediate forces transmitted from weight loads through the casing spines and battens to the underlying concrete foundation or structural under-floor, dispersing stresses that might otherwise affect the device's shape or integrity. They may also facilitate the manufacturing process of injection moulding.

16. Conduit Surface Treatments

To inhibit grime and minimise the progressive accumulation of extraneous matter lining the conduit surfaces which would constrict the conduit interstitial passageways impeding drainage flow and heat transfer or necessitate more frequent cleaning, the conduits (casing and tubing) should be made of a material with antifungal-antimicrobial smooth non-adhesive low friction surfaces, such as is generally the case for standard plumbing materials such as copper and PVC or polypropylene plastics containing appropriate additives. The importance of these properties for the effective functioning of this device is such that low friction or scuff-resistant surface treatments, especially for the non heat exchanging surfaces (as plastic generally induces more surface drag on fluid flow than copper), may be appreciably advantageous and worthwhile the cost.

17. Plumbing Connections

Designs may incorporate bridging sections of this piping (as illustrated in partial section in FIG. 3) to accessible locations on the device perimeter, significantly facilitating installation, albeit at the expense of some flexibility perhaps.

18. Nature of Some Preferred Embodiments of the Invention and its Variable Implementation The features of some preferred embodiments of the current invention are improvements in the overall functional efficiency and effectiveness of the heat exchange device achieved by inducing/facilitating/promoting a more appropriately balanced distribution of fluid flow around the thermally conductive surface of the heat-exchanging (tubular) conduits, affecting the pattern of surrounding fluid flow as it 1) approaches, 2) passes through and 3) exits the heat exchange chamber.

Various further beneficial features of various embodiments will now be discussed:

1. Flow Distribution

A uniformly distributed flow of drainage fluid across a horizontally expansive conduit (or body of primary fluid) is naturally enhanced and maintained by inducing the fluid to enter and exit the conduit arrangement of the heat exchange chamber in a likewise uniformly distributed manner, across features such as weirs, rims or filters, that span the entire body-width of flowing primary fluid in a consistent (concentric or parallel) arrangement. This isolates the hydrodynamic flow characteristics in the adjoining conduit from distorting the uniform broad flow distribution within the HX chamber.

2. Other Flow Equalizers

Likewise, a uniform distribution of flow across a horizontally expansive section of primary conduit can be maintained from the outset if the drainage fluid enters the heat exchanging chamber via a similarly extensive conduit or inlet aperture [16] in a uniformly distributed manner. Since typically this even inflow condition might not naturally always be the case, it may be largely corrected by a dispersion gutter [104] at the inlet aperture and/or attenuated/equalised somewhat by an evenly distributed flow resistors along the entire breadth of the primary conduit upstream of the heat exchange surfaces. Such a resistance can take the form of a filter gauze, graticule, perforated surface [108], crenellation, constriction or vertical bend (i.e. underflow rim) in the conduit, or a combination of these.

3. Inflow Modifiers 3.1. Peripheral Inlet Filter

As mentioned, a filter [20] to catch extraneous matter that might otherwise obstruct drainage flow within the heat exchange passageways is an important feature, which for practical convenience should be container shaped and detachable for quick and easy cleaning, especially if having a restricted size. It would appropriately be located at or under the inlet aperture [16] and may be integrated with or adapted into a perforated horizontal channel [104] within elongated (peripheral) inlet apertures to promote drainage distribution as described below. The size of filter meshing or perforations may be relatively coarse so as to not get clogged up so frequently as to be an inconvenience, if supplemented by a secondary filter or feature (sediment trap) to catch finer matter that might accumulate as sediment on the HX surfaces as well as aid uniform flow distribution.

3.2 Flow-Dispersion Channels

Of particular value in extensively elongated drainage inlet apertures, where one part might collect substantially more waste water than another part, these channels running adjacent to the inlet aperture edge may be integrated with the internal surface of the casing base or the casing lid, on the side walls under the inlet aperture or inside the inlet filter component (see FIGS. 6 and 9). Having small or scarce perforations below which may be graduated in density so that the drag to local drainage flow decreases as the overall flow increases and the surface level rises, they help balance flow and surface pressure head uniformly along the inlet aperture.

3.3 Sediment Trap

A constriction in the drainage conduit temporarily generating a relatively accelerated local fluid flow that abruptly opens into a broader section with an immediate radical change of direction in the subsequent conduit may encourage heavier particles suspended in the drainage medium to separate from the drainage current and collect on a segregated surface [103] dissociated from the general fluid flow. The efficacy of this feature, being optimised in vertical alignment with gravity, favours integration with an inlet underflow rim [12]. This feature has the advantage over a finer meshed filter that it does not progressively restrict the general drainage flow as sediment accumulates, and therefore does not necessitate frequent intervention for cleaning.

3.4 Underflow Rim

An underflow rim [12] positioned at or near the mid-level of the heat exchanging conduits also helps balance the vertical distribution of primary fluid flow between the upper and lower surfaces of the heat-exchanging secondary conduit, either initially [12] or terminally [22] or both. In the latter position at a lower level would be beneficial in acting as a heat baffle to ensure effective drainage of the coldest strata or zones of primary liquid (as seen in FIG. 3).

4. Outflow Modifiers 4.1 Overflow Rim

The weir or overflow rim [13] that is essential for keeping the conduits submerged by extending as an appropriately shaped (i.e. symmetrically, regularly or consistently positioned relative to the formation of secondary conduits) and perfectly level horizontal overflow rim along the entire breadth of the primary conduit favours a uniform flow and ensures the appropriate orientation of the flow-lines as the primary fluid concludes its passage through the HXD even if local variations in inflow distribution do occur.

Whilst a perforated weir might also fulfill this condition maintaining the secondary conduits submerged in primary fluid during operation and even enable a more vertically distributed flow, it would forfeit the benefits of a consistent condition. The relatively anaerobic environment of a resident body of drainage fluid would be hostile to most microbes and avoid the encrustation of solutes or residue likely to accumulate with time through repeated evaporation and desiccation.

The precise horizontal levelness of the overflow rim becomes more critical when its length/breadth is extensive since even a very slight general inclination may result in a very biased distribution of waste water overflow along the rim, and a serious compromising of the HXD's optimal efficiency. Even so, given a reasonable precision of horizontal alignment, at low rates of drainage flow, this irregularity is likely to be further accentuated by cohesive forces of water (causing the side more inclined to overflow to flow more and the opposite to flow much less or not at all). To attenuate such unbalancing tendencies, the edge of the overflow rim may be shaped vertically with crenellation or a repeated restraining pattern or with periodic cuttings to focalise and limit the water's cohesion affect, or teeth that resist an excessive free flow in any one direction. It may even be better constituted as a sequence of moderately small holes of regular size and spacing at a common horizontal level all around the perimeter, preferably without water repellent properties pertaining to the material at the rim edge, which may be achieved if necessary by an appropriate surface treatment.

5. Through-Flow Modifiers
5.1 Layering, Interlacing, Offsets and Spacing

A single layer of secondary conduit may be the most economical and easily installed configuration where the permissible height for such a HXD is a primary constraint, however distributing the secondary fluid flow through multiple layers provides the substantial benefit of significantly improving the heat exchange to drag ratio (by increasing the heat-exchanging surface to non-heat-exchanging surface ratio) without necessarily increasing the device height significantly, albeit at the cost of some additional drag on secondary fluid flow, In fact, if drag on the secondary fluid flow is not a problem, multiple layering may even reduce the overall device height, without substantial extra material cost since the wall thickness of the conductive tubing may be reduced for smaller conduit diameters.

5.2 Packing Arrangements

In a multi-layered arrangement a more even distribution of interstitial space around tubular conduits will generally be better achieved by the alternate interlacing positioning of the conduits, in either a vertically or a horizontally aligned hexagonal packing arrangement (see FIG. 7), corresponding respectively to the squashed helix and serpentine series arrangements mentioned below.

The advantage of the vertically aligned arrangement is that the drainage fluid in transverse flow is necessarily induced to follow a more vertically meandering and homogeneous flow pattern that accosts a greater proportion of the tubes cross-sectional circumference making it generally more effective for heat transfer, although encountering marginally more drag against its general horizontal flow. This orientation is more appreciable in tightly packed arrangements and more favourable or advantageous at slower flow velocities. The horizontal orientation however permits transverse flow to preferentially follow the relatively straight narrow path of shorter flow-lines between the conduit layers, where the interstitial fluid between loops of each layer (and the outer surfaces where ribs are present) will tend to slow or stagnate. This arrangement may be more appropriate where lower drag or faster flow velocities are necessary.

5.3 Intra-Layer Spacing

Where the primary conduit's cross-sectional dimensions are not constant but varying or tapered, certain adjustments to the interstitial spacing between the secondary fluid conduits may be indicated for a hydro-dynamically balanced arrangement of layers. One solution may be with the insertion of tapered battens between the secondary fluid conduit layers and supporting spines. This however accentuates the vertically tapered form of the primary conduit, and requires the increasing inclination or conical distortion of subsequent secondary conduit layers and the casing lid from the original flat horizontal arrangement.

A more space efficient alternative solution provides for the progressive variation of horizontal spacing between rungs of secondary fluid conduit within each layer, with flat layers being in horizontally staggered arrangement with respect to each other. This may be most simply achieved however with a horizontally aligned tightly packed arrangement at the widest section of primary conduit which gradually divaricates horizontally via a square packed arrangement into a vertically aligned loosely packed hexagonal arrangement at the narrower but deeper end of the primary conduit (FIG. 7). A similar but less accentuated variation may also be achieved from a tightly packed vertically aligned arrangement to a loosely packed inclined vertical arrangement, inducing a somewhat less uniformly distributed vertically unbalanced flow pattern in the transition, and requiring typically several forms of shaped conduit to make up the arrangement.

5.4 Converging Layer-Pairs

Especially worthwhile for multiple layer arrangements of a higher order, this could be optimised by widening the inter-convolution (or intra-loop-section) gap so that the layers can overlap into a tightly spaced vertically aligned hexagonal packing arrangement at the tightly packed end which divaricates progressively by alternately inclining the layers so that they converge in layer-pairs towards the deeper-flow end where they unify into single layers supporting a loose (wide-spaced) vertically aligned hexagonal packing arrangement. This convergence of paired layers (illustrated also in FIG. 8) provides little advantage unless the conduits at the unified end are interlaced, so alternate pairs of layers need to have a slightly different progression of spacing. Thus two type of convoluted spiral are needed for two types of converging layer pairs.

6. Flow Dispersion and Uniform Distribution:

The shaping and dimensioning of the primary fluid conduit is useful for an efficient heat exchange where the fluid drains under a low head of pressure. To maintain a consistent and moderated flow velocity and hydrodynamic drag (relative to the heat exchanging surface area covered), the vertical thickness of the body of drainage fluid within the confines of the primary conduit and around the secondary HX conduits is dimensioned according to the width of the body of drainage fluid—by inversely proportional relationship. That is, as the body of fluid gets generally narrower in width, its depth/thickness increases, and vice versa. This factor is most accentuated for convoluted arrangements where the drainage inlet or outlet collecting channel is circumferential.

A variation in the thickness of the drainage fluid also arises as a result of the secondary conduits cross-sectional shape and with the transition from one rung to another. To moderate this fluctuation multiple layers of secondary conduit are horizontally interlaced and the internal surface of the primary fluid conduit that envelopes the secondary heat-exchanging conduit arrangement is shaped to contour around the secondary conduits with the appropriate spacing as described.

7. Cross-Sectional Shaping of Secondary Fluid Conduits

The important characteristics required of the secondary fluid conduit make copper tubing a preferred choice not only for the same reasons that it is traditionally one of the most popular standard materials used in plumbing, making it readily available in various tubular forms at reasonable cost, but it has excellent thermal conductance and ductility for shaping.

A flattened tubular cross section increases the average proximity of the conducted fluid to the heat transmitting surface, increasing the thermal gradient in the body of moving fluid and therefore heat transfer, as well as offering hydrodynamic advantages for primary fluid flow in various conduit arrangements.

An elliptical or ovoid cross section also presents less drag and obstruction to surrounding fluid flow in longitudinal alignment. The intermittent thermal gradient across a series of loops may be also more smoothly inclined by the elongation of the pipe section into a more ovoid, wedged or teardropped shape with the pointed edge pointing upstream in the direction of primary fluid flow. The extremity being slower to exchange heat with the central body of internal fluid will remain appropriately slightly warmer than the trailing edge.

As already described, the gradual progression or local variation of this shape modification provides an additional means that complements the contoured shaping of the HXD casing's internal surface for locally fine-balancing the drag to interstitial flow in order to enhance the overall uniform flow distribution over all heat-exchanging surfaces, which is of particular importance in between multiple layers of secondary conduit.

In a square shaped convoluted arrangement (FIGS. 5 & 6 for example), the primary fluid must flow faster in the diagonal directions to keep in line with the straight sides, whilst both the constricted interstitial space and the increased flow velocity will incur additional drag that would counter-effect this. Thus a tubular secondary conduit could be progressively pressed into an elliptical shape in the four cardinal directions of the sides whereby the ellipses major axis is horizontal, and likewise also in the four diagonal directions but instead so that the ellipses major axis is vertical.

The same could be done with a square section conduit that mutates between a vertical rhomboid section at the middle of the side sections and a horizontal rhomboid section at the diagonal/corner sections. This also minimises the variation of interstitial fluid volume.

8. Ribs/Ridges and Gullies

This formation in association with tubular secondary fluid conduits gives typically the appearance of parallel ridges [9] or ribs with concave surfaces or gullies in between lining the primary conduit's inner surface.

Whilst the small deviation in flow path induced by these ribs may result in some drag on the drainage flow they help maintain a more uniform thickness of fluid around the heat exchanging surfaces that may be more consistently appropriate for optimal heat transfer.

Also, with the general elimination from within the HXD of unnecessary slow flow zones of water stagnation, convection or eddy currents, this contouring feature inhibits the settling of sediment and microbial colonisation, and furthermore, by minimising the casing's resident primary fluid volume and heat capacity, optimises the speed with which the HXD reaches its operationally effective dynamic thermal equilibrium.

Other distortions of primary fluid flow uniformity we may describe as longitudinal variations, or local elongations of the flow path along certain lines of flow, as arise in drainage flow through less regular arrangements of secondary conduit. For example, a square shaped convoluted spiral (FIGS. 5 and 6) can be considered as a circular arrangement where sections of conduit (the four corners) are translated radially (or longitudinally in the direction of drainage water flow) at and around four right-angle poles. Thus to attenuate and compensate for the disbalance arising from this horizontal elongation of the flow path along these diagonals, the secondary fluid conduit profile and the surrounding contoured surface is correspondingly altered locally to give a more vertically tortuous path around the face sections relative to a straighter flow line down the diagonals.

Flow-fences, spines, ridges and conduit profile as well as locally shaped ribs and gullies all affect the distribution and direction of fluid flow around the heat exchange surface which has a critical effect upon its overall efficiency of heat transfer as well as the overall resistance/drag on fluid flow, and this can be uses constructively to compensate for variations in the outer shape of the device as a whole as it affects the general shape of secondary fluid conduit arrangements contained therein. The optimal solution/arrangement is that of uniform flow distribution and balanced hydrodynamic resistance along evenly distributed flow lines over all parts of the heat exchanging surface.

9. Flow Fences

An additional measure for securing or enhancing the even distribution of flow over all the heat exchanging surface area of the secondary conduits, at nominal hydrodynamic cost that may be applicable to any non-uniform piping arrangement (such as illustrated in FIG. 7/8), may be with fins [14] or fencing, or flow barriers aligned with the intended natural flow-lines of the drainage fluid that would yield this desired optimal performance of heat transfer.

10. Air Vent Holes

To avoid the presence of trapped air or bubbles under the HXD lid [3] which would hinder uniform flow and inhibit heat exchange, vent holes [53] may be positioned where each pipe gully or longitudinal cavity between ribs [9] in the lid [3] meets a spine [6]. These vent holes [53] may then connect to a duct [54] along and inside the radial ridge [25] that opens out to the external air environment on the same side of the plumbing trap gas seal. These vent holes [53] may be quite small since they only serve to relieve pressure and conduct air when initially filling the HXD after installation or cleaning. This requirement may alternatively be fulfilled by narrow cuttings with a straight slightly inclined roof crossing through the undulating internal surface of the lid. To minimise the primary fluid flow radially along these cuttings, they may be disjoined and staggered, and to facilitate the evacuation of air via these channels or vent holes, they may be connected to branching tapered/inclined grooves running parallel with the conduit ribs/fluting half way towards the neighbouring radial channels or vent-holes.

11. Extensibility

Whilst distributing the secondary fluid flow through multiple layers may increase the heat exchange surface area and heat transfer efficiency, the thinner conduits become more delicate or otherwise more costly overall whilst more connectors and elaboration is needed to fit them in the hydraulic circuit. The conduit spacing and feature arrangement for optimal efficiency depends on the flow rate or volume throughput of drainage water, and should be tuned to the maximal flow rate typically occurring in normal usage. Installing additional shower jet-heads or replacement jet-heads with higher flow ratings would result in puddling of water above the drain hole or overflowing, unless a larger or higher flow rated HXD is installed instead. Since there should be little or no space available for horizontal enlargement, to maintain the same level of heat exchange efficiency, the device must be vertically extended, as with additional heat exchange conduit layers. The layered structure of the device is thus well predisposed for such extensions even without necessarily replacing the original casing base or heat exchanging component (as illustrated in FIGS. 3,4) If the height of the original inlet conduit above the heat exchanging elements allows, this extension may also be achieved without necessarily involving any change to the external dimensions of the device, simply by incorporation of additional heat exchanging coiled pipe elements with inter-spinal battens inserted between the pipe layers acting as weight bearing spacers, appropriate piping connectors and some adjustment of the overflow and/or underflow rim levels. An optimal setup can be maintained with appropriate re-dimensioning for the upgraded configuration and the integration of a vertically dispersing flow moderator if necessary by replacing the lid with an appropriately remodelled one, such as may even be easily manufactured from the recycled plastic of the original lid.

If subsequent layers interlace, with conduits aligning with the interstitial spaces of adjacent layers, then only two upper surface configurations may be needed, which for convoluted radial flow arrangements could be achieved by rotating the lid through a half turn, with peripheral support for the lid in its new higher position being sustainable through an alternative alignment of the butting edges of a complementary crennelation feature at the periphery of the lid and base casing components.

Structural and Functional Integrity

12. Battens

Where more than one layer of conduits are employed, the insertion of similarly shaped battens [7] in alignment with the spines [6] above and below serve to bridge them and extend their action between the conduit layers.

In transverse flow arrangements of primary and secondary fluid conduits, these spines and battens may act as the most effective flow fences since their division of the primary fluid may be complete, being positioned to abut in alignment with matching complementary battens or spines on the opposite facing surface and shaped with appropriate cuttings in which to lodge securely the secondary conduits.

To ensure and stabilise good vertical alignment of these spines and battens, the contacting surfaces of the battens should be shaped with the same complementary features [8] on their butting surfaces as may feature on the spines, such as pits and notches or poppers.

13. Auxiliary Features 13.1 Drain Hole Valve and Mechanism

The HXD casing may advantageously be adapted to accommodate a valve in series with the secondary fluid heat exchange conduits actuated through a mechanism by the under-foot weight or force of a person standing on the shower pan or drainage aperture cover. This is not only a water-saving convenience feature that may encourage or further justify the implementation of this device but may serve to alleviate the high water supply pressure through the secondary fluid conduits and fixtures. The secondary fluid conduit arrangement may consist of a number of non-permanent space-compromised pipe-connectors that can be dismantled for maintenance and composite segmented arrangements (made of different materials interposed) which all have a limited pressure tolerance above which the probability of leakage may be unacceptable. Furthermore, the substantial hydrodynamic drag typically exerted by these conduit arrangements on secondary fluid flow and the consequent operational pressure drop it may even be expedient to raise the incoming pressure head to a higher level than normal for a conventional domestic plumbing system. In compliance with national plumbing standards the device must be so securely designed as to guarantee that no leak should occur during its normal lifetime of usage. The incorporation of such a valve in the HXD upstream of the heat-exchanging arrangements then can serve to radically reduce the hydraulic pressure within the secondary conduit system both during extensive standby periods and during use.

13.2 Inlet Aperture Extension

Whilst most of the features of this invention serve to reduce the HXD height to a minimum it may be circumstantially necessary to raise the height and level of the drainage inlet aperture. This may serve to:

Increase the hydraulic head of drainage water and general flow rate

Relocate the position and/or shape of the drainage aperture from that of the HXD to one more suitable for the individual requirements of the installer, for example according to the style of preferred bathroom ceramics;

Enhance the appropriate distribution of drainage fluid from one drainage point to an extended HXD inlet aperture; and Such an extension may need to also accommodate the protective filter component and should preferably be well insulated, unrestrictive to flow and facilitate a water-tight connection to the HXD and the general overlaying of the shower basin, bathroom ceramics or fixtures.

13.3 Auxiliary Inlet

The general benefits of the HXD even while installed under a shower basin may be extended to nearby sanitary features in a parallel plumbing configuration whereby the drainage from the nearby basin or bidet is conducted under the shower basin into the HXD through an attachment point [105] on the drainage inlet passageway.

13.4 Drainage Bypass

To facilitate the evacuation of fluid for drainage or maintenance purposes a direct drainage aperture or bypass conduit may be featured in the casing base with a resident well sealed water-tight plug at one side/end that allows drainage water to be evacuated directly without transit through the heat exchange conduits.

13.5 Overflow and Auxiliary Conduit Attachment

As precautionary feature to reduce the risk of flooding another bypass may be usefully featured connecting a water-resident part of the outflow receptacle [23] to an externally located shower-basin overflow drainage aperture or an opening at a high level of the inlet conduit near the inlet aperture. Alternatively, a drainage conduit attachment fixture such as a piping stub or attachment [56] may be featured externally around a section of collecting channel casing [23] which can be optionally perforated internally and used to implementation an independent or remote drainage point/inlet-aperture.

13.6 Concrete Skirting

This unit is most appropriately installed and set in a bed of concrete, and if preferred with a layer covering over the lid [3]. As the casing needs to be installed horizontally level with precision, the peripheral junction between the lid and the base (FIGS. 1-4) will provide an edge for levelling the surface concrete as foundation for the shower basin ceramics, leaving the lid independent from the surrounding concrete and detachable for maintenance or cleaning.

A steel grid set in the concrete recessed in the lid adds structural integrity and leverage points/handles for lifting, transmitting its weight load through the lid's structural rungs [25] in line with the HXD radial spines [6].

13.7 Additional Features

The HXD is essentially comprised of a looped arrangement of thermally conductive conduits through which the secondary fluid may flow, contained within an enveloping casing (1) through which the primary fluid may flow.

The componential structure of the casing into a base (2), lid (3) and perhaps cover also not only may be much more cost effective for manufacture but facilitates maintenance and cleaning during the devices operational lifetime.

The casing has a shaped internal surface (4) that is in contact with the low pressure drainage fluid enveloping the looped arrangement of thermally conductive pipes (5) through which the secondary fluid flows under a higher pressure.

The illustrated devices are connected to a supply of cold fresh water (101) under a relatively high pressure and an outlet (102) for the same water after having recovered heat from the shower drain water through the devices heat exchanging conduit arrangement. The warm wastewater enters the device through an inlet aperture (16), flows under an underflow rim (12, 22), through the heat exchange chamber around the freshwater conduits (5) over an overflow rim (13) to and through the drainage outlet (24).

13.8 Drainage Holes and Cleaning Accessories

Similarly, but not so importantly, drain holes [55] or channels may also be positioned at the lower end of each piping gully in the base where it meets a radial spine [6], connecting it either to the aligned gully on the opposite side or the adjacent gully across a ridge [9] that has a lower level. This facilitates a more complete evacuation of drain-clearing products and effective rinsing should cleaning be required in situ.

13.9 Installation Configurations

Compatibility with shower ceramics/basins currently in use, in production or in marketable supply minimises their redundancy, does not compromise free market choice and facilitates the device's widespread adoption. Many styles, shapes, forms and sizes of shower pan are used or marketed with various positions for drain water outlet, requiring a variety of designs of HXD device for optimal efficacy in each instance by applying the principles of the invention here disclosed. Naturally, certain designs or arrangements may be advantageous over others in terms of production cost or heat exchange efficiency, with optimal performance being achieved in conjunction with custom designs of shower basins having more appropriately adapted drainage apertures, with convenient access for facilitated servicing and valve operation.

13.10 Stand-Alone Installations

The implementation of this device is perfectly indicated where the domestic water-heater supplies a single (heat-recycling) shower, and has its water supplied exclusively via the shower's heat exchanger. If the shower is independently setup with its own dedicated water heater, then the unit could conveniently be actuated by a valve within the HXD, and operated by foot or body weight through a mechanism incorporated within the HXD. This would not only be a practical convenience but would reduce water wastage.

13.11 Communal Usage Installations

It is also suitable for small setups of multiple showers having centralised water heating, such as at sports facilities changing rooms, where the temperature may be preset as standard [FIG. 7]. The HXD tubing coil here may need to be of larger diameter, but the collective efficiency of heat exchange would be similar in principle. Other less trivial configurations require coupled or/and hydraulically actuated valves for effective operation, as this relies on a balancing of flow rates through the HXD, and benefit from an additional circuit of water piping that supplies fresh heat-reclaiming water to the water heater from all its hot-water outlets.

13.12 Usage of Thermostatic Mixer Valves

Good plumbing arrangements suitable for the exploitation of this invention for applications as described above benefit particularly from the use of a thermostatically regulated mixer valve, and a water piping with good lagging and/or made of a good insulating material.

A manual self-closing push-button valve of time-limited action, allowing cold fresh water to bypass the pre-warming HXD device for a limited time, may be employed where the bather might on occasion wish to adjust the shower to a cold temperature instantly, or allow the shower to warm up initially before stepping under it, if featured with a body weight or foot operated valve.

Figure 13:
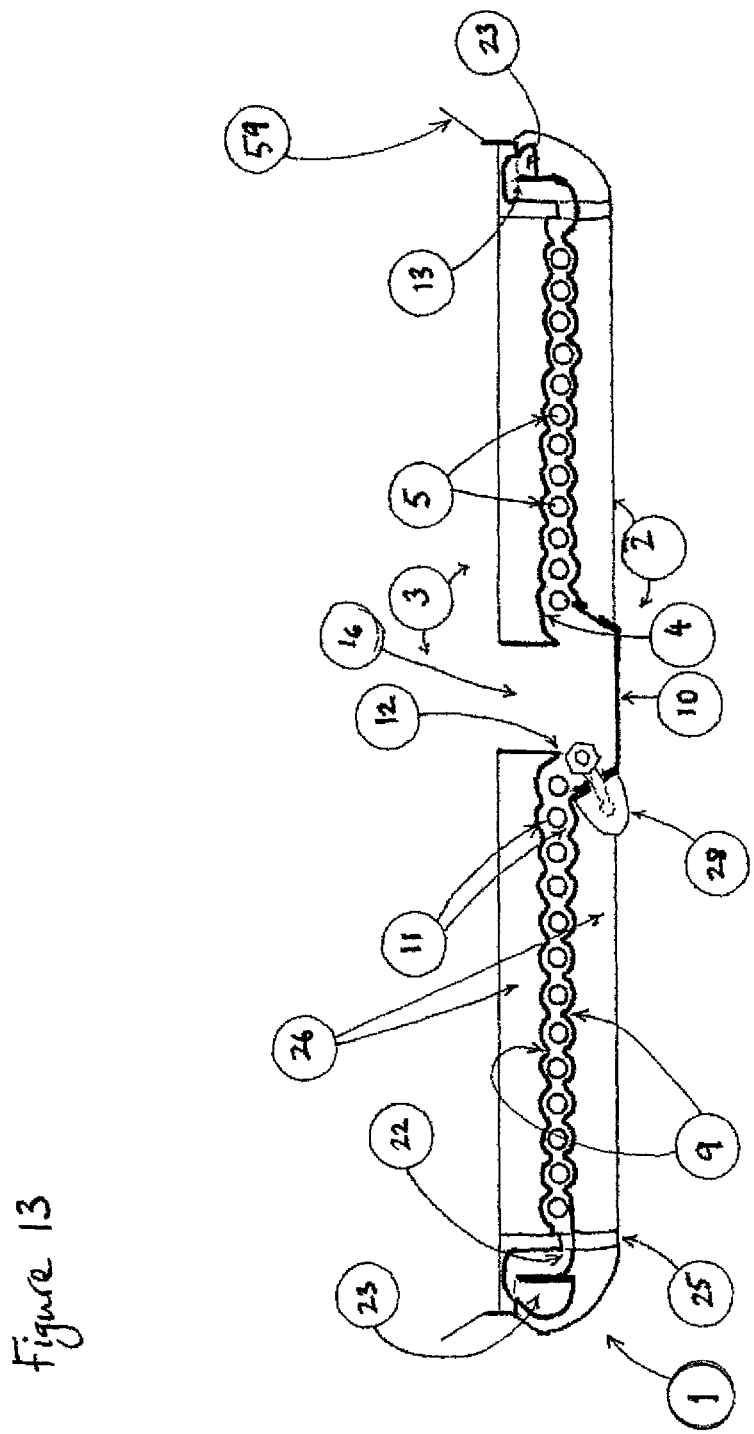
FIG. 13 shows a lateral mid section pipe of a preferred embodiment of a circular centrifugal HXD for standard ceramic basins.
Figure 14:
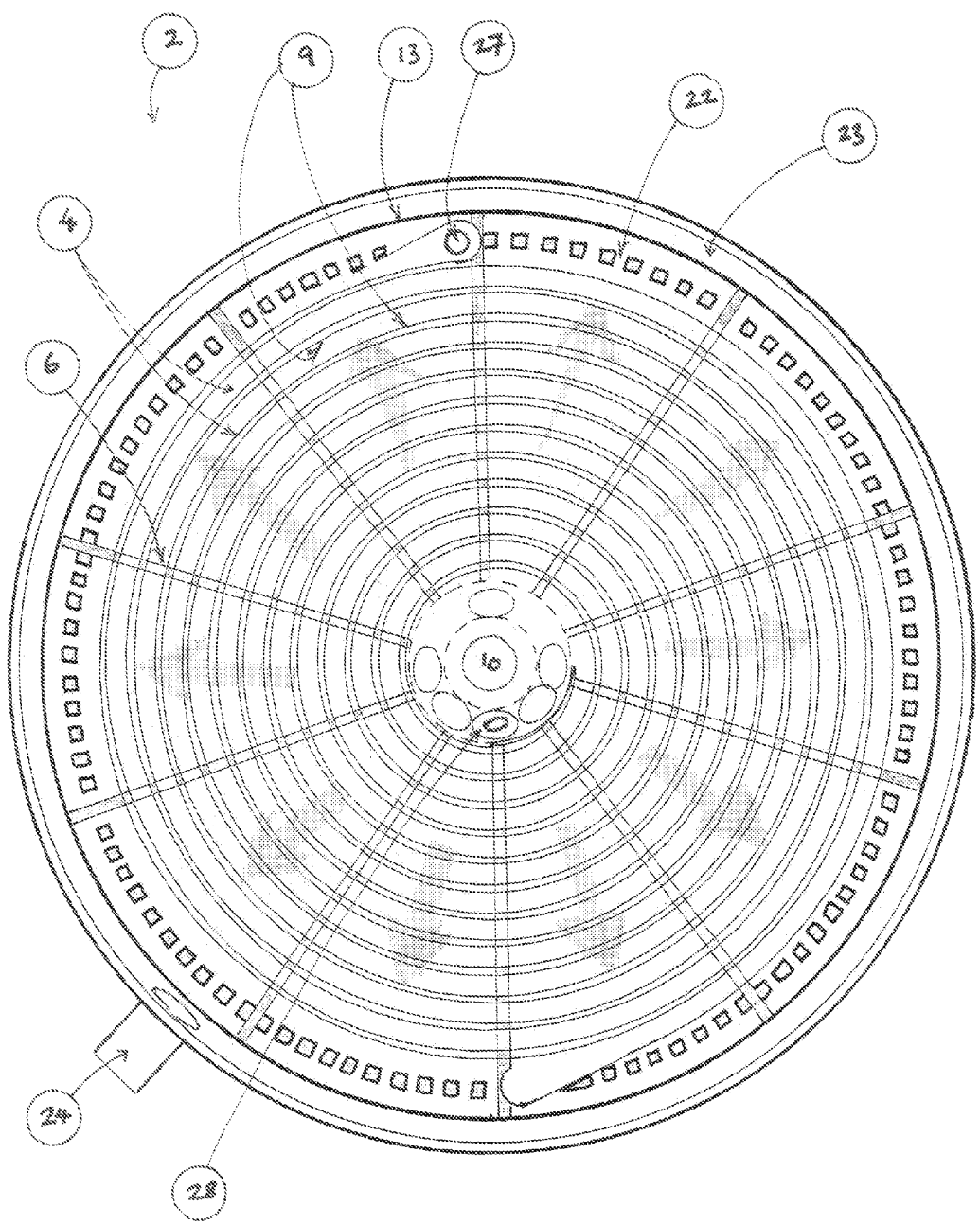
FIG. 14 is an open view from above of the HXD casing show in FIG. 13.

FIGS. 13 and 14 show a preferred embodiment of a single layer centrifugal HXD 1 whose casing [1] is composed essentially of a base container [2] and a lid [3], typically and ideally but not necessarily made of plastic material, such as may be commonly used for waste water drainage pipes generally: i.e. that is cost-effective to mass produce into the form here described having a good combination of appropriate characteristics: reasonably good structural strength and rigidity with stability at domestic hot water temperatures, resistance to biodegradation, microbial colonisation and domestically used chemical agents in solution, also permitting of a low friction and adhesion-resistant smooth surface finish. To enhance these latter properties the inner surfaces may be treated with a higher performance lining, such as a Teflon coating [4].

This pipe may be modified in shape altering the fluid dynamics in a way that facilitates the surrounding water flow, by an oval cross-section [FIG. 5b] for example, and/or heat transfer to the fresh water, such as by helically scoring of the pipe's inner surface.

Both the base [2] and the lid [3] have ribs [6] that traverse the path of the coiled piping [5], and which may be straight or otherwise extending radially from the inner turn of the coiled piping to beyond the outer turn, in such a way that they align opposite and make good contact with each other or with interposed battens [7] when assembled. These ribs [6] and battens [7] have semicircular cuttings at their matching surfaces to accommodate and hold in precise position the coiled tubing when assembled. To ensure and stabilise good vertical alignment of these ribs and battens, their contacting surfaces may be shaped with complementary features [8], also allowing the lid to be alternatively oriented with interposed battens [7] for a staggered or interlaced layer arrangement of piping layers.

Figure 17:
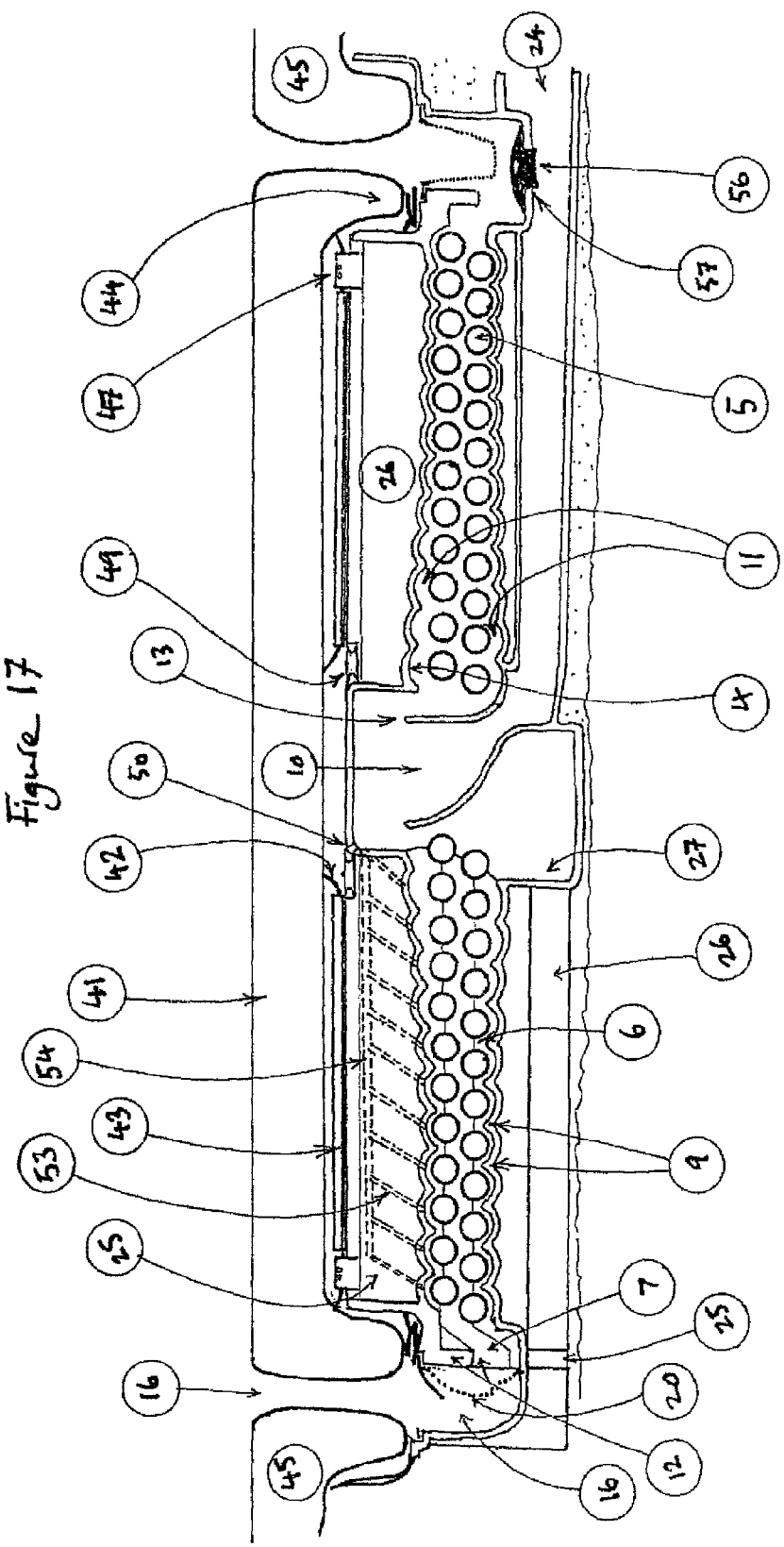
FIG. 17 shows a lateral mid section through a preferred embodiment of a double layer centripetal flow HXD with annular ceramic basin.
Figures 20A, 20B:
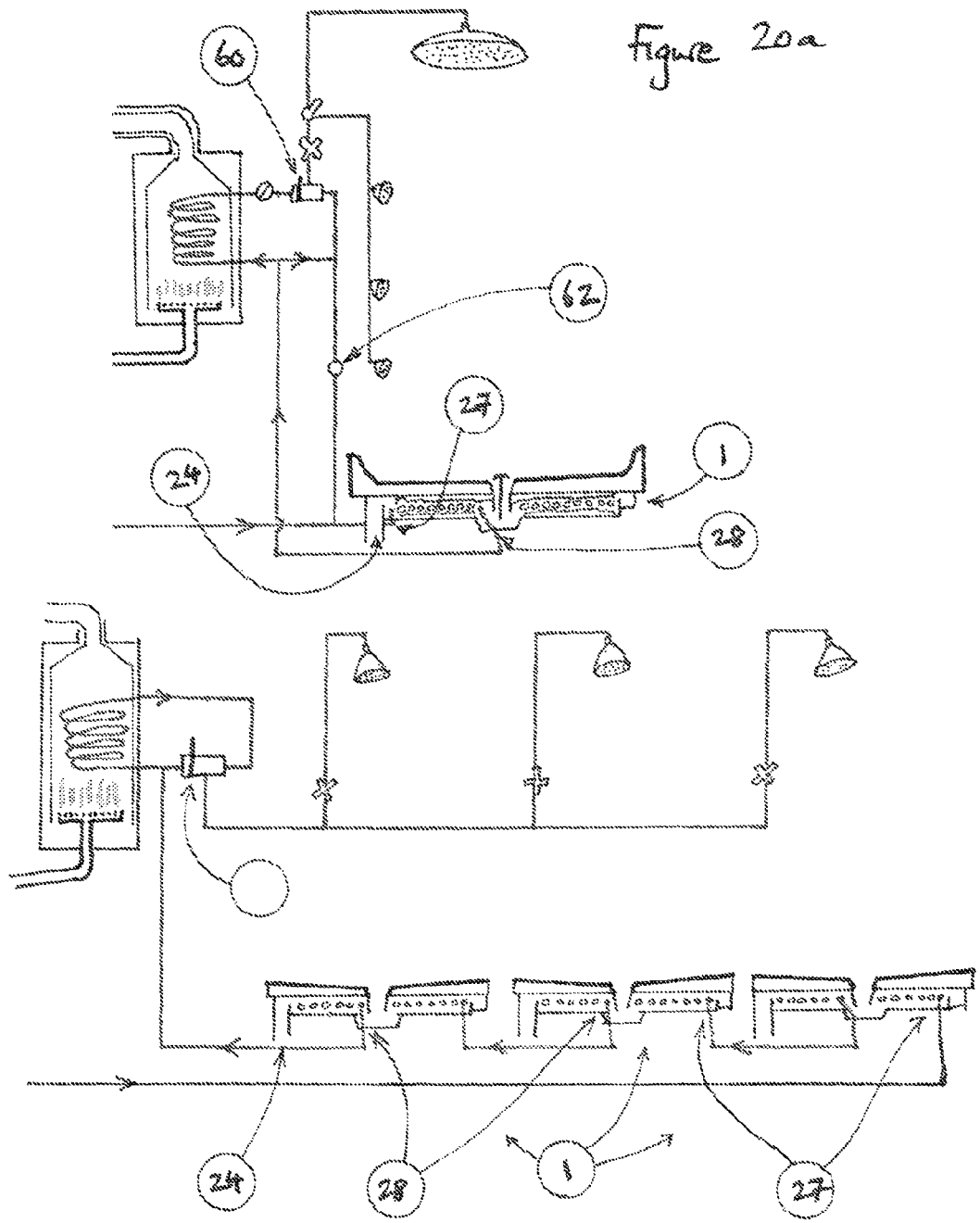
FIG. 20a shows a general or domestic plumbing arrangement in which the embodiments may be employed.
FIG. 20b shows a series plumbing arrangement for multiple showers at preset temperature.

In some preferred embodiment, the flow of waste water is directed radially within the casing, centrifugally e.g. FIGS. 7 & 10, 13, 14, and 19a, 19b and in others centripetally e.g. FIGS. 17 & 18, obliquely traversing, over or under, each turn of the coiled fresh water pipe [5]. Both ribs [6] and battens [7], trace a similar radial path, between the inner loop and beyond the outer loops of the coiled pipe [5], as seen from a perpendicular perspective above [FIGS. 14, 18a & 19a] to form a rotationally symmetric arrangement, thus guiding the uniformly distributed radial flow of waste water in all horizontal directions.

The internal surfaces [4] of the casing base [2] and lid [3] surrounding the coiled piping in the HXD is so contoured around the piping as to direct and control the flow of waste water transversely around the piping [5], distributing it more uniformly around the pipes cross-sectional circumference, along the length of each coil revolution, and to a large extent evenly along its radial path across the entire HXD. This typically may be seen as ridges [8] with concave sides aligned with the piping's nearest interstitial space, allowing a limited space for the waste water to pass, between the piping and the casing, that may be more or less inversely proportional to its distance from the HXD's centre of rotation [10]. Whilst the narrowness of this gap [11], by increasing the laminar flow and directing it closer to the pipe [5], allows a steeper temperature gradient in the waste water enabling a faster more effective heat transmission from the pipe [5] to the waste water, it also results in more drag-induced resistance to the natural flow of drainage. The purpose of so modelling the casing's inner surface [4] is to so distribute this drag-induced resistance to flow (i.e. avoiding any "bottle neck" effect), as to optimise the HXD's maximum overall flow (under normal drainage pressure) but matching it to that of the application (i.e. the maximum total output of flow from all shower fittings during normal operation), making allowance for additional drag resulting from an amount of sediment, grim and/or hairs that may accumulate within the HXD through normal usage. This not only enables optimal heat exchange efficacy (and therefore efficiency) but together with the general elimination of unnecessary slow flow zones within the HXD of water stagnation, convection or eddy currents, inhibits the settling of sediment and microbial colonisation, and furthermore, by minimising the casing's resident waste water volume and heat capacity, optimises the speed with which the HXD reaches its operationally effective dynamic thermal equilibrium.

The waste water entering the HXD first passes an underflow rim [12], which is below the drain hole at the centre of a centrifugal type HXD [FIGS. 13 14 19a] or perimetrical to a centripetal type HXD [FIGS. 17 & 18a]. This constitutes the lower bend of an S-type air trap.

After traversing the coiled piping [5] waste water flows over a perfectly level horizontal rim [13], having a circular or polygonal shape, or being so shaped as to have some order or semblance of rotational symmetry (higher orders being more suitable), presenting a barrier to the free wastewater flow of equal resistance in all horizontal orientations, so maintaining an even overflow uniformly distributed along all parts of the rim circumference.

This constitutes the upper bend of an S-type air trap, keeping the (passively washed and rinsed) heat exchange coil [5] submerged in a continuous relatively anaerobic fluid environment hostile to most microbes, avoiding the encrustation of solutes or residue likely to accumulate with time through repeated evaporation and desiccation, and preventing sewage odours from entering the domestic environment.

The horizontal employment of a pipe rolled in a plane with a uniform increase in curvature is suitable for this application but not necessarily essential (nor entirely ideal) since it is ultimately the spacing around it, (as well perhaps as the size, shape and positioning of the waste water outlet) as bounded by the shape of the containing enclosure's entire inner surface, and the presence of air, that determines the uniform distribution of waste water flow through the HXD.

In such an implementation where the pipe arrangement 5 is not circular [FIG. 19a], its uneven encumbrance to the surrounding medium's radial flow and consequent non-uniform hydrodynamics may be adequately compensated for by a number of strategies: the appropriately slight relative inclination, shaping and variable level of the overflow rim at its edge, as well as the shaping of the coiled piping and the ridges or gullies in the casings inner surfaces that may accompany the piping along its path [FIGS. 19a & 19c]. The difficulty here is that maintaining an even radial flow would necessitate a variation in radial fluid velocity or distance travelled (to keep the flow gradient contours aligned with the piping) which is counteracted by the variations in hydrodynamic drag that this incurs. The solution is to alter the hydrodynamic resistance in a way that does not alter counterproductively the interstitial fluid volume or its balanced distribution. So, for a square HXD [FIG. 19a], an appropriate compensation would be to graduate the pipes shape from circular at the sides [FIG. 19c] to oval at the corners [FIG. 19b], and make the ridges correspondingly smoother to facilitate faster flow.

An additional measure for securing or enhancing the appropriate radial flow of the interstitial medium, at nominal hydrodynamic cost but applicable to any non-circular piping arrangement, is with fins [14] or fencing [15]. Whilst such alternative configurations may have their advantages, the effective distribution of radial flow for optimal heat exchange efficiency is however inclined to be more sensitive or restrictive to its rate of flow.

Although any number of coils or layers of coiled piping [5] may be inserted into the casing with positioning battens [7], certain adjustments also need to be made to maintain the appropriate conditions for appropriate operation. Firstly, since more spacing is required around the inner/tighter turns of the coil than the outer/wider turns, the cumulative bulging towards the centre will distort the HXD casings shape.

Although this might potentially be a useful feature, it is more conveniently compensated for by the progressive flattening of tube towards the coils centre into an elliptical or more favourably hydrodynamic cross-sectional shape, as described above [FIG. 19a]. If the inner turn has not too small a radius, this permits parallel layers of coils to be stacked without distortion or altering the HXD's characteristically balanced flow/drag distribution across the HXD piping [5]. Whilst staggering of multiple tubes allows them to be well innested for a narrow interstitial spacing, there may be useful hydrodynamic value in alternating the sense of rotation of adjacent tubes using wider spacing battens [7], if minimal interstitial spacing is not so important.

Figure 21A:
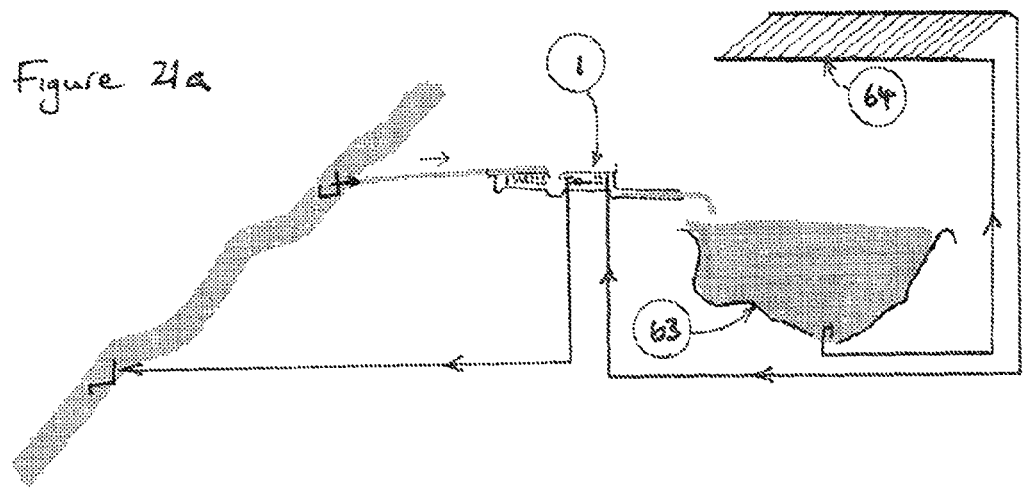
FIG. 21a shows am embodiments for heated spring water spa with centrifugal fresh water drainage.
Figure 21B:
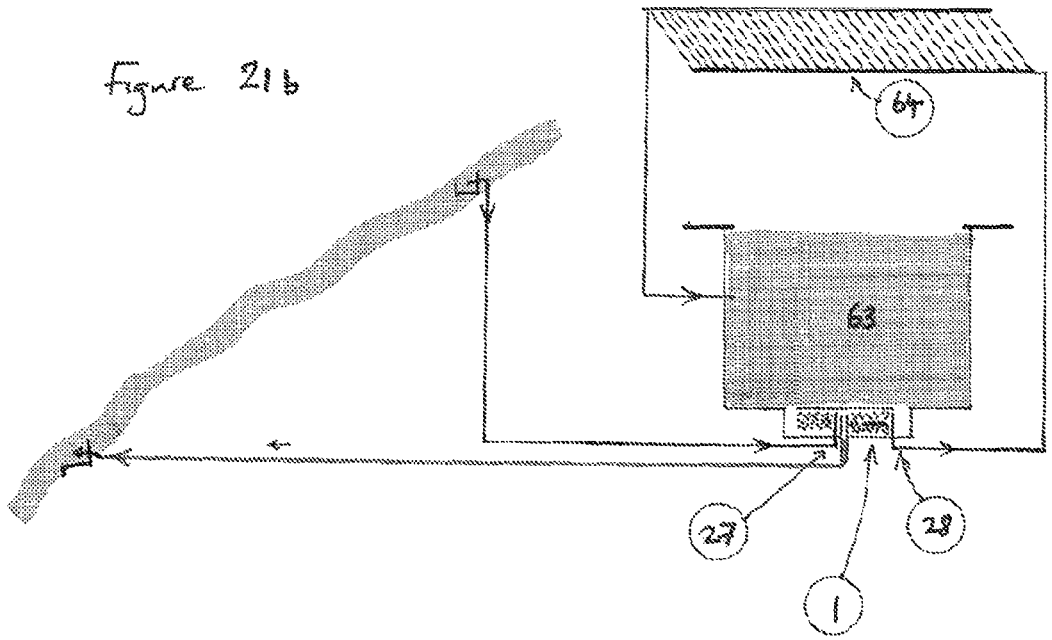
FIG. 21b shows an embodiment for heated spring water spa with centripetal drainage with high head.

As the insertion of additional coils changes the level of the underflow rim [12] relative to the overflow rim [13], it may become insufficient to still function as an air trap, resulting in draining or incomplete submersion of the coiled piping [5] after or during normal operation. This might not be an issue for applications that would require multiple piping layers since they might conveniently operate continuously submerged [FIG. 21b], although these rims may serve anyway to drain stagnant thermal zones of fluid. For the centrifugal HXD the central underflow rim and conduit leading to it [16] is of straight tubular shape with a lip[17] or notch allowing extensions to be inserted and held with an air-tight sealing gasket [18], that can reposition the underflow rim [19] and the length of the collecting conduit [16] or/and providing supplementary features, such as accommodating a removable filter [20], supporting a drain hole cover [21] or valve actuating mechanism [FIG. 3]. For the centripetal HXD the underflow rim [12] may be extended by the rim of an enclosing cylindrical hood that covers as well as surrounds the casing lid [3]. Alternatively, the overflow rim may be raised, perhaps more efficiently, by an insert [22] similar to that used for the centrifugal underflow rim.

As the number of layers increases, vertical variations in flow which are not an issue for single or double layer HXDs need to be minimised for a uniform flow distribution contingent with optimal heat exchange efficacy. The benefit of a multilayer HXD is not so much to permit higher flow rates (for which few layers suffice before the connecting pipe diameters become limiting, in this illustration), but to further reduce the hydrodynamic drag through the coiled piping in particular, by reducing its travel speed. Very slow fluid speeds through the expansive interstitial medium tend to facilitate or encourage zones of uneven or vacillating flow, or stagnation. If the hydraulic head permits, which it frequently may, flow restrainers such as filter meshing may be used to obscure and dampen the draft effect of the inlet or outlet flow openings, a restrainer or sieve with graduating size or concentration of perforations that may counterbalance this effect. This flow damper may be integrated in the underflow rim [22 or 12] whereby it also structurally connects the lid [3] with the base [2].

The precise horizontal alignment of the of HXD casing, and particularly the peripheral overflow rim [13] for centrifugally draining implementations, is most critical in the context of domestic showers since the drainage pressure is generally very low, and with the peripheral overflow drainage rim [13] being of a relatively broad diameter, even a very slight general inclination may result in a very biased distribution of waste water overflow along the rim circumference, and a serious compromising of the HXD's optimal efficiency. Even so, given a reasonable precision of horizontal alignment, at low rates of drainage flow, this irregularity is likely to be further accentuated by cohesive forces of water (causing the side more inclined to overflow to flow more and the opposite to flow much less or not at all). To attenuate such disbalancing tendencies, the edge of the overflow rim may be shaped vertically with crenellation or a repeated restraining pattern with periodic cuttings to focalise and limit the water's cohesion affect, or teeth that resist an excessive free flow in any one direction. In fact, as the length of the peripheral rim surface is quite excessive for the operational rates of flow involved, it would be better constituted as a sequence of moderately small holes of regular size and spacing at a common horizontal level all around the perimeter, preferably without water repellent properties pertaining to the material at the rim edge, which may be achieved if necessary by an appropriate surface treatment.

These considerations also apply to the HXD configured for centripetal drainage, as here drainage entering the HXD also needs to be evenly distributed around the perimeter, although the effect is much less critical since the water and its surface does not need to make such intimate contact with the rim or pass it as a thin laminar.

However, since a flow-resistance restrainer can act as a filter collecting residue that in time may obstruct the normal flow of drainage, it is not well indicated for centrifugal configurations where it may be less accessible and awkward to clean. Generally, a centripetal arrangement would also better avoid any puddling of water in a shower basin that may arise from the bottle neck effect of a singular drainage point and favourably permits a much larger inlet filter to be employed which is less inclined to block or slow drainage, although it may adversely affect the HXD efficiency in becoming partially so without being noticed. The disadvantage is that the uniformity of centripetal flow is more susceptible to the inevitable asymmetric variations in the distribution of water as it enters a ring shaped drainage outlet of the shower basin, although this effect may not be so significant.

Once past the overflow rim [13], the waste water is collected in a circumferential channel [23] to an outlet point [24] in the case of centrifugal arrangement, and conducted away appropriately, typically to the main drainage system. The highly contoured forms of the casing base and lid are structurally enhanced by external rungs or spines [25] aligned with the radial ribs that transmit the weight sustaining capacity of the shower drainage basin or tiled underfloor cement to the supporting floor below, the spaces between which provide pockets for advantageously filling with a thermally insulating material [26], such as polyurethane. This also provides a better shaped surface for setting the casing horizontally in concrete without air pockets, and may be easily remodelled to integrate encumbering water supply pipes and their connection fittings [27,28]. For this facility parts of the casing may be featured to conveniently accommodate specialised or commercially available fittings in a water-tight secure manor. Alternative designs may incorporate bridging sections of this piping to accessible locations on the device perimeter, significantly facilitating installation, albeit at the expense of flexibility perhaps. Additional thin panels of insulation material in the shape of the lid acting as a provisional vertical spacer can facilitate upgrading the flow rating at a later date by the non-destructive inclusion of an additional layer of heat exchange piping [5] together with interposed radial battens [7].

Specialised fittings include water-tight sealing threaded washers [29], F-type pipe connectors or a foot-operated drain hole valve mechanism which may be substituted interchangeably with a commonly available T connector at installation.

A foot-operated valve for the various embodiments of centrifugal type HXD described herein is illustrated in FIGS. 15a and 15b. Here the waste water enters the HXD through and around a drain hole cover [21] which may be depressed with one's foot against the retaining tension of a spring [30] sustaining it underneath. A rod [31] attached to the drain hole cover top [21] slides through a guiding structure [32] that is nested tightly within the collecting conduit [16] of the HXD lid [3], to prise apart two small rollers [33] on the end of pivoted levers [34 & 35]. In movement, one lever [34] obliquely contacts the other lever [35] supporting its compression of the valves opening rod [36], thereby permitting fresh water to circulate through the HXD and come out through the shower head. The drain cover [21] and spring [30] are easily removed allowing the filter [20] to be extracted for emptying or cleaning at will or as required.

A valve mechanism suitable for application in a centripetal HXDs such as depicted in FIG. 17 is illustrated in FIGS. 16, 18a, 18b, 18c and 18d, where the movement of an activating rod [36] displaces a ball [37] whose natural position blocks an opening in the fresh water supply [28] to where the HXD piping coils [5] may be attached [38] using commercially available L-type pipe connectors. The rod [36] has a circular notch 36a which moves against a retaining spring [39] held in a housing 36b through which it passes, where a Teflon washer [40] or similar piece material is also held in place under moderate compression maintaining a water tight seal around the rod 36. This valve may be used also in a centrifugal HXD arrangement such as depicted in FIG. 3, with a stronger retaining spring, or substituted with a similar design alternatively channeled for reverse flow in a way that maintains the same direction of flow past the stopper ball.

The valve shown in FIG. 16 may be actuated in a centripetal HXD by a mechanism such as illustrated in FIGS. 18a to 18d. Here a ceramic shower basin plate [41] covers a centripetal HXD resting its weight through the radial ribs [42] on its undersurface upon rubber seating strips [43] on top of the HXD lid's radial spines [25]. It also has a downhanging lip [44] around its circumference which serves to keep the pulley mechanism housed at the top of the lid [3] dry by trapping air around it, and is loosely bordered around its periphery by a complementary ceramic drainage basin [45]. The rubber strips [43] have an internal cavity which becomes evacuated when compressed under the weight of a person standing on the shower plate [41]. This movement causes cords [46] to be elongated around the ceramic ribs [42] in U-shaped fittings [47] at the peripheral end of each radial spine [25]. These cords (or chords) connect neighbouring U-fittings [47] and elongate another cable [48] into a star shape [FIG. 18a] as it loops around each cord [46] and a pulley wheel [49] at the inner end of each radial spine [25], until finally passing through a close fitting hole [50] into the space near and above the overflow rim [13], over another pulley [51] down to its attachment on a valve actuating lever [52]. The weight of a person and consequent tensioning of the chords [46] therefore causes the cable [48] to pull on the lever [52] which opens the value on the fresh water conduit [27 & 5].

Various additional features or customised accessories to the HXD casing also enhance its appropriate functioning, or its general scope of application, such as an shallow drainage offset funnel with an indeterminate orientation. To avoid the presence of trapped air or bubbles under the HXD lid [3] which would obstruct flow and inhibit heat exchange, vent holes [53] may be positioned at the end of each segment of pipe arc, where each pipe gully or longitudinal cavity between the ridges [9] in the lid [3] meets a radial spine [6]. These vent holes [53] may then connect to a duct [54] along and inside the radial ridge [25] that opens out near and above the overflow rim [13] upstream. These vent holes [53] may be quite small since they only serve to relieve pressure and conduct air when initially filling the HXD after installation or cleaning.

Similarly, but not so importantly, drain holes [55] may also be positioned at the lower end of each piping gully in the base where it meets a radial spine [6], connecting it either to the aligned gully on the opposite side or the adjacent gully across a ridge [9] that has a lower level. This facilitates a more complete evacuation and effective rinsing of drain-clearing chemicals should cleaning be required in situ. For this purpose a direct drainage bypass conduit [56] spanning the HXD may be featured in the casing base with a resident well sealed water-tight plug [57] at one end. Another bypass connecting a water-resident part of the outflow receptacle [23] to an externally located shower-basin overflow drainage orifice may be usefully featured, or an attachment fixture externally around a removable section of collecting channel casing [23] to facilitate this as an optional modification. Alternative strategies for a more thorough cleaning include flushing each sector of the HXD with compressed air or water, perhaps with the aid of a sector-selector or plunger accessory, or simply removing the lid [3] for manual access.

In order to avoid or compensate for the predominant flow rate that would arise from the upper laminar of waste water flow by virtue of its greater proximity to the overflow rim [13], a downpointing vertical rim [58] may be positioned adjacent and upstream to the overflow rim [13], and may also be shaped vertically with crenellation or perforations for the purpose of better vertical balancing of waste water flow through the HXD. Since the warmer water tends to rise over the cold this underflow rim acts also as a heat baffle ensuring that the coldest regions of the waste water flow are most effectively drained. The crennelation of the lid's underflow rim [58] may be matched with a corresponding one of different depth on the base, having an appropriate size and positioning so that when the lid is rotated by 180 degrees as when an additional coil [5] is incorporated, merlons of the lid rest on the base's, sustaining support from it also at its new height without necessitating the insertion of a weight sustaining spacer. The periodic contact points along the peripheral underflow rim [58] or overflow rim [13] provide structural load bearing support that bridges the base [2] with the lid [3] that is a suitable location for also implementing screws or bolts through connecting holes to bind the casing securely but reversibly tightly closed.

FIG. 27a shows schematically a platform 400 for standing on under the shower which has limited freedom of downward movement to shift vertically (i.e. maintaining its level inclination) or tilt/pivot about a parallel axis coincidental to or near one side. It may consist of one or more connected or independent rigid surfaces 402. The platforms may be a drainage collection surface (water proof/retaining), with inclined surface or grooves, or grid (having a disjointed, perforated horizontal surface) which rests upon a stable drainage collection surface. The platform 400 may be made of plastic/acrylic or wood, for example.

Drainage collecting platforms 400 that cover a valve actuating mechanism 404 exposed to the downstream waste-water drainage environment may securely maintain the gas seal with a continuous peripheral rim 406 that may remain submerged in the device-resident drainage fluid in which it has appropriate freedom of vertical movement.

The platform 400 is supported by or rests upon one or more depressable supporting contacts or "push-points" 408 integrated within the HXD casing, which yield (become depressed) with the additional weight of a person standing on the platform. It may be additionally supported but one or more areas of cushioned surface which acts to bear weight more substantially in the depressed position (e.g. 3 mm thickness of rubber or closed-cell air-expanded neoprene mat). The depression of these push-points is linked (moving in parallel) or independent (moving in series), and relayed to the actuation of a check valve 410 for controlling flow through the primary (or first) conduit via one or more cables (cords) 412, levers/pivots 414, wheels or rollers 416 or/and rods 418, and tension springs 420 may also be employed.

A push-point 408 may be a single body of contact acting vertically upwards upon the platform like a piston 422 which protrudes either from the platform undersurface or the casing top through a cylinder, sleeve or aperture in the casing. Otherwise it may consist of multiple sliding/rotating bodies of contact 408, hinged or pivoted on attachments in the casing, acting obliquely (to the vertical) in unison such that net force acts to stabilise horizontal position of the platform and assist its vertical displacement.

The actuating displacement of the push-points 408 may be transferred to the check valve actuator 404 though taught chords or cables 412 running through cable ducts/grooves within the casing or/and around pulley wheels 416 or/and hinged pivots/levers 414 that are also attached to or integral with the casing 1. For parallel actuation of multiple push-points 408 the respective connecting cables/levers are inter-connected in parallel as branches stemming from the cable/lever directly connected with or attached to the check valve 410. For series actuation of multiple push-points 408 the respective connecting cables/levers 412, 414 are inter-connected in series, and may have a tension limiter or absorber (such as a coiled spring or flexible lever) to avoid excessive stress when the push-points are all maximally depressed. A tensioning element, such as a strong spring 420, may be introduced acting on the cord/lever 412, 414 relative to the casing to provide adequate force to sustain the normal weight of the actuating platform via the push-points in their undepressed state.

The check valve 410 may be activated by the depression of a piston-rod 422 or the displacement, rotation or pivoting of a spring-loaded lever 414, and may be situated integrally within the casing lid 3 or the casing base 2 either centrally or peripherally, or even remotely and independently of the HXD casing 1 but remaining connectable or connected via an appropriate actuation relay mechanism.

The check valve 410 may effect a branching of fluid flow—i.e. with one portal being subdivided into multiple conduit attachment points.

The check valve 410 may be alternatively a bypass valve with an additional piping arrangement such as may deliver fresh water directly to a heated water appliance when not passing through the heat exchange conduit arrangements during shower operation.

FIG. 28 illustrates an embodiment of the here disclosed invention as part of a domestic refrigeration unit, as a circular convoluted dual pipe spiraled in a vertical plane at the rear side of the unit (FIG. 28a). Such units are typically located within a fitted space next to other domestic units in which stagnant air around the HXD can become sufficiently warmed to impede heat transfer.

An efficient low power motor (216) drives a fan [217] to propel air through the convoluted HXD directly from the space behind the unit, drawing it from the front or the unit via the unit's undersurface and subsequently expelling it back out to the front via the upper and side surfaces of the unit. Air is thus conducted as a layer along closed conduit sleeves (222) within the unit's casing that are overall substantially equidistant from all side of the HXD perimeter in a manner favorable to the uniformly balanced radial distribution of air flow through the HXD. The two thermally conductive secondary conduits (5) are connected by a thermally conductive strip which tapers in width becoming progressively narrower towards the periphery (FIG. 28c) such that one conduit lies in a converging con-conical surface parallel to the other. This strip is cut between its conduit bonded edges into a series of parallel strips perpendicular to its length (FIG. 28d) that are twisted into slats aligned with the flow of propelled air. Hereby the heat exchanging surface area in contact with the air is made substantially greater than the corresponding surface area in contact with the secondary heat medium to compensate for its inferior thermal effusivity. The power efficient fan (217) assisted ventilation of this HXD maintains an optimal temperature difference between the refrigerant fluid and the air to which it transfers its heat thereby increasing the heat transfer rate, and the effective refrigeration capacity. The fan may introduce some degree of rotation in the radial air flow, but this is not detrimental to the HXD's efficiency but may even be advantageous if aligned with the outwardly spiraling direction of the thermally conductive conduit and the orientation of the interconnecting slats.

FIG. 29 illustrates an embodiment of the here disclosed invention with assisted ventilation as an energy efficient and space economical means of thermally conditioning air in buildings, as an inconspicuous flat device that may be fitted on or within the ceiling (219) of rooms. Its wide area dispersion of thermally conditioned air facilitates a wider and more even distribution of air temperature and permits a lower temperature heat source to be effectively used. Here the thermally conductive conduits (5) are held in their appropriately spaced positions by thermally conductive fins (14) through which the conduits pass. These fins increase the proportion of heat transferring surface area in contact with the air to compensate for its lower thermal effusivity with respect to the secondary fluid heat medium in circulation with the air-conditioning system, without radially short circuit the thermal gradient along the conduits. These fins (14) are anchored to the enclosing casing base (2) and covering lid or top (3). Insulation (26) reduces heat leakage through the ceiling. A similar embodiment with the secondary fluid flowing in the reverse direction and using a propeller fan in line with the ceiling surface that propels the air downwards drawing air centripetally through the HXD may also be similarly effective.

FIG. 22 illustrates an embodiment of a body weight valve actuation mechanism 500 using flexible hydraulic tubes 502, a rocking arm, a levered piston and a screw regulated tension spring that enables fluid to flow through a circular centrifugal HXD with four convoluted conduit layers (as illustrated in FIGS. 3 and 4) and subsequently out through the shower head. A groove in the lid cradles a compressible hydraulic tube 504 along a level winding path above and in alignment with its weight bearing structural rungs [25] and conduit supporting radial ribs [6], which is connected to a tubular hydraulic bladder held under a terminal screw clamp, a screw regulated pressure adjustment lever and a rocking arm whose pivoting movement impinges on the check valve piston. A shower pan having a grooved feature underneath in line with and complementary to the hydraulic tube grove of the casing lid rests it weight in situ entirely upon the hydraulic tube. The additional weight of a person standing on the shower pan compresses the hydraulic tube, even if partially so, enough to inflate the hydraulic bladder 505 (FIG. 22b) and pivot the rocker arm/push plate 507 so that the check valve is opened. This valve may also be connected to an externally connected cord or cable 412 under tension via pulleys so that the valve may be actuated remotely. Similarly such a chord may be connected to the rocker arm so that the weight operated mechanism may actuate a remotely located valve, either simultaneously or alternatively to the lid-integrated check valve.

FIG. 22 also features a drainage overflow conduit that bypasses the HXD, which may be linked to a nearby overflow inlet aperture in the peripheral rim of the central drainage basin. With excision of the section of wall bordering the surrounding casing base rim, overflow drainage may also be channeled from the groove between the central depressible drainage basin and the surrounding fixed drainage border or an connected aperture located on the latter's drainage surface.

FIG. 24 illustrates an embodiment of a body weight valve actuation mechanism 600 using a depressible weight bearing platform resting on or inset within the drainage basin, a sprung piston rod 602 with spring 606 and rubber head 608, and a pivoting roller-wheel 604 to activate a check-valve or a bypass valve 410 that enables fluid to flow centrifugally through an alternatively shaped sideways oriented spiral HXD with four convoluted conduit layers (as illustrated in FIGS. 8 and 9) and subsequently out through the shower head. Platform 400 is wood type 610 and neoprene cushion strip 612 is provided. FIG. 24c shows a triangular corner shower platform 400 with a pivot edge 700 and depressable wooden grid platform 400. FIGS. 27n and 27c show a spring mechanism, piston and air damped cylinder including cap 800 for adjusting idle position, lock nut 802, spring 804, rod 806, pulley wheel 808, rubber seal 810, lever 812 with pivot 814. Valve 410 has actuation pin 816. Spring tension adjuster 818 and washer 820 with nicks 822 are also provided.

Although mechanical systems for actuating the valve 410 have been described, it is also envisaged that electro-mechanical means or an electronic switch, such as an infra-red (IR) sensor switch may be employed as an alternative for switching the valve 410 between open and closed states or for providing a signal to an actuator for operating the valve 410. The valve 410 may in some other embodiments be operated remotely such as by another valve, and/or may be configured to operate another valve remotely in some embodiments.

The following is a guide to reference numerals used above:
1. HXD casing and apparatus
   1' Centre 2. HXD casing base
2' Apex
3. HXD casing lid
3a Inner heat exchanger chamber
3a' Rim
3b Groove
3a" Lower lid component
3b" Upper lid component
3c Insulation layer
3'" Upper surface
3"" Upper lid surface
4. Low friction-adhesion lining
5. Pipes conducting higher flow-pressure heat medium (generally fresh/cold water)
5a convex portion
5b concave portion
5c point
5d inlet attachment
5e outlet attachment
5f centre of casing
5g periphery
5h, 5i Allen key slot
5j, 5k vertically turned up end
5L cavity
5" last conduit section
5"" loop curve
6. Radial ribs
7. Radial battens
8. Juxtaposition alignment stabilising features
9. Concave ridges
10. Casing centre (centre of rotation)
11. Gap channeling flow of lower flow-pressure heat medium
12. Underflow rim (upstream of HXD)
13. Overflow rim (downstream of HXD)
14. Flow fin
15. Flow fencing
16. Collecting conduit
16' drainage surface
16" lower end
17. Insert-holding or air-sealing lip
18. Gasket
19. Underflow rim extension
20. Filter
20a Space
20b tubular inlet section
21. Drain hole cover
21a Perforated wall
22. Underflow rim
22a Inclined rim
23. Waste-water collecting channel or receptacle.
24. Externally connected outlet for waste-water or primary fluid heat medium
25. Weight transferring structural rungs
26. Thermal insulating material
27. Plumbing connection for the inlet of fresh water or primary fluid
27a, 28a Conduit in lid
27b, 28b Attachment point
28. Plumbing connection for outlet of warmed fresh water/primary fluid
29. Water seal fitting
30. Drain-hole cover position retaining spring
31. Drain-hole cover rod
32. Filter holding rod guiding structure
33. Roller
34. Supporting pushed lever
35. Valve opening pushed lever
36. Valve opening rod
36a circular notch
36b housing
37. Flow stopper ball
38. Plumbing connection for a pipe connector
39. Valve state retaining spring
40. Water-tight sealing ring
41. Ceramic water dispersing circular floor plate
42. Ceramic undersurface rib
43. Compressible rubber seating strip
44. Ceramic overhanging lip
45. Ceramic basin perimeter for peripheral collection of waste water
46. Tensioning chords
47. U-shaped fitting for attachment and tensioning of chords
48. Valve operating cable
49. Horizontal pulley
50. Cable conducting aperture
51. Vertical pulley
52. Value actuating pulled lever
53. Air vent hole
54. Air duct
55. Drainage hole
56. Direct drainage bypass conduit
57. Drainage bypass plug
58. Peripheral flow vertical equaliser rim
59. Cement partitioning skirting
60. Thermostatically regulated valve
61. Well thermally insulated piping
62. Self-closing push-button valve
100' Corner shower pan
101. Pressured cold fresh water supply
102. Warm fresh water outlet
103. Sediment collecting surface
104. Drainage inlet dispersion gutter
105. Auxiliary inlet aperture
106. Alternative waste water outlet
107. Fastening screw holes
108. Flow distributing perforated surface (Alternative inlet aperture?)
109. Air sealing water bridge
110.
111. Alternative drainage fluid collecting surface
111' Slat
111" Cross-piece
210. Drainage overflow inlet
211. Roller wheel
212. Pivoting arm
213. Push-point
214. Spring
215. Cushioned piston head
216. Motor
217. Drum-Cylinder type fan
218. fan blades
219. Ceiling/wall surface
220. heat mediating fluid reservoir with heating element
221. Table top
222. Layered air conducting sleeves
223. Fluid circulating pump
400 Platform
402 Rigid surfaces
404 Valve actuating mechanism
406 Rim
408 Push points
410 Check valve 412 Cables
414 Levers/pivots
416 Wheels/rollers
418 Rods
420 Tension springs
422 Piston
500 Mechanism
502 Tubes
504 Tube
505 Bladder
507 Push plate
600 Mechanism
602 Rod
604 Wheel/Roller
606 Spring
608 Rubber head
700 Pivot edge
800 Cap
802 Lock nut
804 Spring
806 Rod
808 Wheel
810 Seal
812 Lever
814 Pivot
816 Pin
818 Adjuster
820 Washer
822 Nicks It is envisaged that various modifications may be made to the various embodiments described without departing from the scope of the invention as defined by the accompanying claims in accordance with patent law.

The invention claimed is:

1. A heat exchanger device comprising:
 a first flow conduit arranged for flow of a first fluid from an inlet to an outlet thereof; and
 a second flow conduit arranged for flow of a second fluid flow from an inlet to an outlet thereof;
 the second flow conduit includes a sequential series of generally parallel or similarly oriented or shaped sections providing a serpentine or convoluted second flow path therethrough;
 the second flow conduit is thermally conductive for heat transfer between fluids in the first and second flow conduits;
 a flow path for flow through the first flow conduit being substantially transverse to a direction of alignment of at least a predominant proportion of the second flow conduit;
 the first and second conduits being arranged overall for counterflow heat exchange;
 the first conduit comprising a passageway having at least one interior wall extending therealong and located between the inlet and outlet thereof, the passageway being configured for flow of fluid in a layer formation therethrough with the layers being of generally uniform thickness laterally across a flow front of fluid flowing through the first flow conduit;
 surfaces of the first and second conduits are arranged to be in contact with fluid in the first conduit;
 surfaces of the first and second conduits are configured and shaped such that, in moving along a flow path through the first flow conduit, a portion of height of total available open area for flow of the layer through the first flow conduit is inversely proportional to a width of the total available open area of flow so as to mitigate against substantial changes in a cross-sectional area of the available open area of flow, and the cross sectional area is proportional to a total perimeter of the available open area for mitigating against substantial changes in the total perimeter.

2. The heat exchanger device of claim 1, wherein:
 the cross sectional area is proportional to a length of second flow conduit traversed upstream by the first flow conduit for mitigating against substantial changes in the resistance of the first flow conduit to first flow that may arise as a consequence of temperature related changes in viscosity of the first flow fluid during normal usage.

3. The heat exchanger device of claim 1, wherein:
 the second flow conduit includes a plurality of serpentine/convoluted formations of serially connected second flow conduit section sequences being arranged as adjacent or overlapping layers located inside the first flow conduit, such that a flow path through the first flow conduit passes between the adjacent or overlapping layers, substantially transverse to the second flow conduct section sequences.

4. The heat exchanger device of claim 1, wherein:
 first flow confining surfaces of the first flow conduit extend adjacent to and are spaced from and corresponds in shape to a substantial part of first flow confining surfaces of the second flow conduit;
 the first flow confining surfaces of the first and second flow conduits are configured as a passageway for flow of a layer of fluid therethrough so that a layer of first flow fluid traverses concurrently over each of opposite sides of a section of second flow conduit without substantial changes or variation in the layer's thickness/height or flow speed.

5. The heat exchanger device of claim 4, wherein:
 the first flow conduit has a generally continuous interior wall which includes one or more concave formations, channels or grooves extending adjacent to, spaced from and in alignment with at least a part of the second flow conduit.

6. The heat exchanger device of claim 1, wherein:
 the second flow conduit includes at least a part thereof which has a cross section selected from the group of:
 (a) rhomboid;
 (b) oval;
 (c) a first convex circular portion extending around of majority of a perimeter thereof which merges into two symmetrical concave portions, the concave portions meeting at a point;
 (d) an elongated or edge-rounded variant; and
 (e) a hybrid combination of any of (a)-(d).

7. The heat exchanger device of claim 1, wherein:
 the first and second flow conduits are so arranged so that a height of a layer of the first fluid flowing between confining surfaces of the first or second flow conduits as it traverses across a sequence of sections of the second flow conduit changes incrementally in correspondence with a changes in a width of the fluid layer or/and a length of the second flow conduit traversed upstream by the first flow conduit for mitigating against substantial changes in the conduit's resistance to the first fluid that may arise during normal usage.

8. The heat exchanger device of claim 1, wherein:
 heat exchange occurs between fresh water supplying a shower head and waste water effluent from the shower head collected for disposal in a basin;
 the device has a vertical dimension smaller than its horizontal dimension;

the first flow conduit is arranged for flow of waste water under gravity in a single pass therethrough;

the second conduit is arranged for flow of fresh water and is arranged to be submerged in waste water in the first flow conduit;

the first and second conduits are configured for flow of waste water in the first flow conduit in a cross-current arrangement and generally in counter-current arrangement to flow of fresh water through the second flow conduit;

an overflow outlet is provided in the first flow conduit at a position higher than and downstream of the second flow conduit; and the inlet to the fluid flow conduit is located above a height of the overflow outlet so as to have a greater pressure head.

9. The heat exchanger device of claim 1, wherein:

the first conduit is generally horizontally arranged and has at least one flow regulating element extending across in general alignment with a flow front of the first fluid so as to distribute more evenly a flow of the first fluid across the flow front.

10. The heat exchanger device of claim 9, wherein:

a configuration of the device causes lengths of substantially all lines of flow or streamlines through the first flow conduit, traversing heat exchange surfaces of the second flow conduit, between a flow regulating feature and the inlet or the outlet of the first flow conduit, to be substantially equal in length.

11. The heat exchanger device of claim 1, wherein:

a predominant part of a fluid flow follows a general form of a flat, conical, inclined, frustum-shaped or curved surface.

12. The heat exchanger device of claim 11, wherein:

the inlet of the first flow conduit comprises a horizontally arranged linear aperture located near a perimeter of the second flow conduit in a formation of a loop.

13. The heat exchanger device of claim 11, wherein:

the inlet of the first flow conduit comprises at least one horizontally arranged linear aperture located near and extending along a predominant part of an outer edge of the second flow conduit.

14. A shower system including a shower tray and the heat exchanger device as claimed in claim 1, with the second flow conduit providing flow to a shower head of the system and the first flow conduit being downstream of the shower tray, wherein the heat exchanger device is located under the shower tray.

15. The heat exchanger device of claim 1, wherein:

the surface of the first fluid conduit includes slots to facilitate the evacuation of trapped air.

16. The heat exchanger device of claim 1, further including:

at least one flow guide located inside the first flow conduit for guiding flow through the first flow conduit.

17. The heat exchanger device of claim 1, further including:

a propulsor for moving fluid through the first flow conduit past the second flow conduit.

18. The heat exchanger device of claim 1, wherein:

the first flow conduit includes at least one support member therein for supporting the second flow conduit, the at least one support member acting as flow guides and being aligned obliquely across sections of the second flow conduit for guiding flow through the first flow conduit.

19. The heat exchanger device of claim 1, wherein:

the second flow conduit includes a plurality of generally parallel pipe sections which are fitted into an end block, the end block including flow-reversing end channels therein.

20. The heat exchanger device of claim 1, wherein:

the first flow conduit is generally horizontally arranged for flow of fluid therethrough; and the first flow conduit comprises of at least a lower casing component and an upper casing component, both components being composed to a substantial degree of plastic material and supporting therebetween in a manner allowing for manual assembly and disassembly a generally horizontal arrangement of section of the second flow conduit in a formation of a layers.

* * * * *